(12) United States Patent
Luchinskiy

(10) Patent No.: US 10,550,828 B2
(45) Date of Patent: Feb. 4, 2020

(54) METHOD AND DEVICE FOR ENERGY CONVERSION

(71) Applicant: Alexander Luchinskiy, Bad Kreuznach (DE)

(72) Inventor: Alexander Luchinskiy, Bad Kreuznach (DE)

( * ) Notice: Subject to any disclaimer, the term of this patent is extended or adjusted under 35 U.S.C. 154(b) by 0 days.

(21) Appl. No.: 14/461,362

(22) Filed: Aug. 15, 2014

(65) Prior Publication Data
US 2015/0292489 A1     Oct. 15, 2015

(30) Foreign Application Priority Data
Aug. 15, 2013 (DE) .................. 10 2013 013 475

(51) Int. Cl.
*F03G 6/06* (2006.01)
*F03G 6/00* (2006.01)

(52) U.S. Cl.
CPC ............. *F03G 6/065* (2013.01); *F03G 6/003* (2013.01); *F03G 6/06* (2013.01); *Y02E 10/46* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,532,159 | A | * | 10/1970 | Broadwell | F28D 15/0233 165/104.22 |
| 3,638,054 | A | * | 1/1972 | Honigsbaum | G01F 1/64 310/10 |
| 3,923,038 | A | * | 12/1975 | Cutchaw | F24S 20/40 126/616 |
| 4,220,195 | A | * | 9/1980 | Borgoyn | F28D 15/04 165/104.23 |

(Continued)

*Primary Examiner* — Mark A Laurenzi
*Assistant Examiner* — Shafiq Mian

(57) ABSTRACT

Method for conversion of energy, by which a sun energy, or heat energy, or radiation energy is converted in an other form of energy, where the energy in its heat form or in the form of radiation is supplied to a vaporizer of a heat pipe, and this energy is converted in the energy of a working gas of the heat pipe through (as a consequence of) the absorption of this energy by the working liquid of the heat pipe; the energy in its heat form is extracted (conducted away) from the condenser of the heat pipe, and the energy of movement of the gas of the heat pipe is converted in others, not heat forms of energy, in particular into electric energy, where additionally to the capillary or gravitational forces, usually acting in the heat pipe transport zone to recover the heat pipe liquid, an additional energy, in its mechanical or electrical or any other not-heat form, is supplied to the working liquid of the heat pipe, among other possibilities, from outside in respect to the heat pipe, and this additional energy is converted in a mechanical energy of a mechanical movement of this heat pipe working liquid, and at the same time one directs the gas flow from the vaporizer to the condenser through one or (Continued)

several constrictions, where the cross-section area of this constriction or these constrictions in the plane, which one is perpendicular to the direction of the gas flow, is essentially mach less than an average cross-section area of the vaporizer or condenser, which way an effectiveness of energy conversion is increased.

2 Claims, 40 Drawing Sheets

(56) References Cited

U.S. PATENT DOCUMENTS

| | | | | |
|---|---|---|---|---|
| 4,257,402 | A * | 3/1981 | Westerman, II | F24S 10/45 126/652 |
| 4,463,798 | A * | 8/1984 | Pogson | F28D 15/0241 165/104.23 |
| 6,841,891 | B1 * | 1/2005 | Luchinskiy | H02N 3/00 290/2 |
| 7,143,587 | B2 * | 12/2006 | Acharya | F25B 9/145 62/6 |
| 9,310,101 | B2 * | 4/2016 | Gruss | F28D 15/0266 |
| 9,423,185 | B2 * | 8/2016 | Yamakage | F28D 15/0233 |
| 2002/0148235 | A1 * | 10/2002 | Bell | F02G 1/043 62/3.3 |
| 2015/0345522 | A1 * | 12/2015 | Fong | F15B 21/042 60/659 |

* cited by examiner

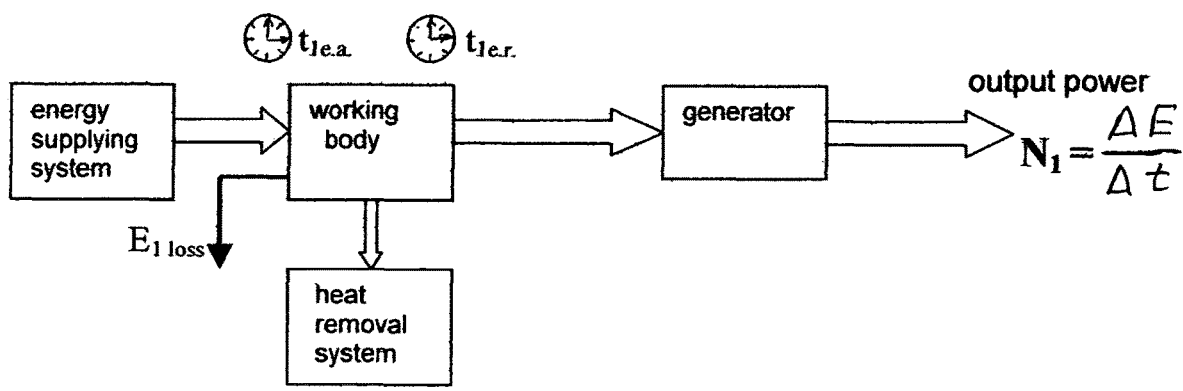
$E_{1\,loss} \ll E_{2\,loss}$ ; $t_{1e.a.} \ll t_{2e.a.}$ ; $t_{1e.r.} \ll t_{2e.r.}$ ; $N_1 \gg N_2$
($E_{loss}$ = energy loss; $t_{e.a.}$ = energy absorption time; $t_{e.r.}$ = energy release time; N = output power )
Fig. 1б

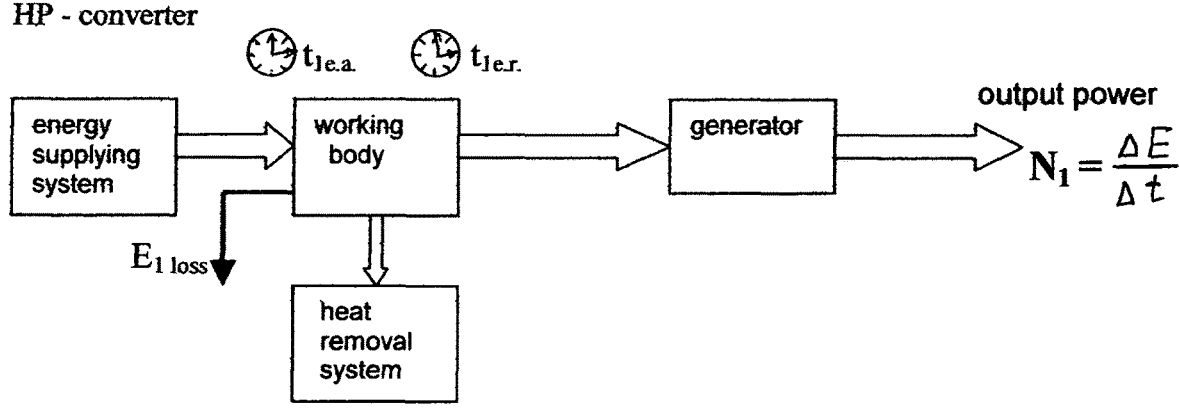
$E_{1\,loss} \ll E_{2\,loss}$ ; $t_{1e.a.} \ll t_{2e.a.}$ ; $t_{1e.r.} \ll t_{2e.r.}$ ; $N_1 \gg N_2$
($E_{loss}$ = energy loss;  $t_{e.a.}$ = energy absorption time;
$t_{e.r.}$ = energy release time;  N = output power )
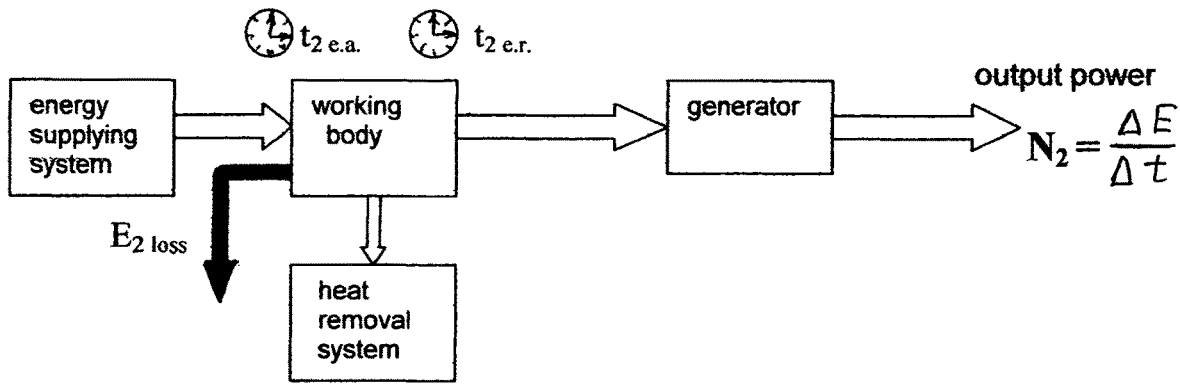
Fig. 2

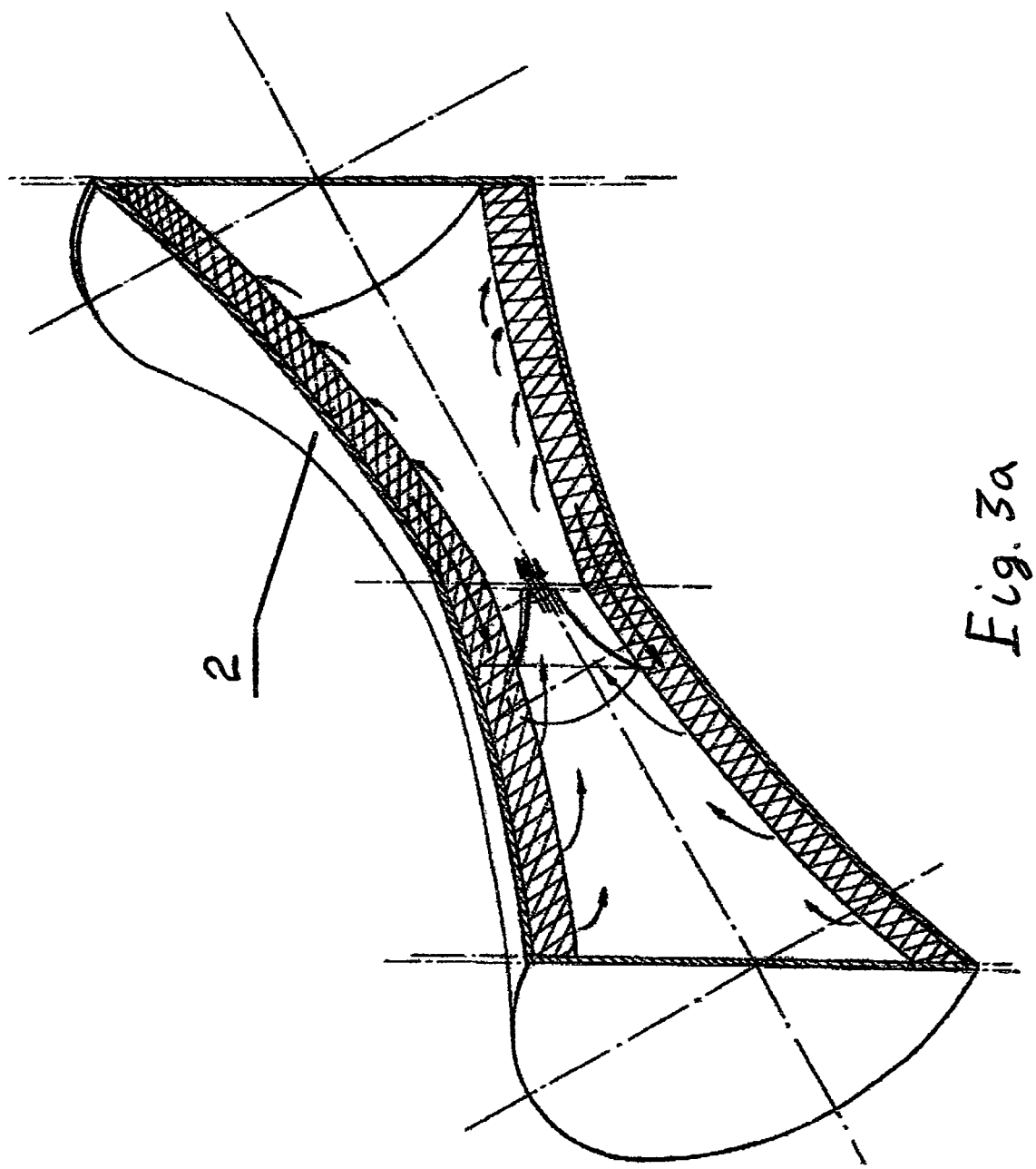

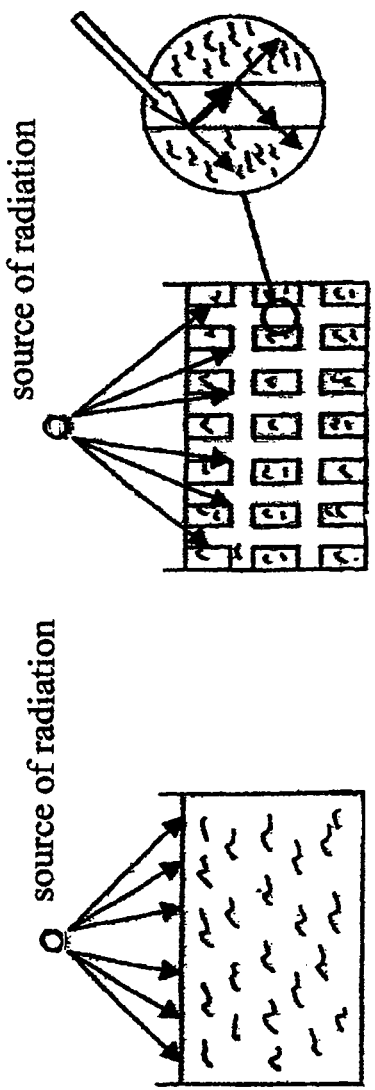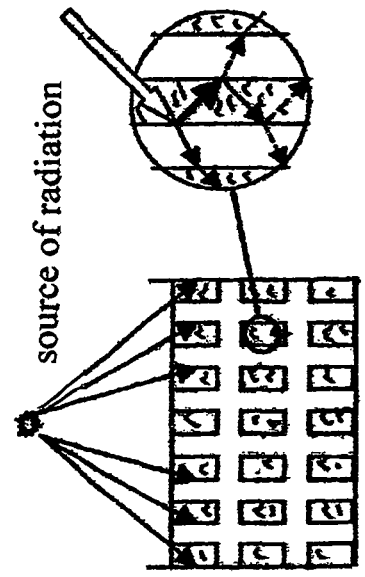
Fig. 4a

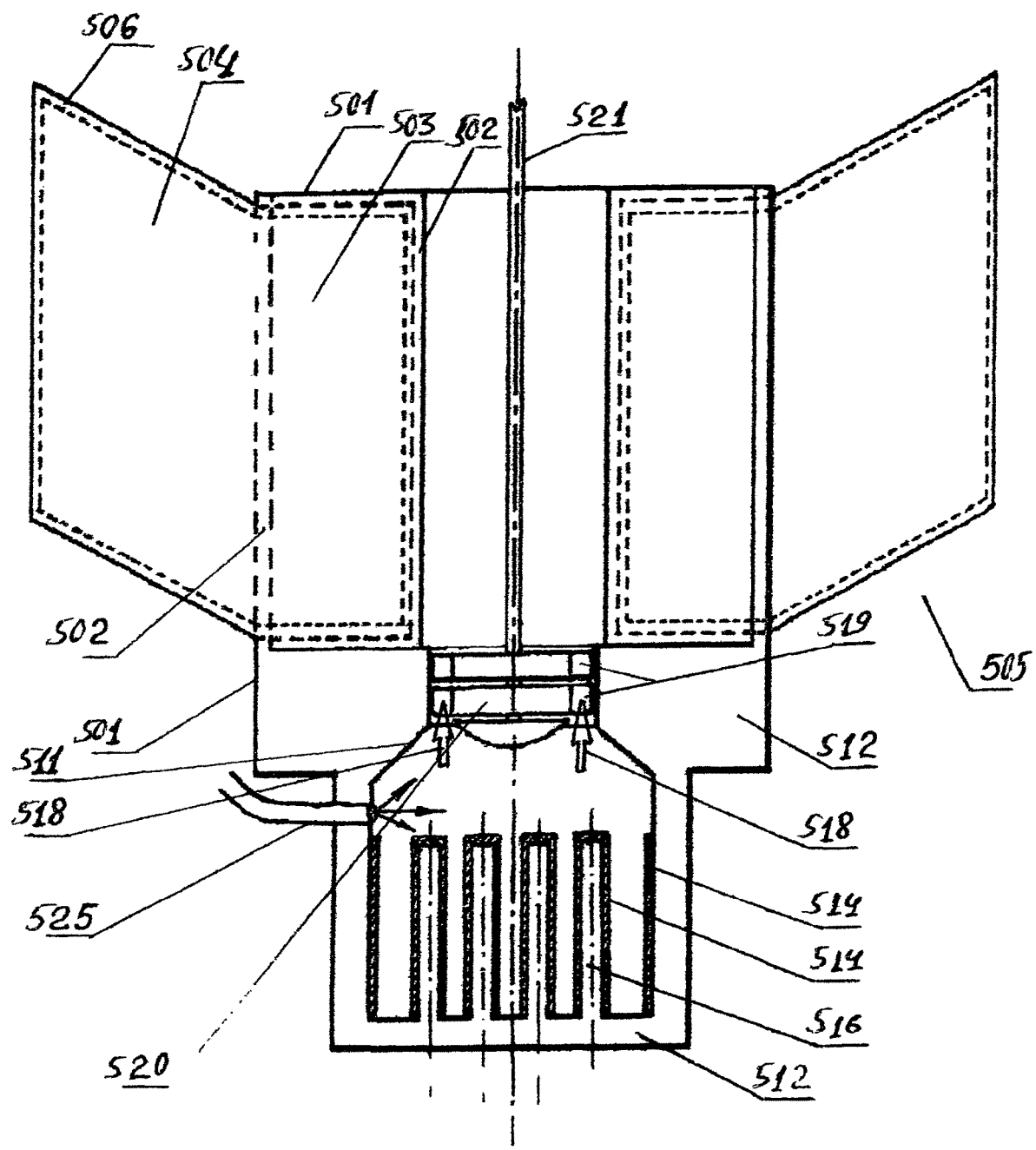
Fig. 5/1

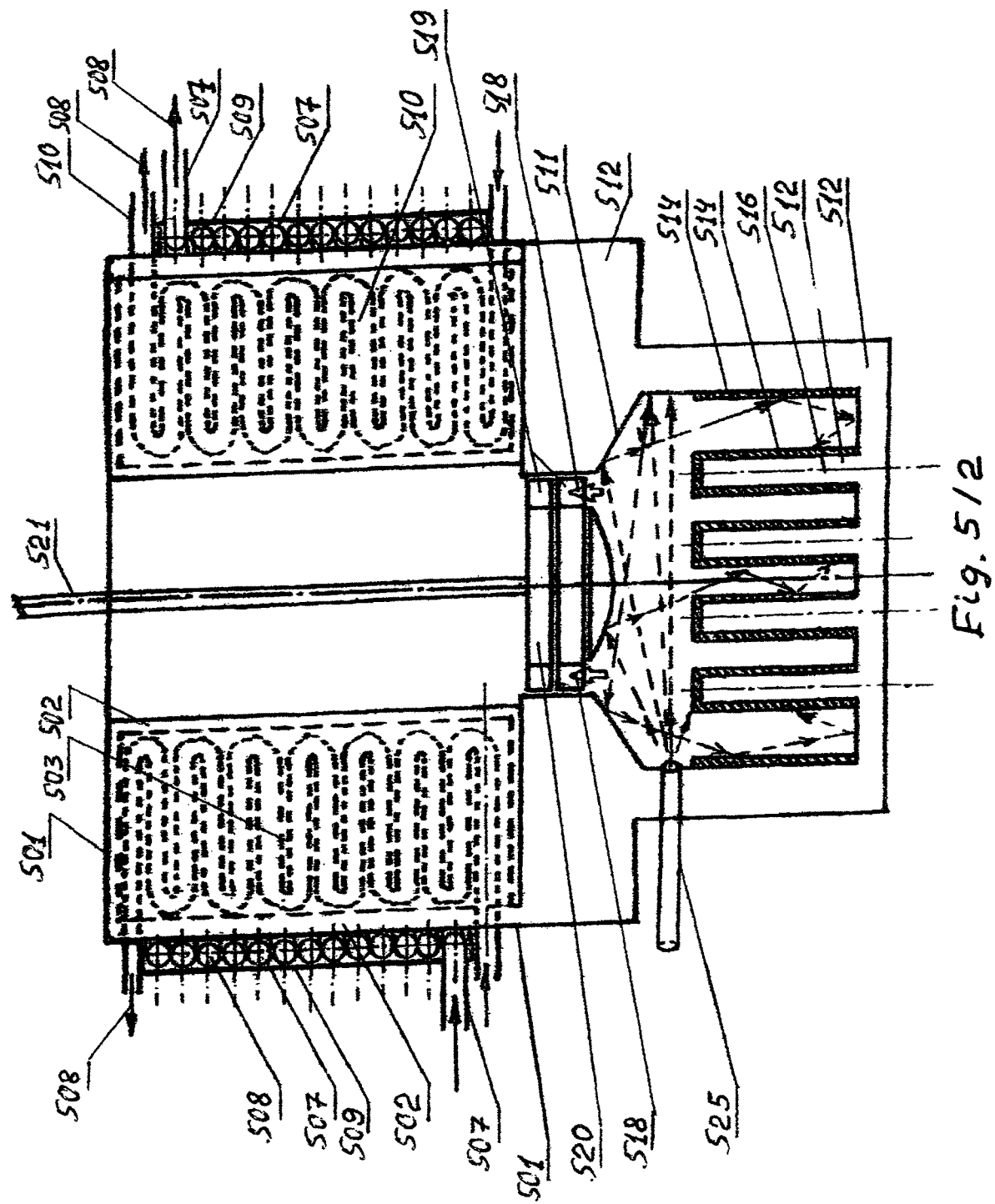

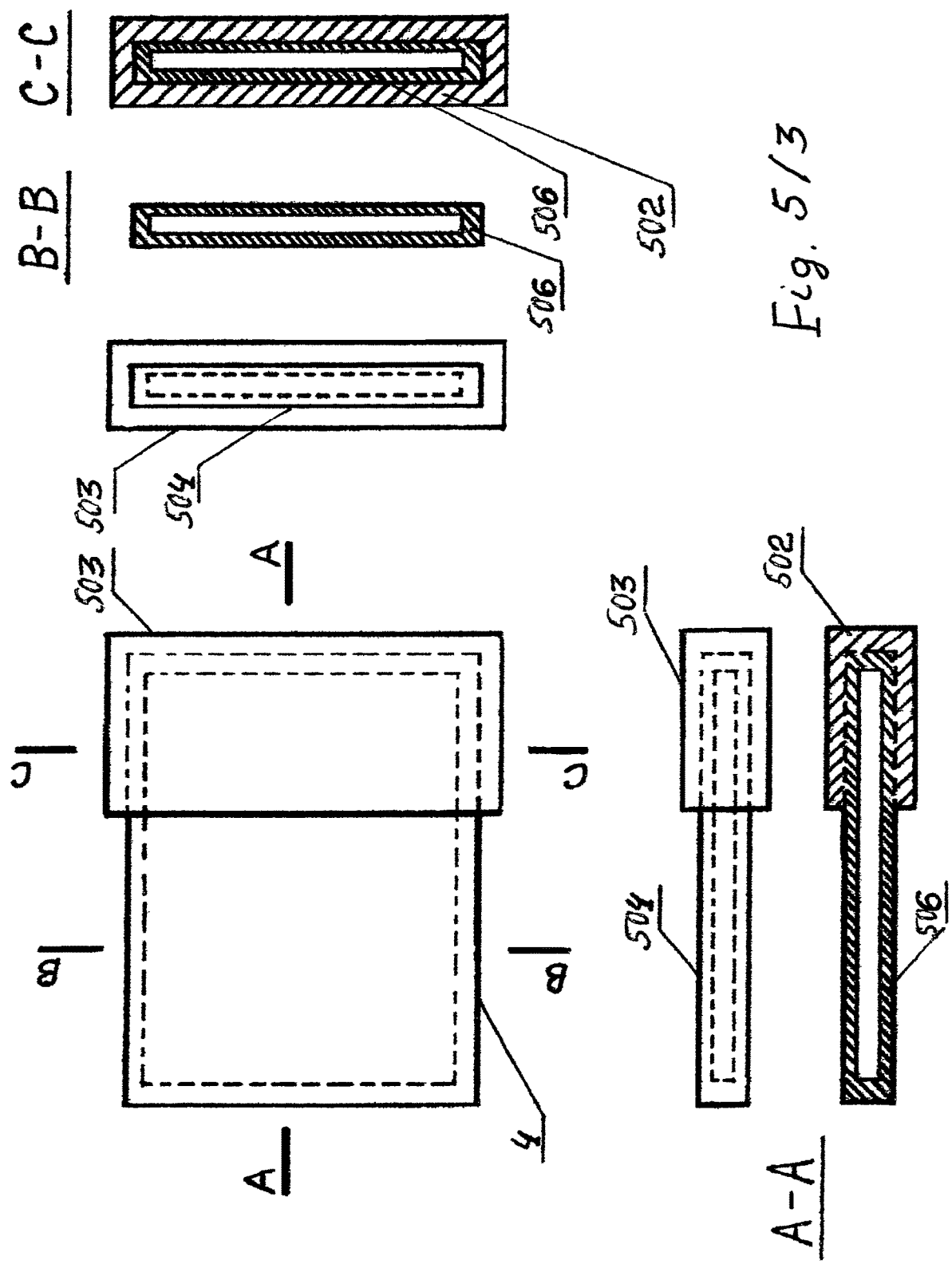
Fig. 5/3

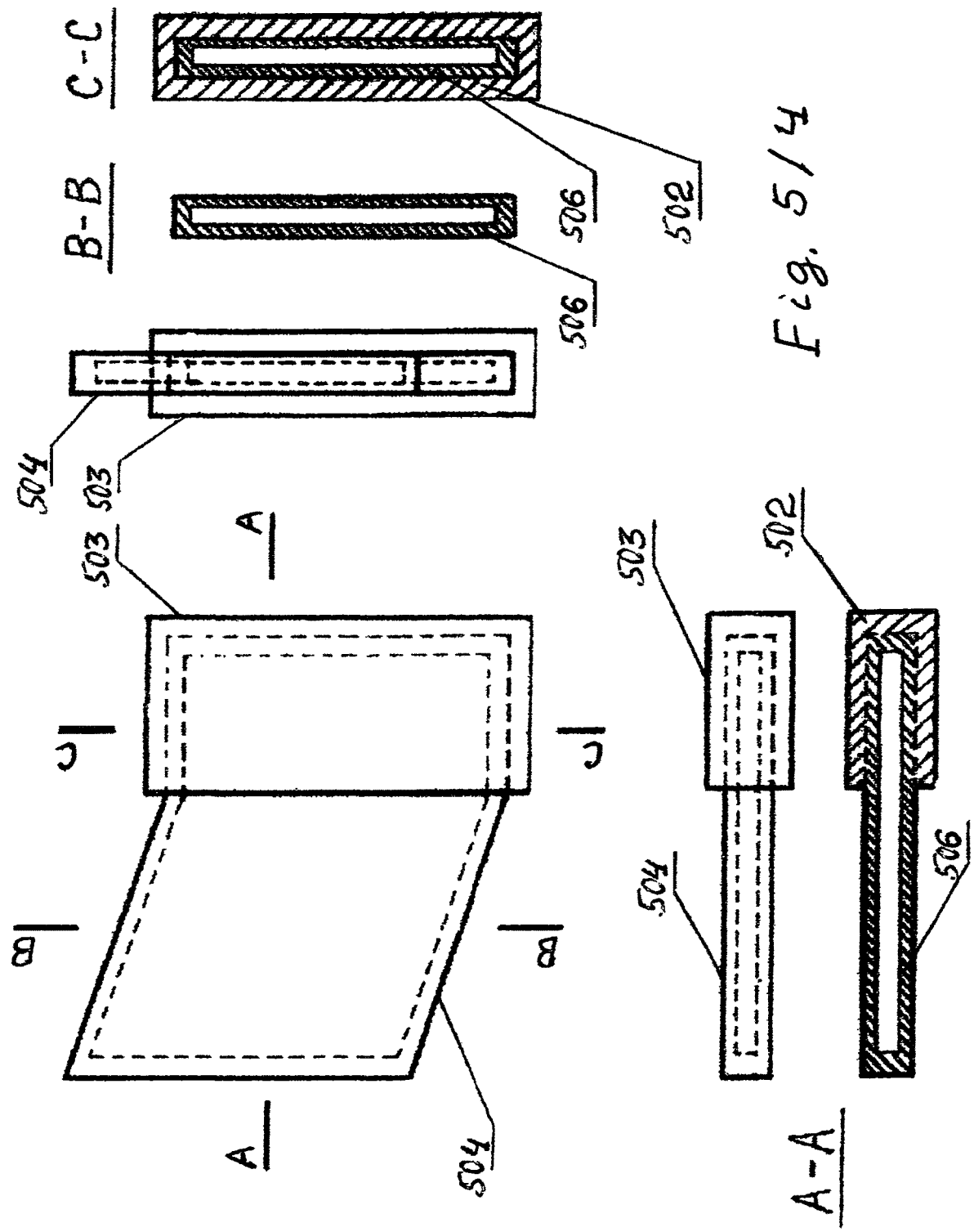

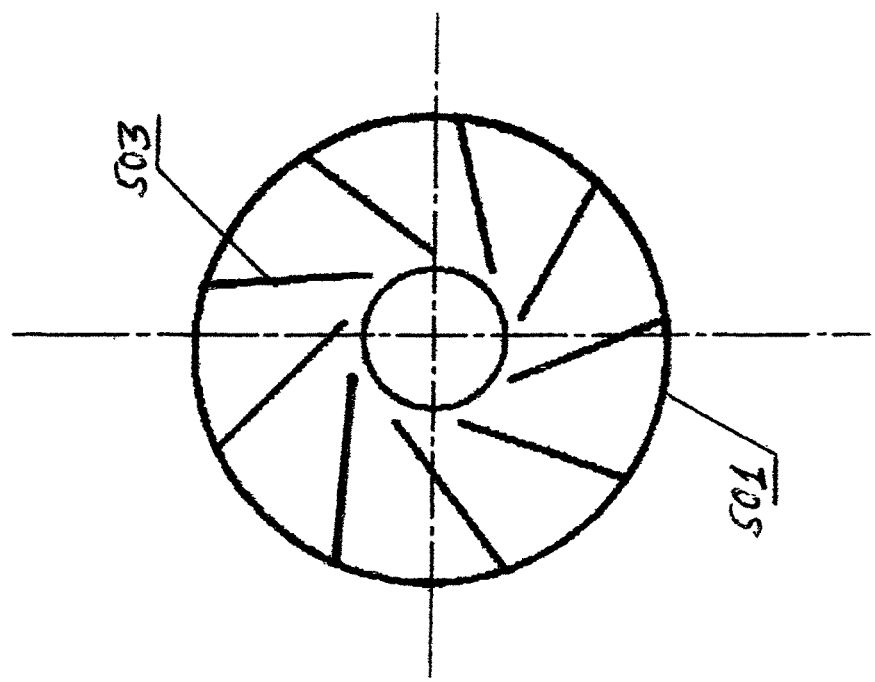
Fig. 5/7
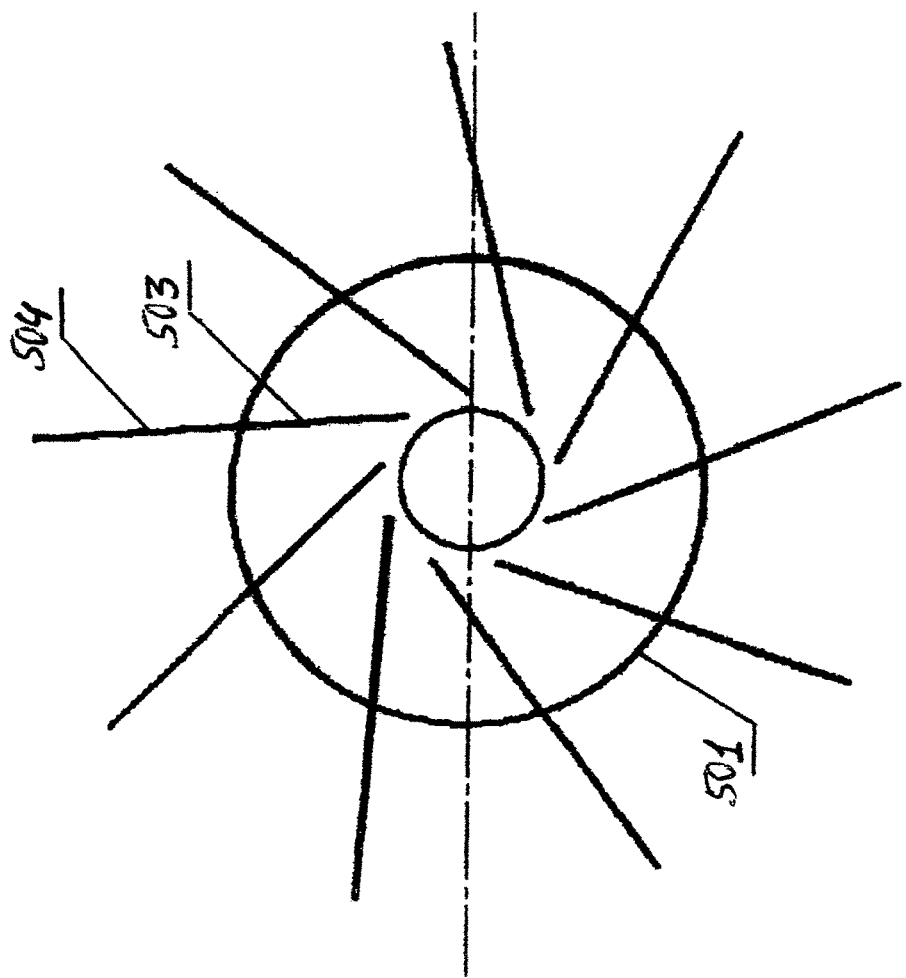
Fig. 5/5

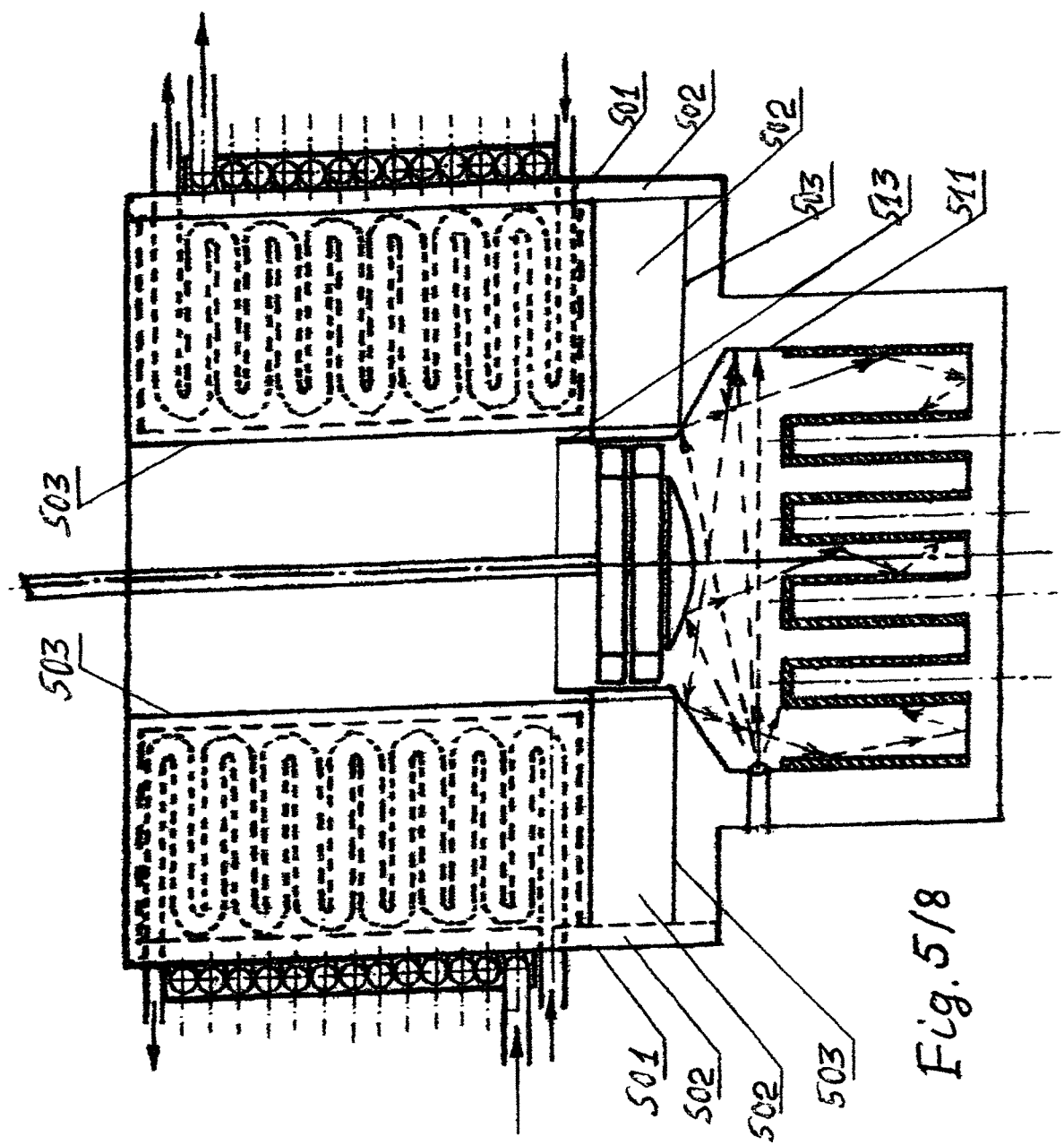
Fig. 5/8

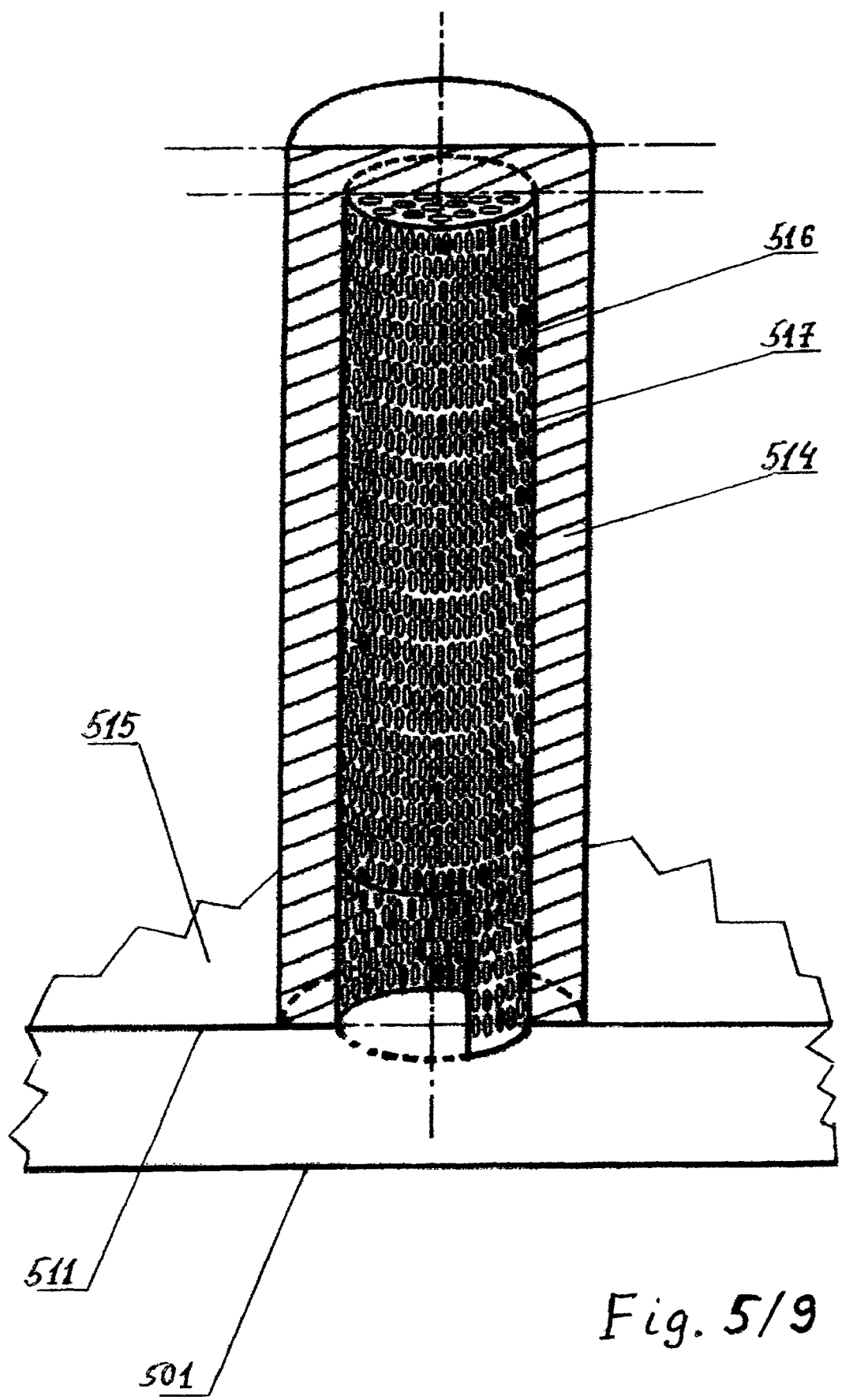
Fig. 5/9

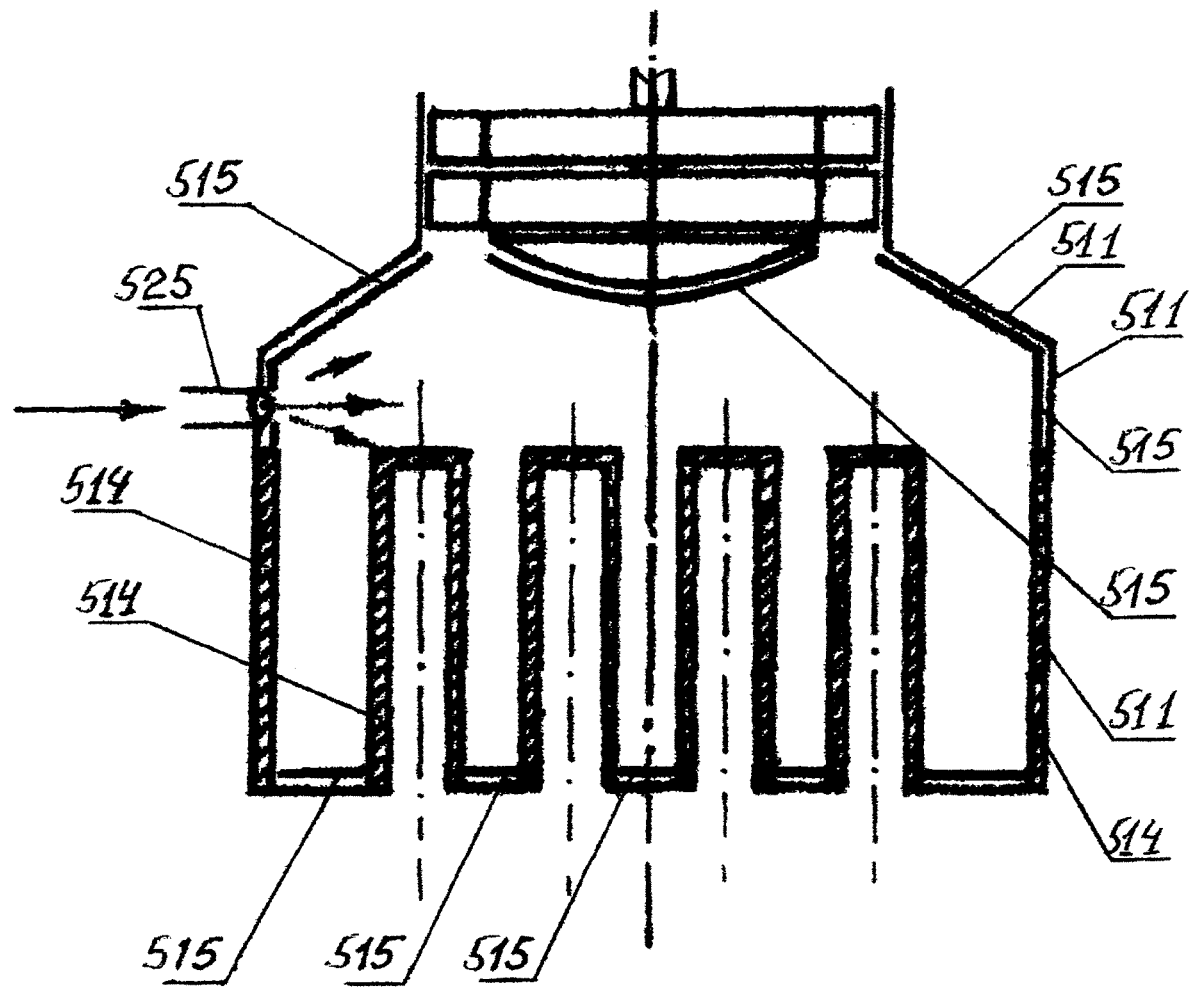
Fig. 5/10

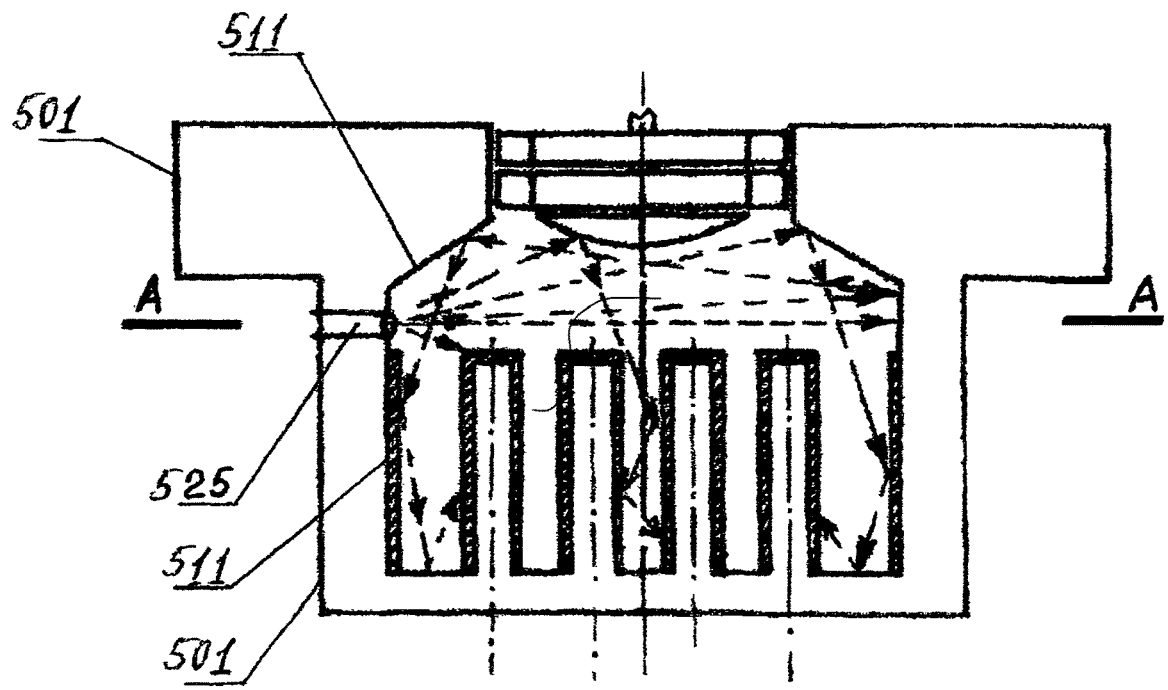
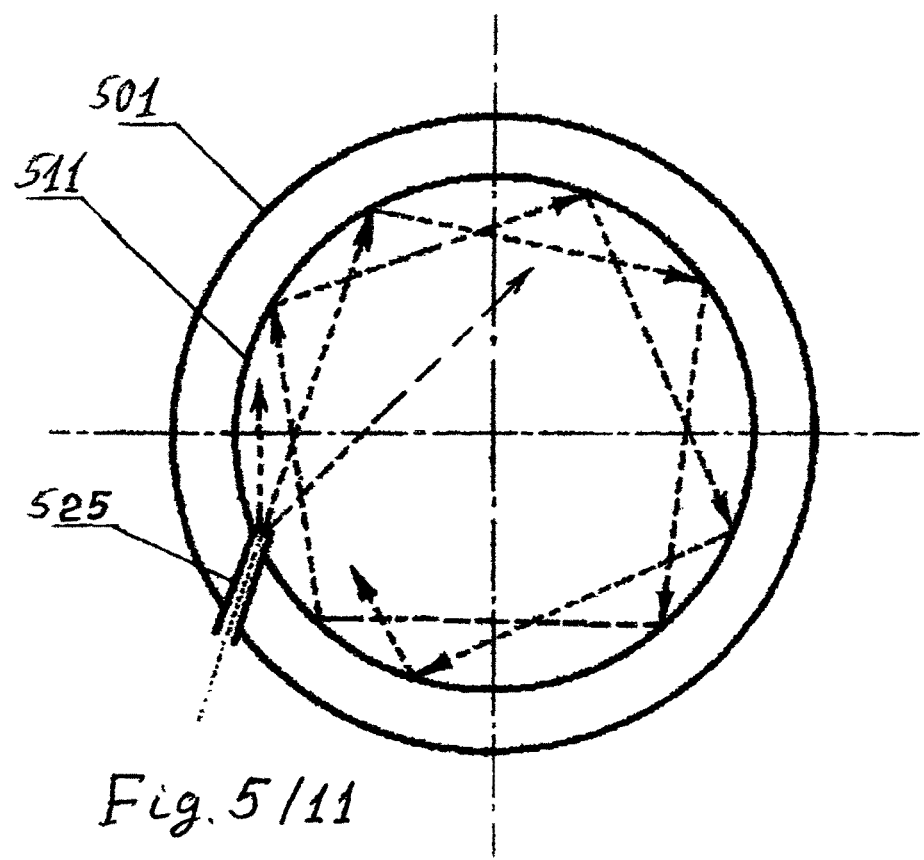
Fig. 5/11

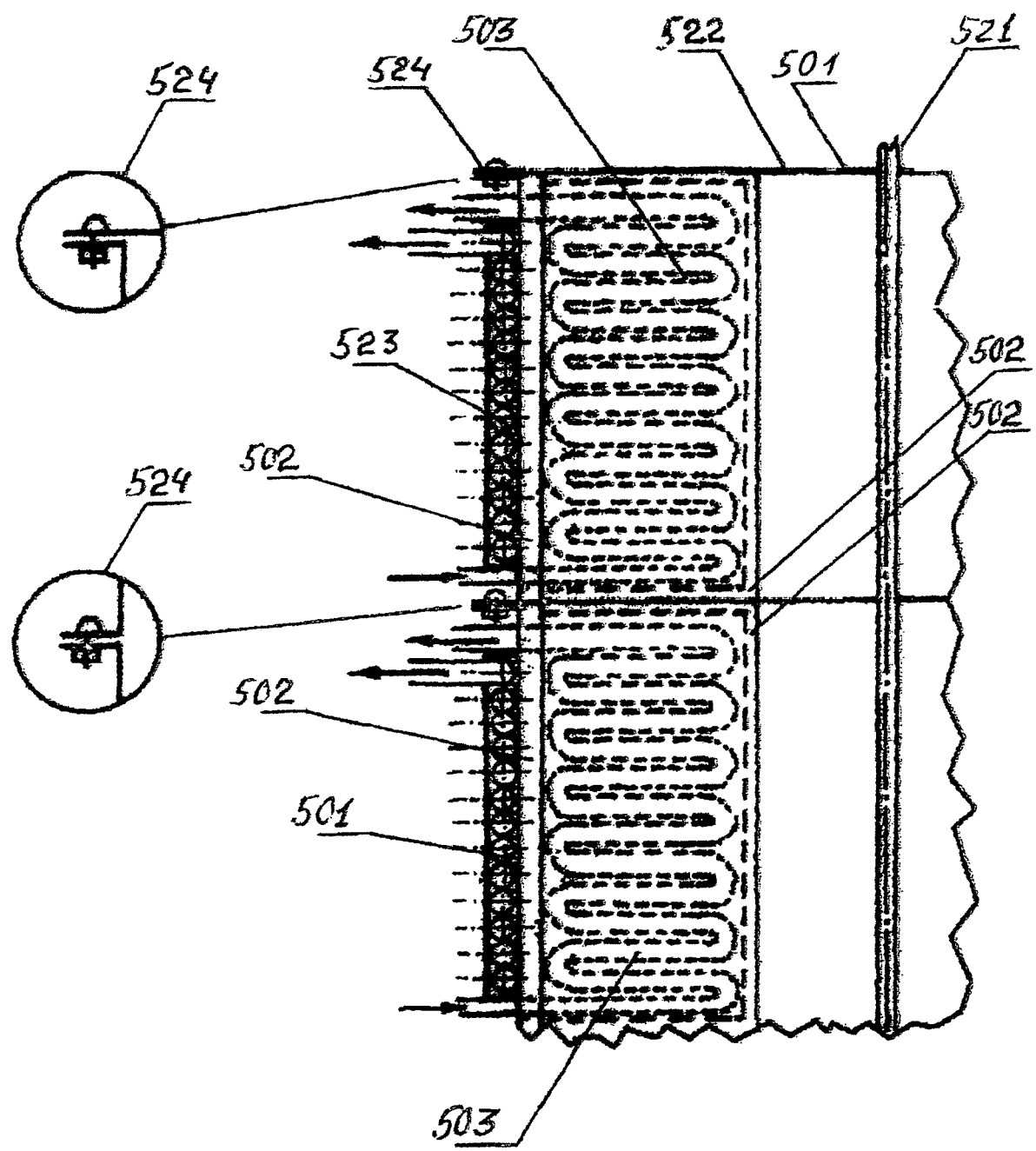
Fig. 5/12

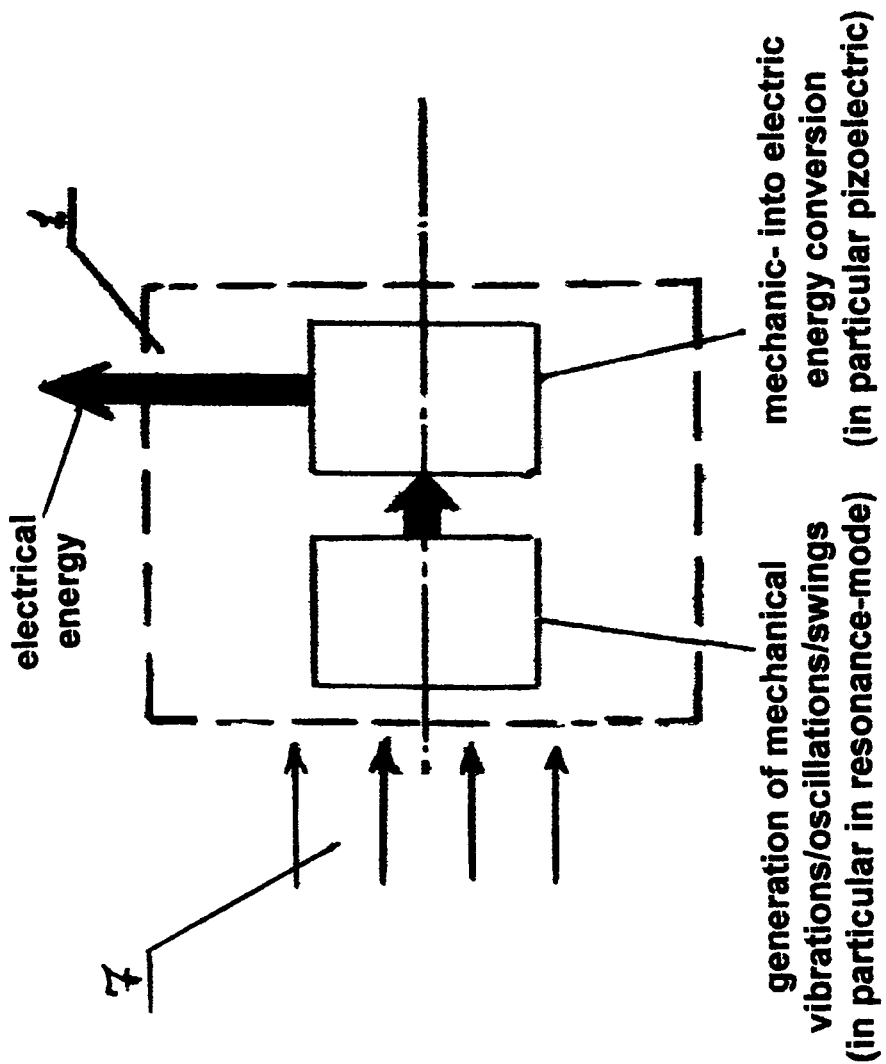

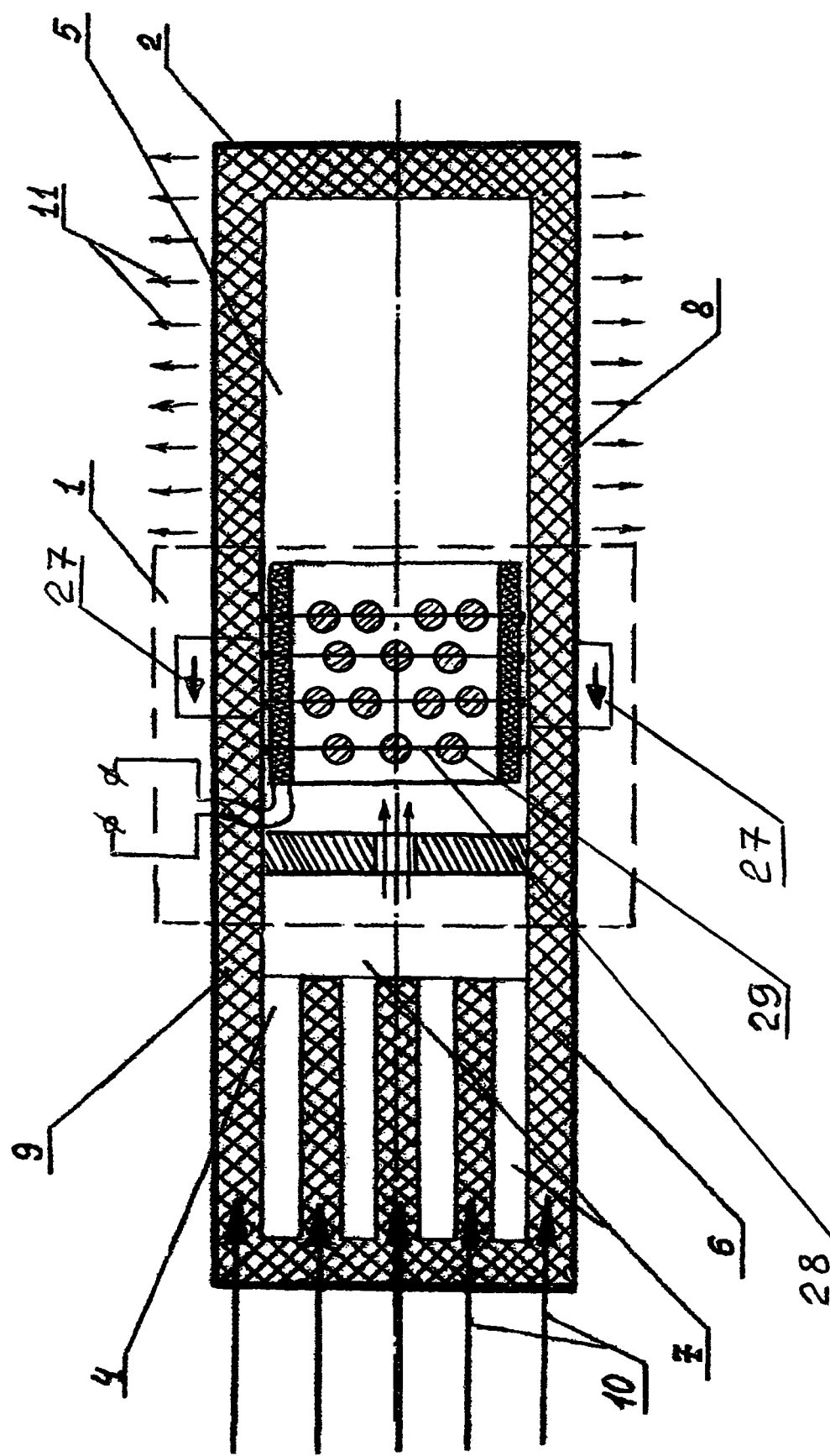
Fig. 6c/A

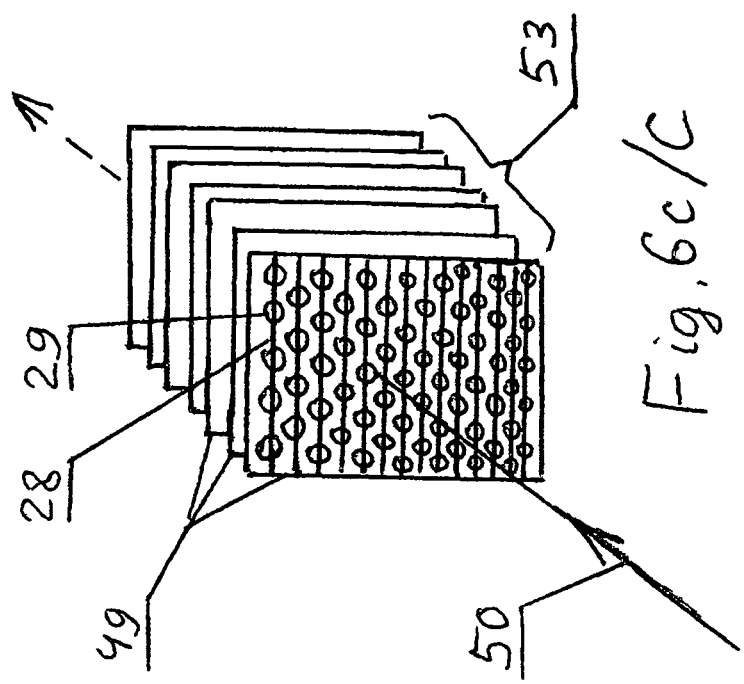
Fig. 6c/C
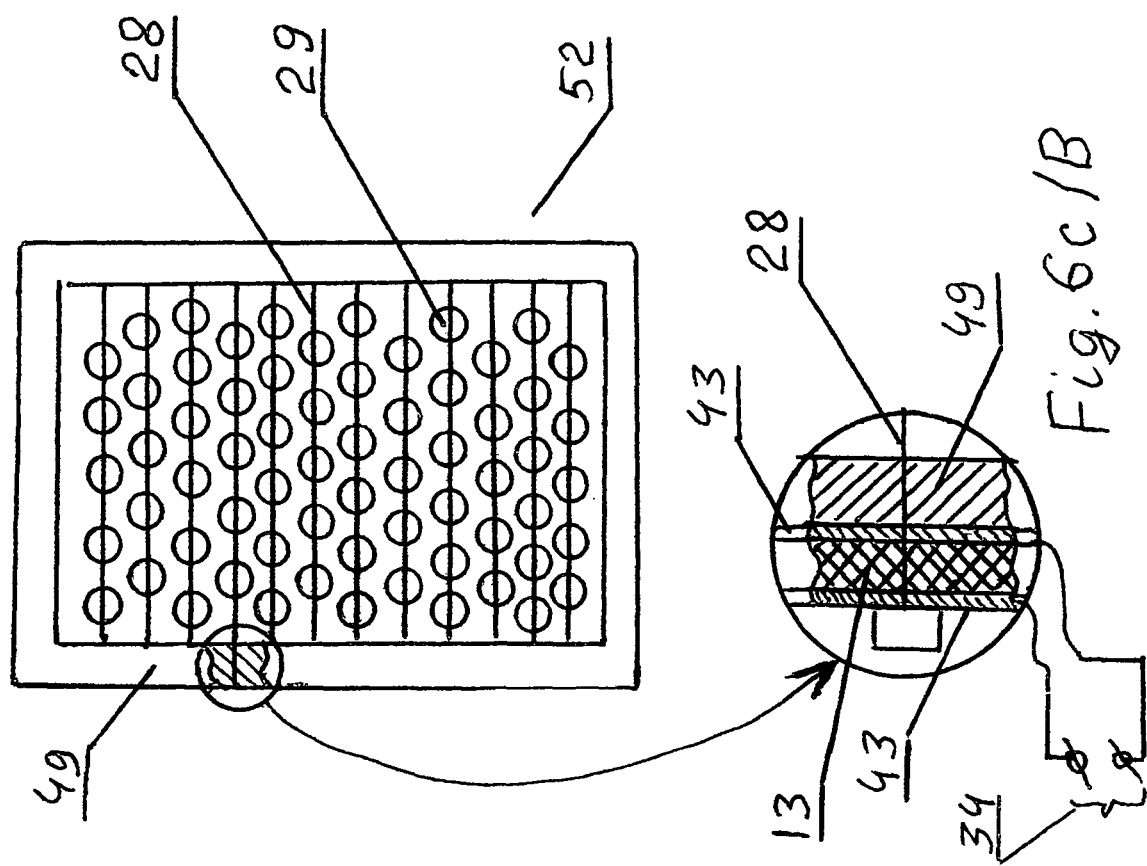
Fig. 6c/B

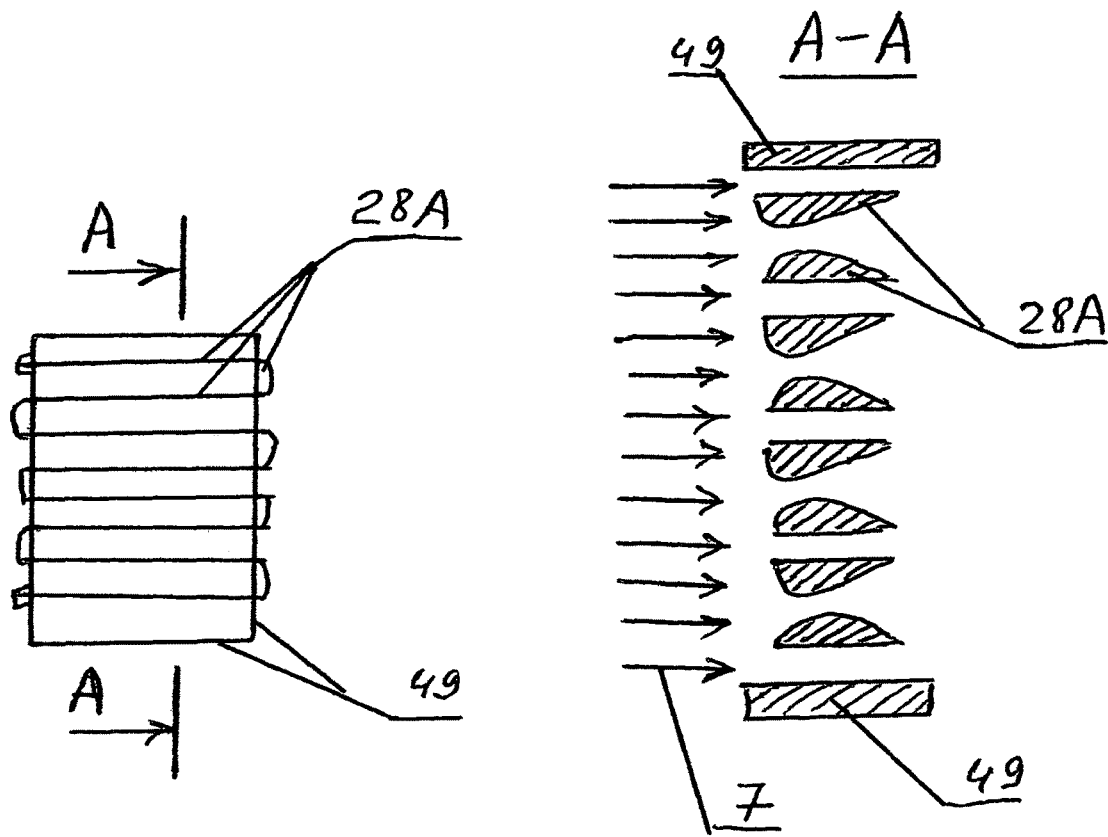
Fig. 6c/D
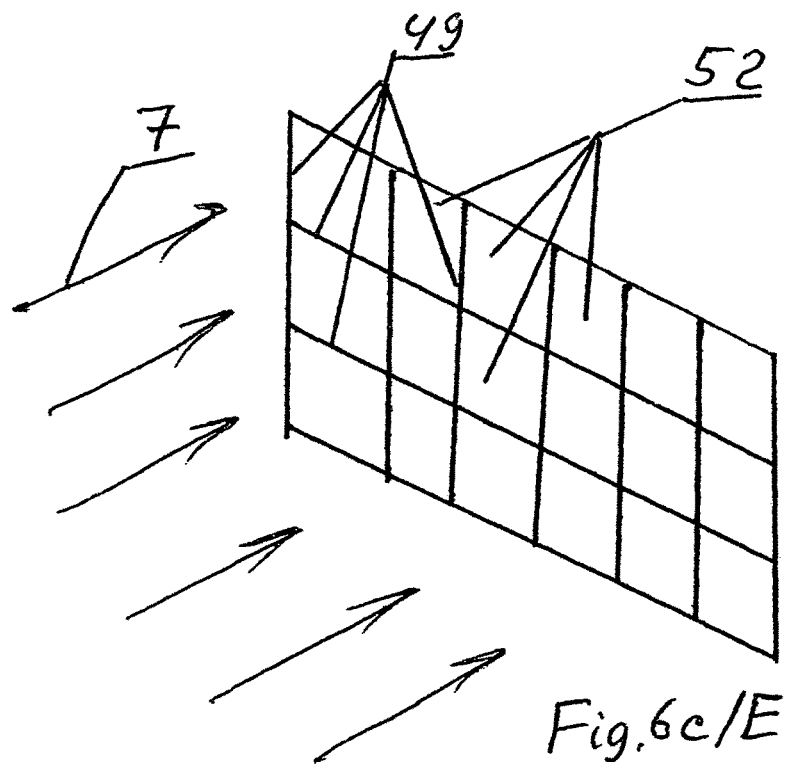
Fig. 6c/E

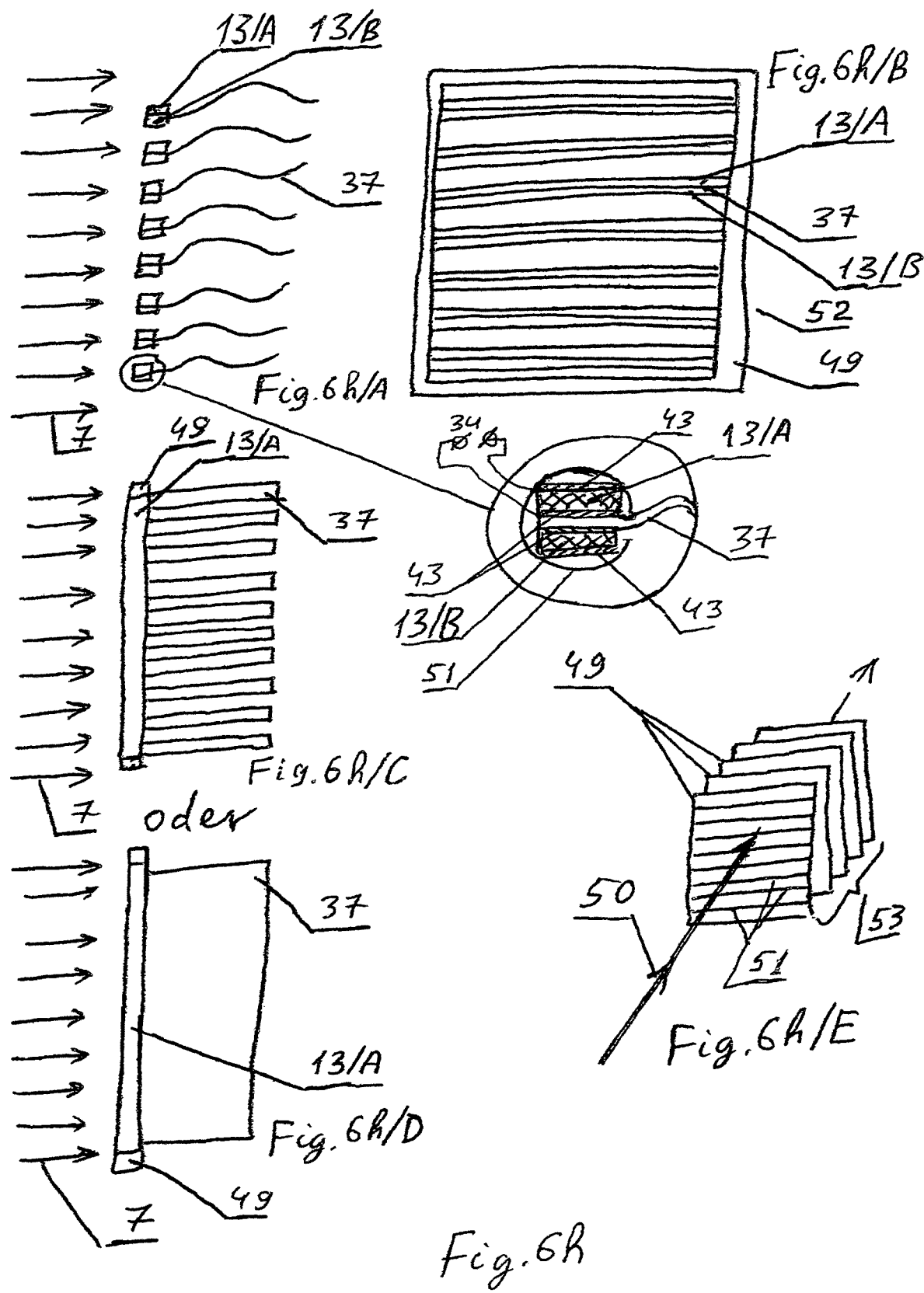

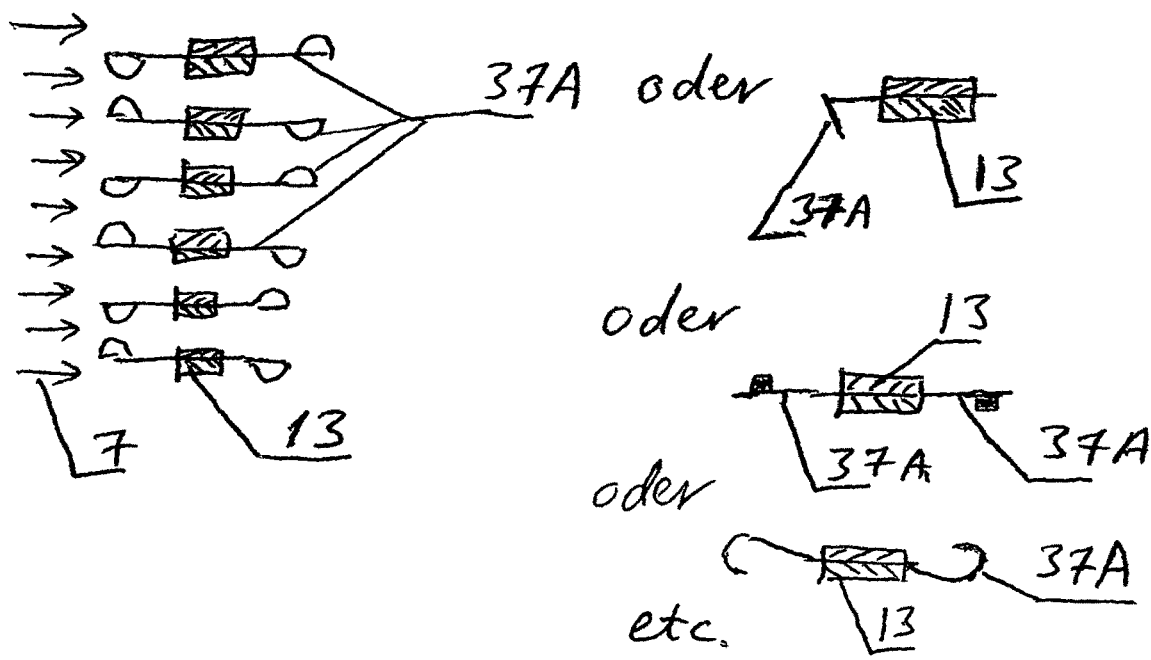
Fig. 6R/F
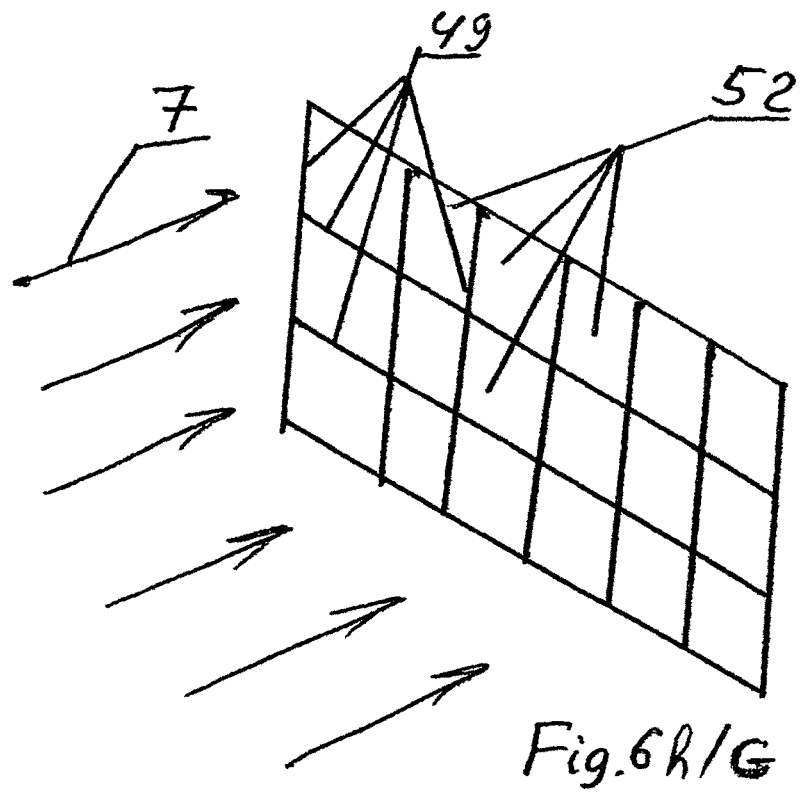
Fig. 6R/G

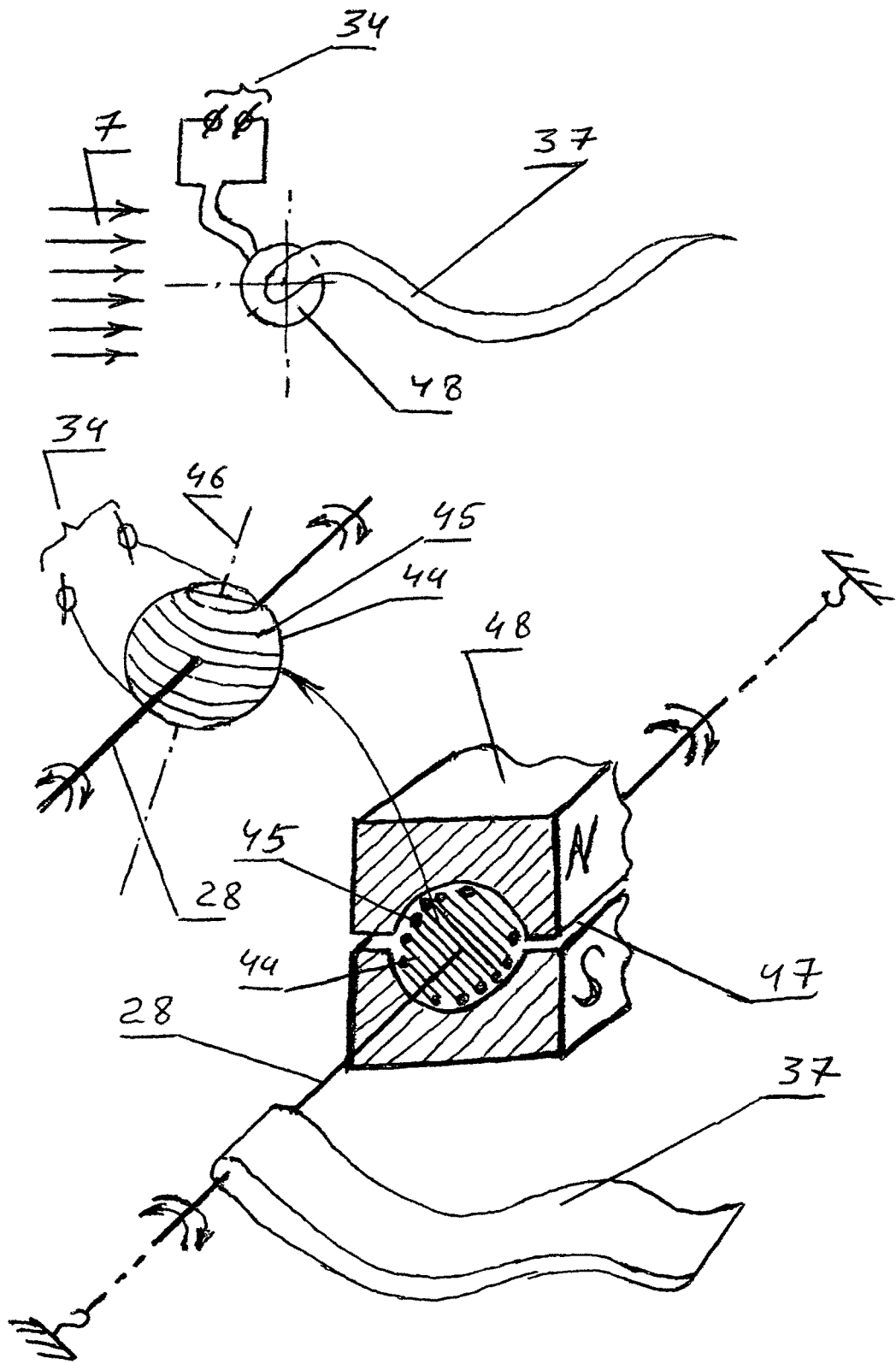
Fig. 6i/A

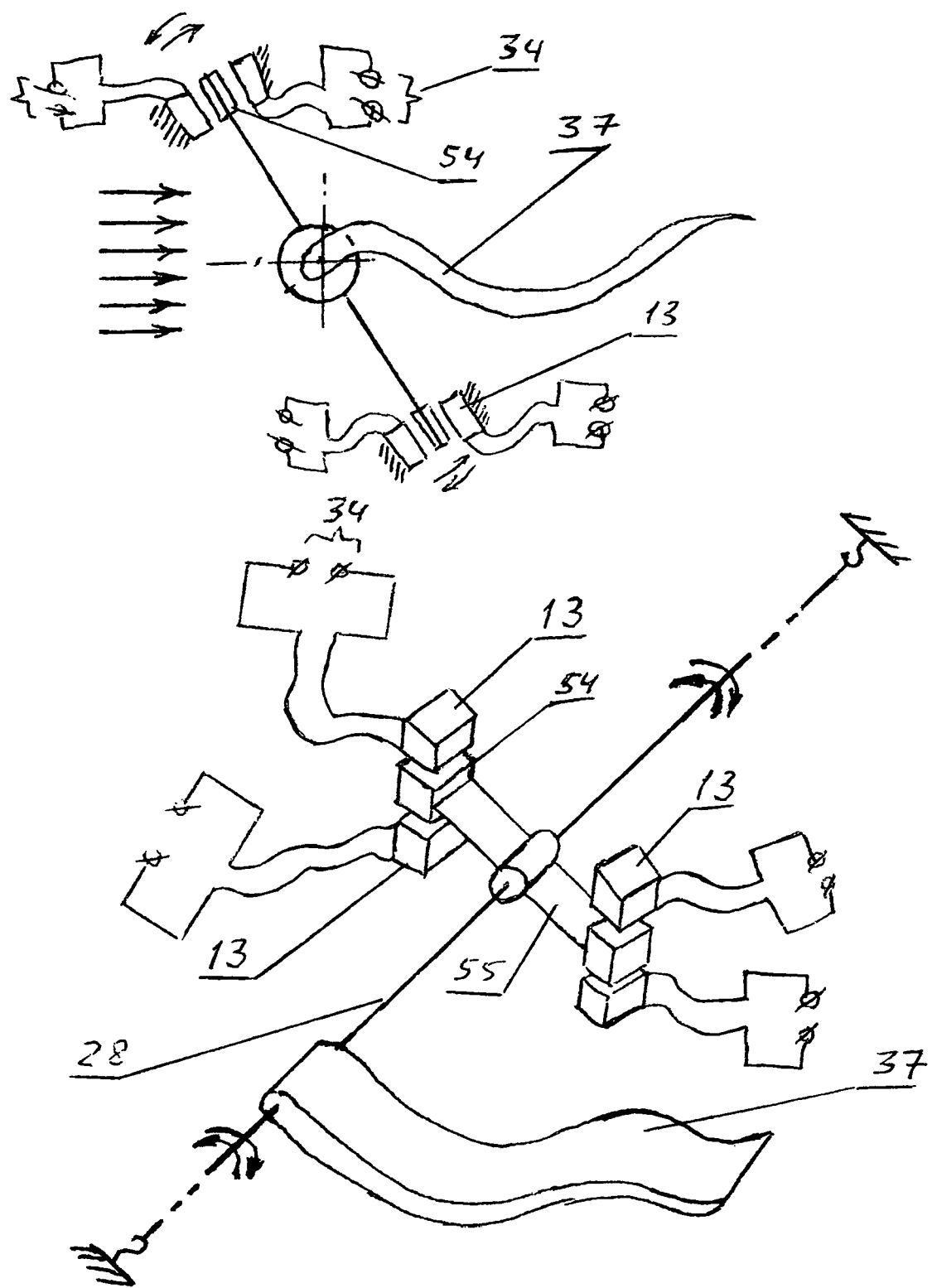
Fig. 6i/B

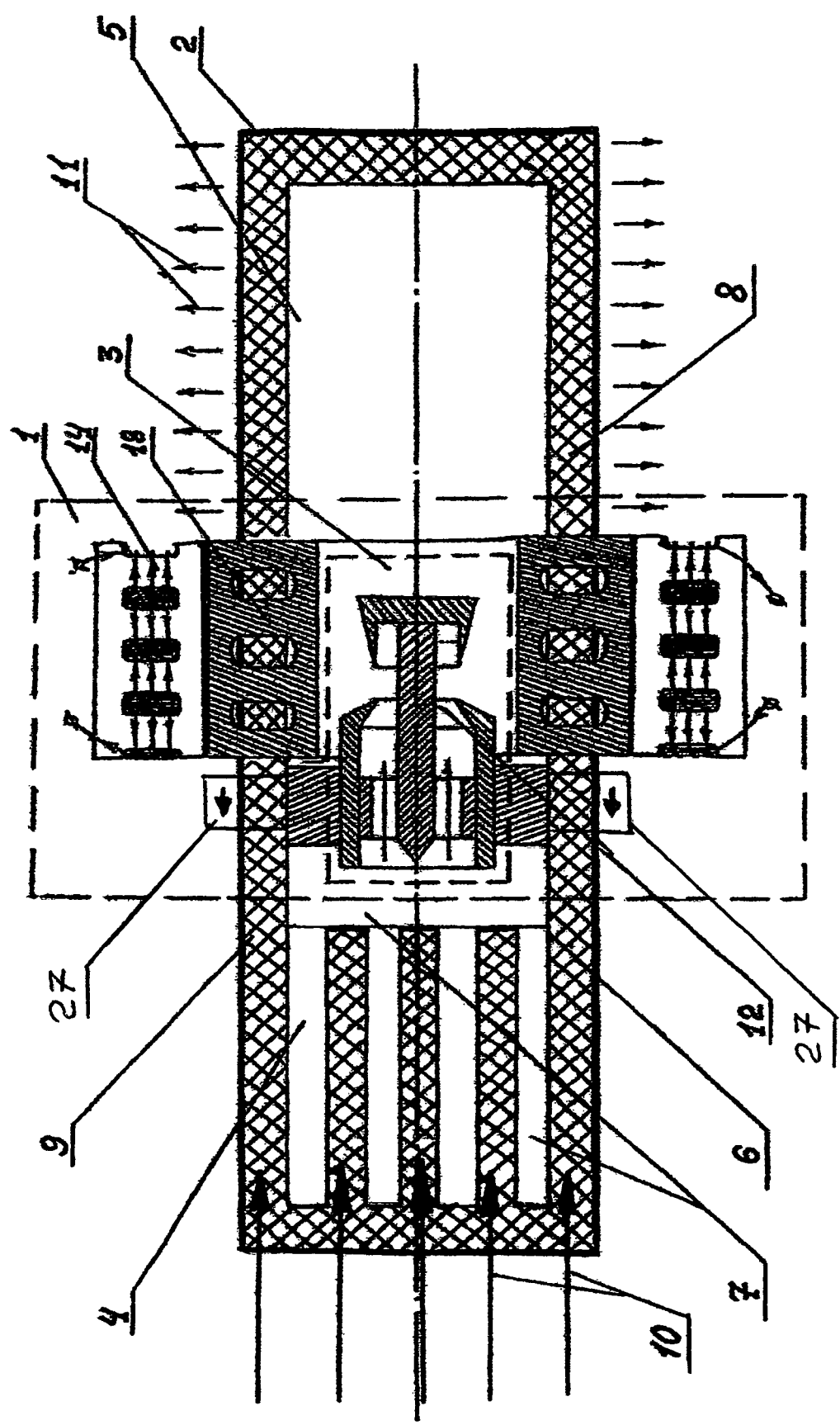

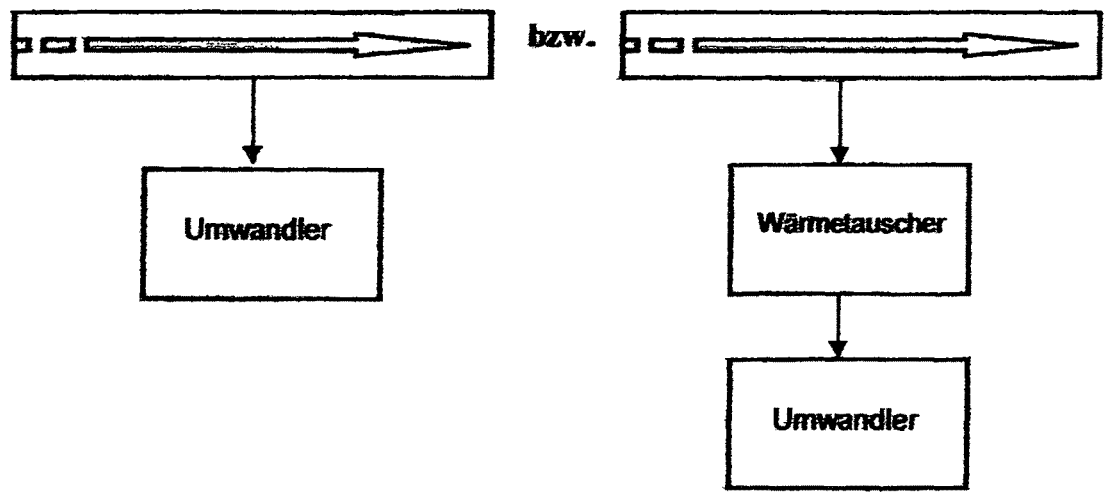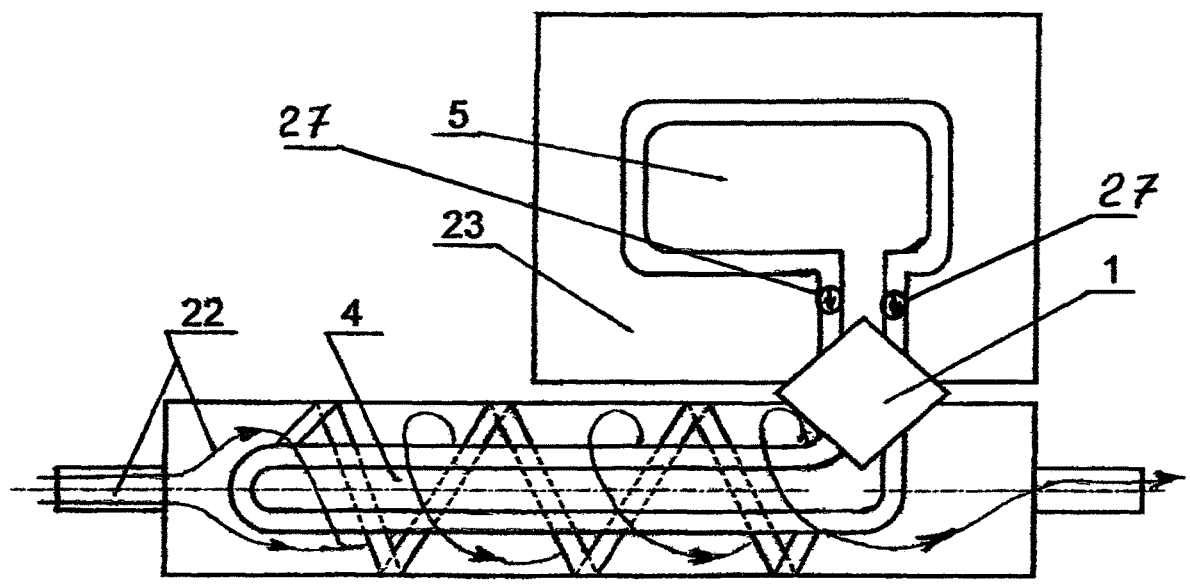
Fig. 11

METHOD AND DEVICE FOR ENERGY CONVERSION

CROSS-REFERENCE TO RELATED APPLICATIONS

This application is a further development of the previous invention U.S. Pat. No. 6,841,891, published Jan. 11, 2005.

STATEMENT REGARDING FEDERALLY SPONSORED RESEARCH OR DEVELOPMENT

Not Applicable

REFERENCE TO SEQUENCE LISTING; A TABLE; OR A COMPUTER PROGRAM LISTING COMPACT DISC APPENDIX

Not Applicable

BACKGROUND OF THE INVENTION (1) Field of the Invention

The present invention relates to methods and devices for energy conversion.

(2) Description of Related Art

The presented invention is a further development of the previous invention according to U.S. Pat. No. 6,841,891, 2005, based on the theoretical principles given in ISBN 3-8288-1255-4, Luchinskiy, A., Renewable energy sources: Complex of technical solutions, Tectum—Wissenschaftsverlag, Marburg, 2002.

The methods of so-called "direct" and "not-direct" conversion of heat energy into electric energy are known. By "direct" methods the heat energy is converted into the electric energy directly and immediate. To the "direct" methods of energy conversion belong for example thermophotovoltaical energy conversion or energy conversion through thermoelectrical Seebeck-phenomenon. By "not-direct" methods the heat energy is converted firstly in an other form of energy, in particular in a mechanic energy, and only finally—in the electric energy. So, there is an "energy conversion chain" in the "not-direct" methods. To the "not-direct" methods of energy conversion belongs a method, which one is executed in all traditional "fossil" heat power stations, as well as in the nuclear power stations. Namely, the heat energy is firstly converted in the mechanic energy, and after that the mechanic energy is converted in the electric energy. To the "not-direct" methods belong also the methods, which are executed in the sun "tower"-type power stations, sun groove ("parabolic trough"-type) power stations, in the Stirling-method, and in our method according to U.S. Pat. No. 6,841,891. A detailed consideration of the above-mentioned methods is presented below.

On actual state of technology the "not-direct" methods of energy conversion are more efficient, than the "direct" methods. Therefore, for example, for the industrial producing of electricity the traditional heat power stations with a mechanic-electrical Faraday-generator are used, instead of a pile of thermophotovoltaic plates, placed in a Furnace.

Furthermore in details. A generally known method of sun energy conversion, namely photovoltaic, is known wherein a sun radiation energy or a light energy can be converted in the electric energy through an absorption of photons in a semiconductor. This method provides a possibility to generate electric energy in devices, which have no mechanically moving parts, no burning of fuels, and no consumption of working materials.

Photovoltaic is efficient and effective in respect to other methods in the cases, where one need a local generation of relatively low electric energy amounts under the condition of relatively low supply of energy in the form of sun light (or light from other sources). For example to use in calculators, parking-automats, for some home appliances with very low electric power, etc. Nevertheless this method is not effective for generation of high power electricity (for example in power stations) already because of the fundamental physical principles, in the reason that only a very narrow frequency range of sun radiation is used, which one leads to the releasing of electrons in a semiconductor.

Therefore the shortcomings of this a.m. method is a relatively low efficiency and high costs, as well as the large dimensions of a converter in respect to the produced electric power. Besides, there is a physical limit of efficiency, which one cannot be exceeded in no case, because the executing this method devices are converting in the electric energy only the energy of photons, which are absorbed in the material of the semiconductor. I.e. only a narrow part of range from all spectrum of the sun radiation can be used. There is also a physical limit for the intensity of coming sun radiation, which one can be usefully used, because the electric output power does not increases more if some definite level of radiation intensity is already attained. Besides, there are numerous inconveniences because of the necessity to protect permanently the large valuable working surfaces from dirt and mechanic damages, wherein the sun light have to fall down on these surfaces direct and unimpeded.

For the utilization of industrial heat wastes the photovoltaic methods are self-evidently not applicable.

A method for energy conversion, named thermophotovoltaic, is known, by which one an infrared radiation is converted in the electric energy by a semiconductor. Considerable attention and investments have been given to this direction of investigations, but there is no industrial using of this method yet. The reason for interest is not only a prospect to use a sun radiation spectrum more efficiently (i.e. not only a visible, but also an infrared part of sun radiation spectrum). As a main prospect of this method could be a possibility to utilize the industrial heat wastes. This last application is not less, but probably even more important one, than the using of sun energy, because presently at least 30-40% of all produced energy has been lost in the form of industrial heat wastes. And besides these energy wastes are acting as heat pollutions.

Nevertheless the extremely high temperatures of the heat source (at least 1000 degrees centigrade) are required for the thermophotovoltaic methods. This temperature is attained by burning of fuels (in the experimental heat generators a gas propane is normally used as a fuel). In output it is approximately 5% efficiency reached, in respect to the input energy of infrared radiation. In respect to an all used energy, i.e. in respect to the all energy, which one was released by burning of fuel, the efficiency is even less.

This method is presently still in the stage of experimental investigations. Besides, there are still no results, which could provide a guarantee that a possibility of industrial usage will be ever reached.

As better developed, in respect to the practical applicability, methods one can mention the thermodynamic methods of conversion of sun energy and heat energy, in particular of the energy of industrial heat wastes, in the electric energy or in other useful forms of energy. Methods for energy conversion are known, over many years, wherein a sun radiation energy is converted in an electric energy by heat solar power stations. In these methods the sun radiation energy is converted in a heat energy of some working body, and this heat energy is converted by some heat machine in a mechanic energy. The produced this way energy is converted then in an electric energy by some mechanic-electric converter.

The common disadvantages of these methods are big energy losses, as well as a necessity to convert a sun radiation energy or heat energy first in a mechanic energy, which fact reduces an efficiency and presupposes an existence of mechanically moving parts in the devices, by which devices these methods are executed.

Furthermore, the "tower"-type and "parabolic trough"-type solar power stations ("Turmkraftwerke" and "Rinnenkraftwerke" have the following disadvantages, which determine the limits of their applicability: first, very high (caused already by the construction principle) intermediate losses because of scattering.

Secondly, also caused by the construction principle, very large dimensions of the system and large total surface area, which one is occupied by a such system. With other words, one can use these systems effectively only in desert regions with the continuously high sun radiation from a cloudless sky, wherein the used plot of land must be cheap to make reasonable an energy supply of a small settlement or of a small industrial object by a big power station, which one occupies a correspondent large land surface area.

And besides, the small local systems are impossible because of construction principles.

On the present state of technology, as a most acceptable for a mass consumption method, among all thermodynamic methods, the Stirling-method is known. The proposed and disclosed in this description technical solution can be set off mainly against the Stirling-method.

The already existing Stirling-method:

Makes it possible mainly the constructions of small, but as well also of middle-large energy converters. (Besides, for comparison, the "tower"-type and "parabolic trough"-type solar power stations, can exist only as large systems; and on the other hand, the proposed in this description our method provides the construction of all "spectrum" of energy converters: both low power systems, which can use already small temperature differentials, both the middle- and high power systems).

Stirling-method has the following advantages, which make it presently the most acceptable energy conversion method in a sun power energetics:

1) Stirling-method provides a possibility to use already small temperature differences. (Some demonstration motors are known, which works from the temperature difference between human hands and environment air).

2) Stirling-method has a theoretically high efficiency of conversion of heat energy, in a mechanic energy.

In the practice however the additional losses occur by conversion in an electric energy. Furthermore, the work processes happen relatively slowly because of the necessary compression and expansion of the working gas, which slowness causes the next losses.

The deciding shortcomings of this method have to be described below more detailed, because these disadvantages are not directly highlighted obvious way in the technical literature about the Stirling-method. Therefore it remains unclear, why such efficient method does not replace all other methods in practice.

Firstly, a significantly low output power is caused already by the construction of Stirling-converter, because in the base of the working processes lay the slow processes of heat expansion and compression of the gas under the temperature, which one is much higher, then a boiling temperature of the working gas.

Secondly, concerning the efficiency: there are normally 3 following misunderstandings in the descriptions, which, as a rule, are not taken into account.

1) The efficiency (EF) is, as it is known, a ratio of useful work $A_{useful}$ to the expended work $A_{expended}$: $EF=A_{useful}/A_{expended}$.

Or also the efficiency is a ratio of useful power $N_{useful}$ to the expended power $N_{expended}$: $EF=N_{useful}/N_{expended}$.

To put this another way, $EF=A_{useful}/A_{expended}=A_{useful}\times t/A_{expended}\times t=N_{useful}/N_{expended}$, where t is time.

I.e. time t cancels out, and an efficiency of a system in this calculation does not depend on a time period, during which this work was executed. This way by this calculation a very high efficiency can be obtained also for devices, which have a negligibly small (i.e. practically useless) power.

2) If it is written, that an efficiency of a Stirling-motor can attain 50%, one normally means the following:

Firstly the case in point is the efficiency of conversion of a heat energy of some heater in a mechanic energy of Stirling-motor, wherein the further losses during the conversion of this mechanic energy in the electric energy are not taken into account.

Secondly, the following hypothetic situation is assumed: Stirling-motor get it's heat energy from a thermo-insulated heater, which one have an infinite heat capacity, and then this Stirling-motor passes the heat rests to a cooler, which one also has the same properties as well. But in fact it is not so. If an energy comes from the sun, simultaneously a back-scattering (re-irradiation) in the space takes place. If an energy comes from an outer heat source, the coming heat energy will not "wait" in a contact zone with a Stirling-motor cylinder all the time, as long as the Stirling-motor working gas will absorb, during it's slow expansion, all the coming heat energy. This a.m. heat energy will be dissipated as well through re-irradiation, thermal conduction and convection. This way the factual losses are high, and the factual efficiency is low, if the process takes a lot of time, and consequently an output power of the converter is also low. Therefore a real efficiency of a Stirling motor is not very high in reality.

3) In order for the diagram-picture, which one describes a work of a sun-driven Stirling-motor, not to differ essentially from the ideal diagram of the Carnot-cycle (Carnot-process), and, consequently, the Stirling-motor to have a high efficiency, this Stirling-motor must work slowly. Slow work means a low output power. This way the requirement to have a high efficiency and the requirement to have a high output power are physically incompatible for a Stirling-motor, and they make contradictory demands on it's construction execution.

It is necessary also to make one note here concerning a parameter, which one at all characterizes a working effectiveness of a sun energy converter. Sun energy in a form of sun radiation is "free of charge". There are no expenses for producing, processing and transport of this energy. The not-used part of this energy does not transform itself in harmful pollutants, which are coming in environment; in the opposite, the used part of this energy is taken off from the natural circulation of the energy in the environment. Therefore in fact an efficiency on its own is not a main parameter, which one characterizes a sun energy converter, and it is not an end in itself to achieve a high efficiency.

One much more important parameter is a ratio of output power of a sun energy converter to it's dimensions (in particular a ratio $N_{output}/S$, where $N_{output}$ is the output power of the converter, and S is the occupied by converter surface area. This parameter is similar to the parameter of efficiency, but these two parameters are not identical. As it was shown above, a converter with a high efficiency can have a negligibly low output power.

For these reasons, i.e. because of the in fact relative low output power and low efficiency, the Stirling-method is not used widely in actual practice.

Our previous method according to U.S. Pat. No. 6,841,891 makes it possible to use for an effective energy conversion also also the heat sources, which provide small temperature differences. Besides, this method provides a possibility to increase the power and efficiency of the energy conversion through reducing of the necessary for conversion time and reducing of the intermediate energy losses (s. description of the U.S. Pat. No. 6,841,891, Int. Kl.$^7$ F02G 1/00, publication year 2005).

The presented there our earlier solutions made it possible to increase an efficiency of the method and to increase a ratio of output power of the converter, which one executes this method, to it's dimensions. It was attained because of maximal usage of a sun radiation energy (on frequency spectrum and intensity), because of minimizing of the energy conversion intermediate loses, and because of removing of necessity to convert a sun radiation energy in a mechanic energy of some mechanic details in an intervening phase. This way a possibility was attained, to execute a producing of electric energy with a high output power and high efficiency in relation to the converter dimensions. It is attained such way, that the proposed design principle of an energy converter is based on the physical bases of the already known heat pipe systems. This converter converts a gas flow energy of a heat pipe working body directly in an other form of energy, finally in an electric energy.

High quickness of energy absorption and energy conversion by a working body, and consequently low intermediate energy losses, more high output power and efficiency by a same temperature difference are attained such way, that instead of the slow processes of heat extension and heat compression of a gas, the method is based on the physical phenomena, which take place by evaporation (vaporization) and condensation of a working liquid on porous structures.

Besides, the devices, which execute the proposed method, must not contain the mechanically moving details of construction. And besides, the concerning invention has a more wide spectrum of applications in comparison with the existing solar- and heat-into electricity converters. It takes place because this method can be embodied both in the low power devices, which can use already the small temperature differentials, and in the middle- and high power devices.

This way these solutions make it possible to increase an output power of a converter also in the cases, when this converter converts heat energy by low temperature differences, and consequently it has low efficiency. It was also shown by the author, that an efficiency and an output power are not the unambiguously correlated parameters. For example, a converter with a high efficiency can, in the same time, have a negligibly low output power. And vice versa, a converter with a low efficiency can, in the same time, have an essentially high output power (ISBN 3-8288-1255-4, Luchinskiy, A., Renewable energy sources: Complex of technical solutions, Tectum—Wissenschaftsverlag, Marburg, 2002 (germ); Luchinskiy, A., Relationship among efficiency and output power of heat energy converters, ArXiv: General Physics/0409017; September 2004.

BRIEF SUMMARY OF THE INVENTION

Aim of the presented in the patent claims invention is to solve a problem of an optimal using of energy sources with low temperature differences through an essential increasing of efficiency. To attain it, one can install a pump of liquid in a recovery loop of a heat pipe working liquid, wherein this pump pumps back the working liquid from condenser to vaporizer by means of an energy, which one is supplied from outside (in respect to the heat pipe), and this way an increasing of a surface area of a thermodynamic contour (or cycle curve) is provided, which cycle curve describes the correspondent thermodynamic process. (Under the "thermodynamic contour" (or "thermodynamic cycle curve") one means here a graphical presentation of a thermodynamic cyclic process. An example of a thermodynamic cyclic process is a Carnot-cycle (Carnot-process) in an ideal case.

This above-described pump for recovery of liquid (or it's separate elements) can be installed in particular in a transport zone of a heat pipe.

Below some general notes are firstly summarized, which are outlining in general the execution principles of the invention. After that the examples of embodiments of invention are presented with references to drawings.

The proposed method is realized in a system, which one comprises a device, which one consists of at least two chambers. These chambers are hermetic, hollow, and they are communicating with each other. Internal surfaces of these chambers are covered with a capillary structure.

One of the chambers is named as a vaporizer, and the other chamber is named as a condenser. Besides, a heat- or sun energy is supplied to the vaporizer. The capillary structure is filled out with a working liquid, which vaporization temperature (condensation temperature) is selected dependently on the working conditions, i.e. on the temperatures, in which the vaporizer and the condenser are placed. In the vaporizer an abrupt increasing of volume and pressure of the working body takes place as a result of a vaporization of this working body on a pore structure (capillary structure). In the condenser an opposite process takes place. This way in two nearby to each other located chambers continuously (uninterrupted) two opposite processes run. These processes are explosion- (implosion)-kind on their characteristic features, and opposite on their sign: one of these processes is an abrupt increasing of volume and pressure of a working body (gas), and the second one is, oppositely, an abrupt decreasing of these characteristics.

This way an abrupt pressure differential between two chambers takes place, which one cuses a gas flow through a neck between two chambers.

For the further increasing of this pressure differential under the same temperature differences the capillary structures in different chambers are different (explanation s. above).

To increase an area of thermodynamic contour (s. above), two following measures simultaneously are executed:

1) the gas from vaporizer (high pressure region) is guided in a condenser (low pressure region) through a narrow neck (or many necks or holes), wherein a neck diameter (or summed area of holes) is essentially smaller, then dimensions of cross-sections (or cross-section diameters) of the vaporizer chamber and of the condenser chamber; and 2) a pump for liquid (or separate parts of this pump) is installed in a heat pipe working liquid recovery loop, wherein this pump pumps the working liquid from the condenser back to the vaporizer by means of an energy, which one is supplied to the heat pipe from outside (in respect to the heat pipe).

Simultaneously the process is intensivated (i.e. the same amount of energy is converted during a more short time), with the aim to increase an output power by the same efficiency.

This way an abrupt pressure differential between two chambers takes place (s. above), which abrupt pressure differential causes a gas flow through a neck between two chambers. The energy of this high-speed (in particular also supersonic-speed) gas flow can be efficiently (i.e. with relatively small losses) converted in other useful forms of energy, in particular in an electric energy. In the presented description several different further-developments of this method for this conversion are disclosed, wherein each further-development is presented dependently on the field of application and aims of application of the converter.

In some embodiments examples (s. also some of the examples below) a gas flow between the vaporizer and condenser of a heat pipe on the one hand, and a liquid flow from the liquid recovery pump on the other hand, takes place in the different working phases of the energy converter. I.e. firstly a gas flow flows from the vaporizer to the condenser, and during this time (phase) the pump for liquid recovery does not pump the working liquid from the condenser back to the vaporizer. And after that the pump for liquid recovery pumps the working liquid from the condenser to the vaporizer, and during this time (phase) no gas flow from the condenser to the vaporizer takes place.

In the invention a principle "$S_{boundary}/S_{perimeter} \gg 1$" (s. above) is executed, i.e. an energy is supplied to- (or is removed from) the the whole mass of the working body simultaneously, but not only to- (or from) the surface perimeter of the space volume, where the working body is located. It gives a possibility 1) to increase essentially the power of the device, and 2) to reduce essentially the energy losses through shortening of a time for an absorption- and for a further conversion of the supplied energy by a working body.

It is executed for example such way, that a sun energy is supplied directly in the capillars of a wick, or in the material of the wick. This way a very large surface area of the energy transferring boundary between the wick material and the working liquid is "packed" in a small volume, which one is occupied by the wick of a vaporizer. Besides, a sun energy, which one was not absorbed by the working liquid immediately, does not go away from the system, but spreads itself by multiple reflections along a boundary between the wick material and working liquid, and finally this energy is completely absorbed by the working liquid. This circumstance reduces essentially the energy losses too.

Sun energy is supplied to a vaporizer through a radiation guide. This radiation guide can be essentially long, and therefore an energy converter can be placed directly near to a cooling medium, and moreover, in the place of a minimal cooling medium temperature. For example, in an ocean water, or in a deep water in a certain depth, or in subsoil waters. In the last case the radiation guide can be placed in a borehole. It gives possibility to increase a temperature difference between the vaporizer and condenser, and consequently, finally, also an efficiency and output power of the device.

Sun energy is supplied in a radiation guide in particular by means of sun concentrating devices, in particular by a Fresnel-lens or by Fresnel-mirror, or by these two methods simultaneously.

The sun energy (or radiation energy) can be supplied through a long radiation guide (s. also below) also to any other heat machine, which one (heat machine) is placed in a water, in particular in essential depth.

In the case if the method is used for utilization of heat wastes, a thermal (heat) energy is supplied to the vaporizer.

Method can be used in a nanotechnology (in a microsystem technique) for the energy supply or control of microscopic devices and systems, as well for creation of microsystem energy converters, which are comprising many microscopic modules, and which can be used for macroscopic general technological purposes, i.e. for operation of usual macroscopic equipment, wherein the a.m. realization of microsystem energy converters is executed by means of nanotechnologic methods (in particular for example by a LIGA-Method).

Microsystems for the creation and formation of a fluid flow, as well the components for any operations with liquids and gases in a micro-technique, as well methods of technological producing of these microsystems, are known.

Therefore a new development of a technological base for the constructive realization of the proposed in this invention method and devices is not necessary.

As one often occuring case, one have to highlight separately a case of utilization of industrial heat wastes, which heat wastes are contained in a flow of some definite gas or liquid. In this case the heat pipe vaporizer is placed in this flow, and the heat pipe condenser is placed outside this flow in thermal contact with a cooling medium. Or the "heat pipe"-tipe energy converter is placed completely outside of this a.m. flow, and an energy of this flow is supplied to the heat pipe vaporizer by means of some heat exchanger.

Under the term "vaporizer of a heat pipe" one means here (besides the known canonical definition) any kind of chamber (or many chambers) for vaporization or for evaporation or for any kind of a phase transition from liquid to gas, wherein the vaporization- (evaporation-, phase transition-) surface is essentially developed, and a surface area of this surface is much more larger, then a surface area of a perimeter surface of the a.m. chamber, i.e. then an area of a perimeter surface, which one contains a volume with the a.m. chamber (or chambers).

This way this definition covers also an embodiment example, which one is shown schematically in a FIG. 14, wherein the heat pipe working liquid is injected or supplied other way inside the vaporizer, and then this working liquid is vaporized (or is evaporated) on a large, essentially developed surface, wherein this a.m. surface is heated by means of an outer heat energy source, in particular by means of a sun radiation energy, which one is supplied inside the vaporizer by means of a radiation guide.

BRIEF DESCRIPTION OF THE SEVERAL VIEWS OF THE DRAWINGS

Some examples of embodiments of the invention are presented schematically in the drawings and described below.

(Only that information is presented by the drawings, which one it was difficult to describe definitely clear with the words in the frames of this description.)

Figure 1A:
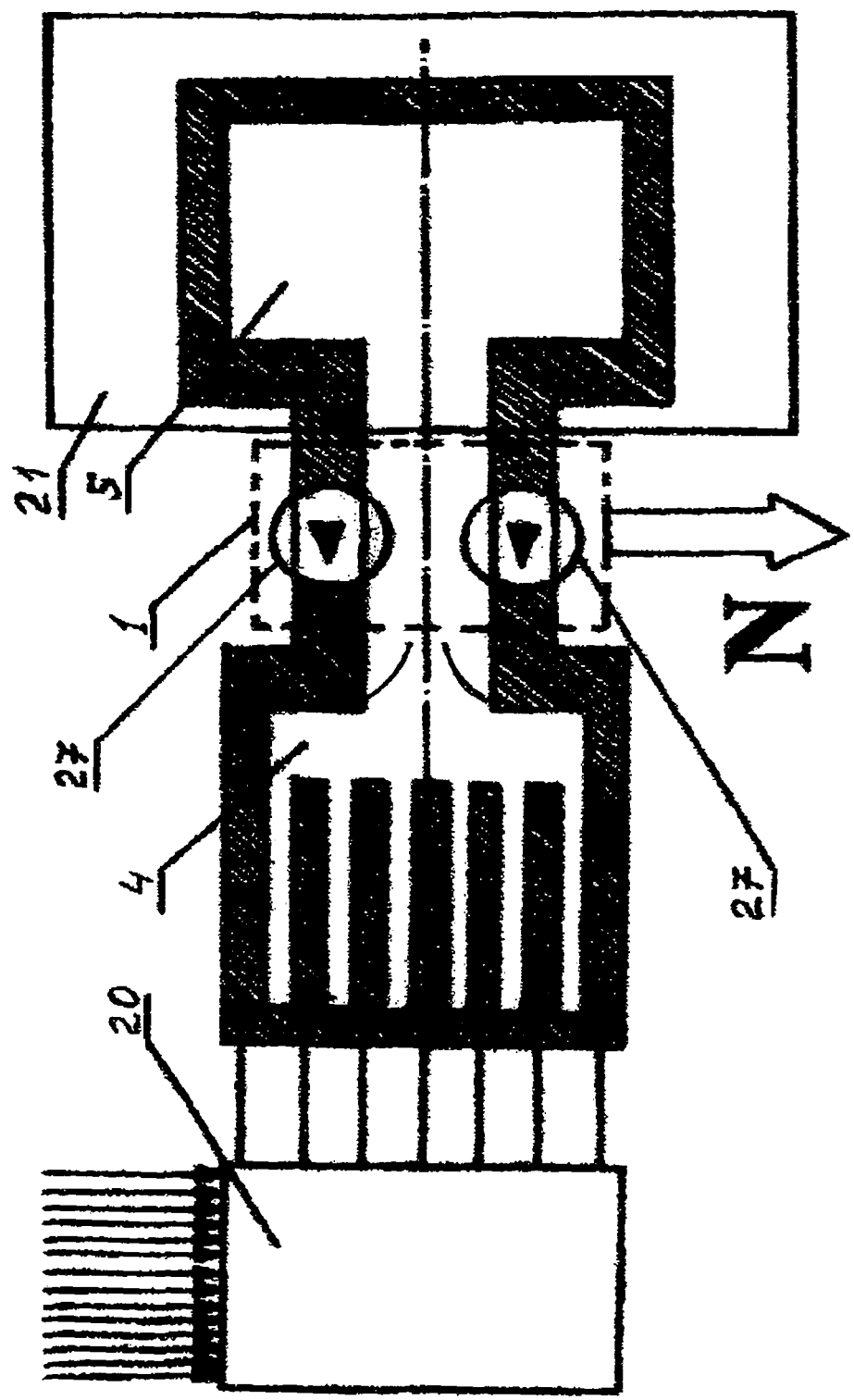

It is shown:

FIG. 1a: an illustration of a general scheme of the method realisation in one embodiment example.

FIG. 1b: an illustration of a general scheme of the method realisation as a diagram.

FIG. 2: a schema of the method realization in comparison with the Stirling-method.

FIG. 3a: an embodiment example of a heat pipe.

Figure 3B:
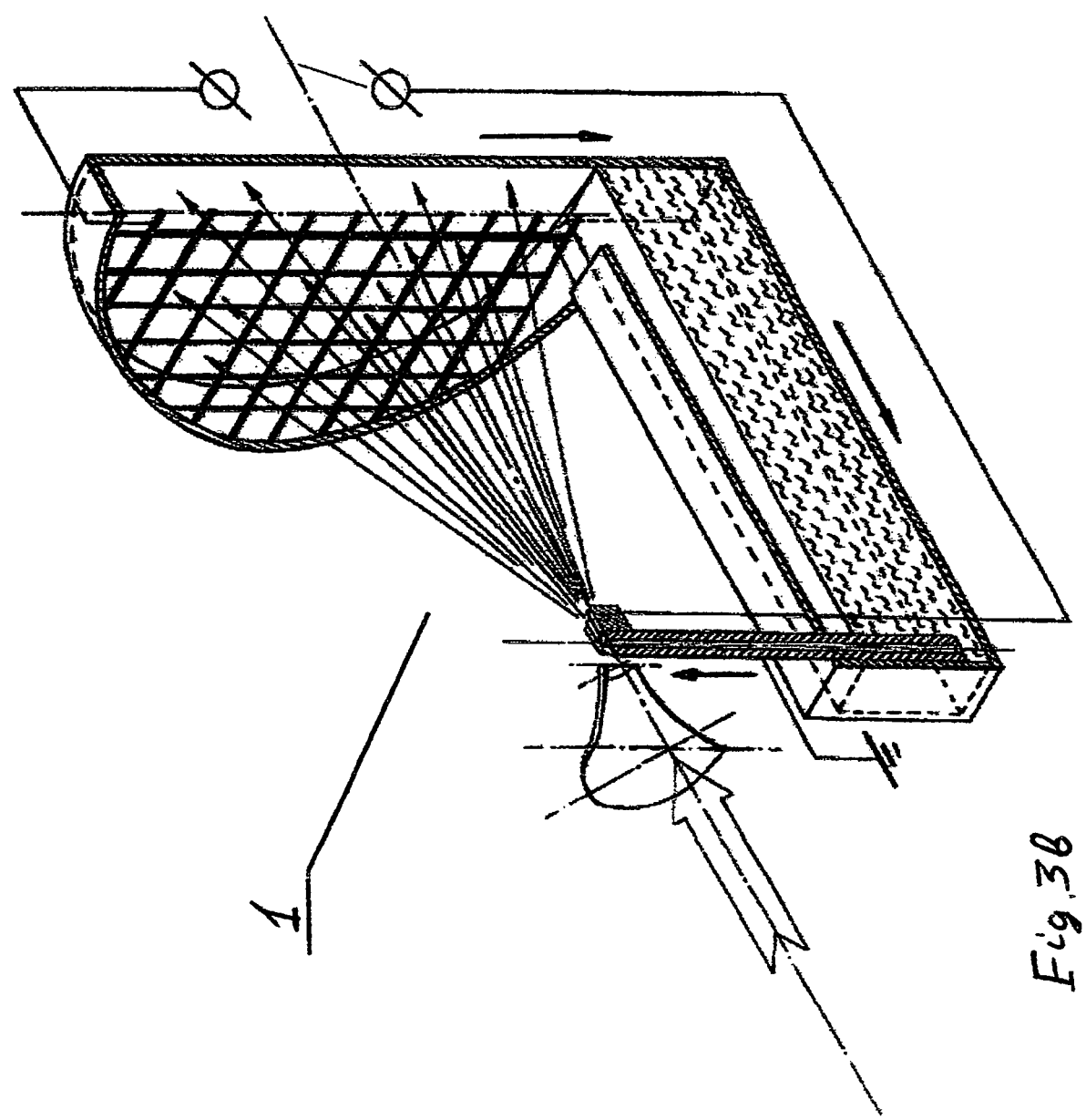

FIG. 3b: an embodiment example of a generator of electric energy.

Figure 3C:
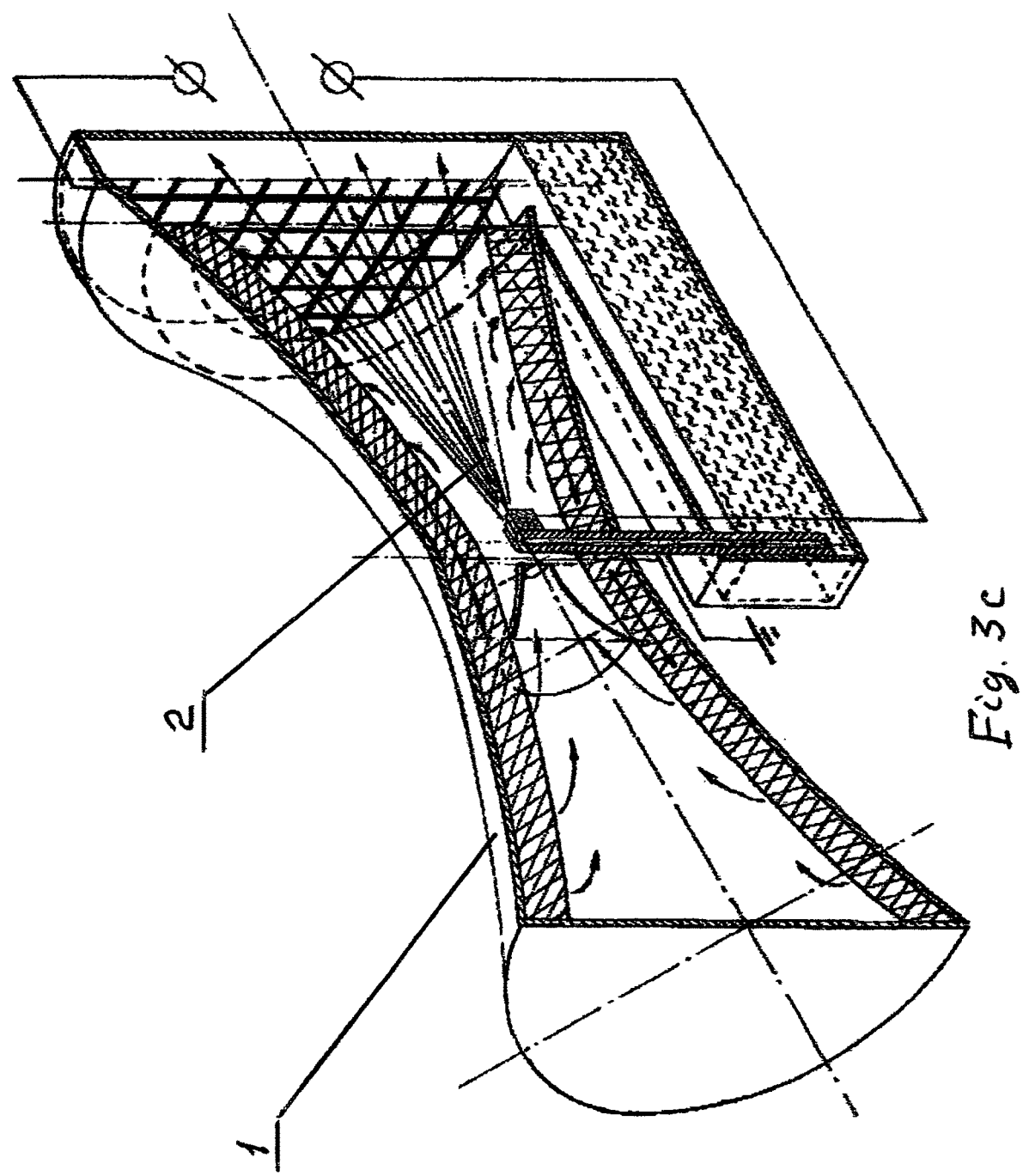

FIG. 3c: an embodiment example of an essembly of the heat pipe and of the generator of electric energy.

FIG. 4a: a schematic illustration of the principle "$S_{boundary}/S_{perimeter} \gg 1$" for the boundary between the wick material and the working liquid of heat pipe.

Figure 4B:
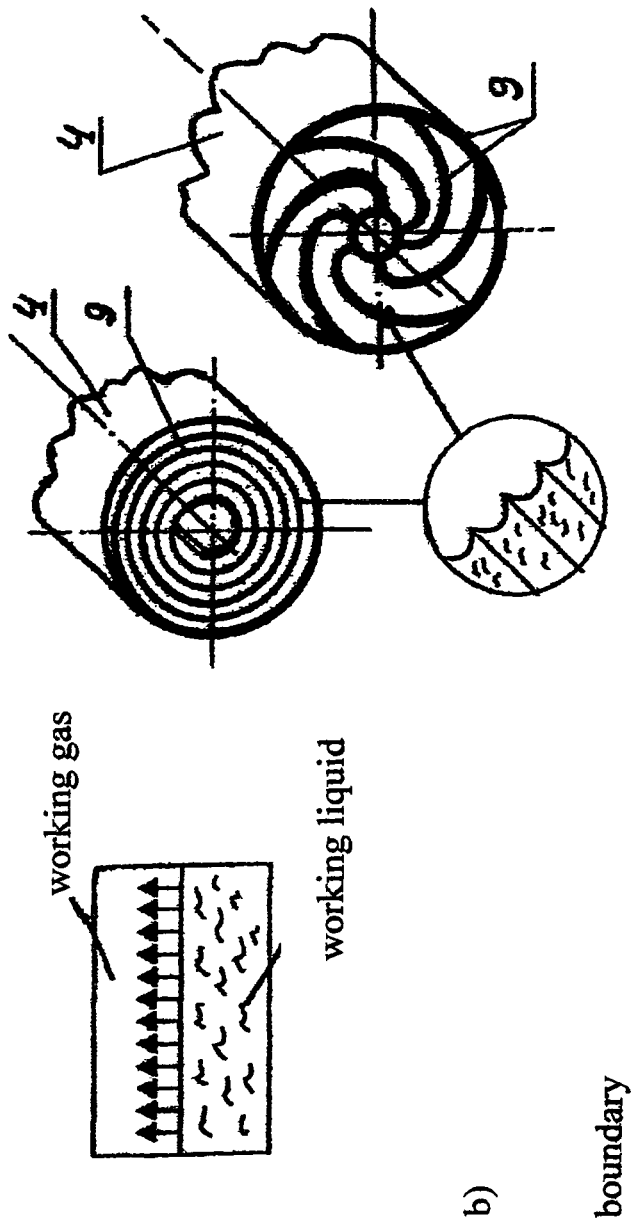
Figure 516:
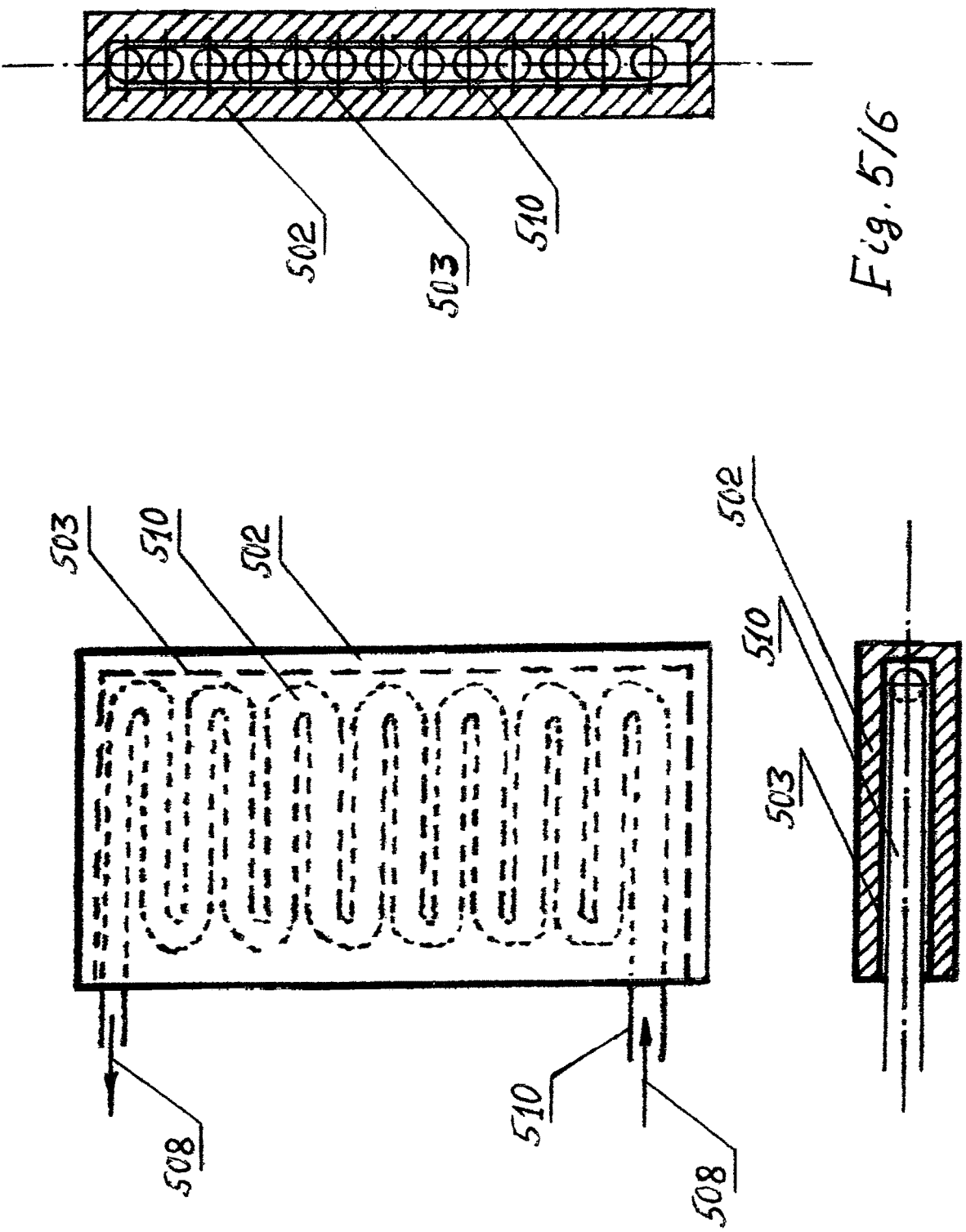

FIG. 4b: a schematic illustration of the principle "$S_{boundary}/S_{perimeter} \gg 1$" for the boundary between the heat pipe working liquid and the heat pipe working gas.

FIG. 5/1 an example of embodiment of the device

FIG. 5/2 an example of embodiment of the device for laboratory investigation purposes.

FIG. 5/3-5/12 examples of embodiments of the elements of the device.

FIG. 6 converter of the gas flow (or air flow) energy into the electrical energy by means of a piezoelectric conversion.

Figure 6A:
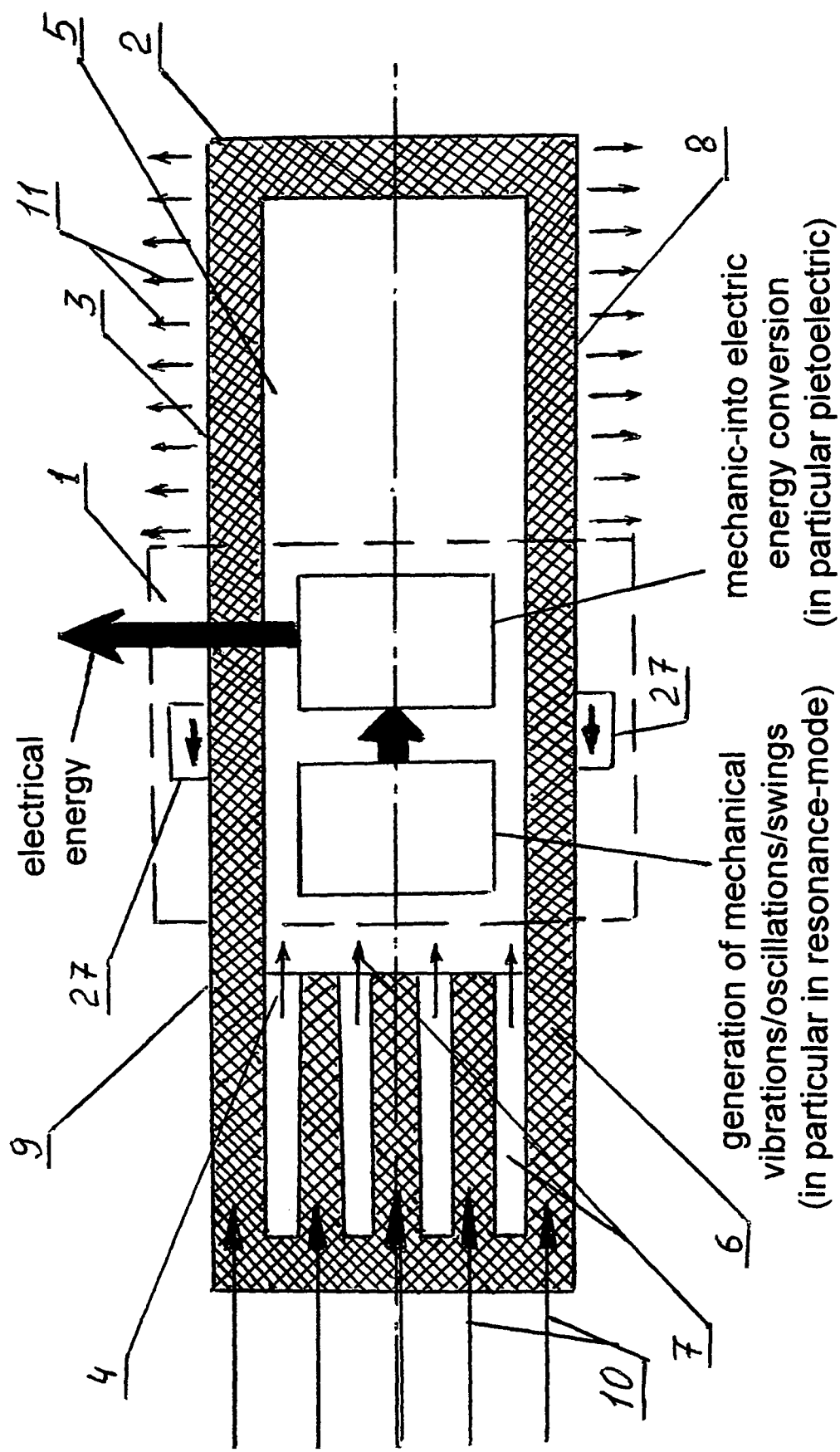
Figure 6B:
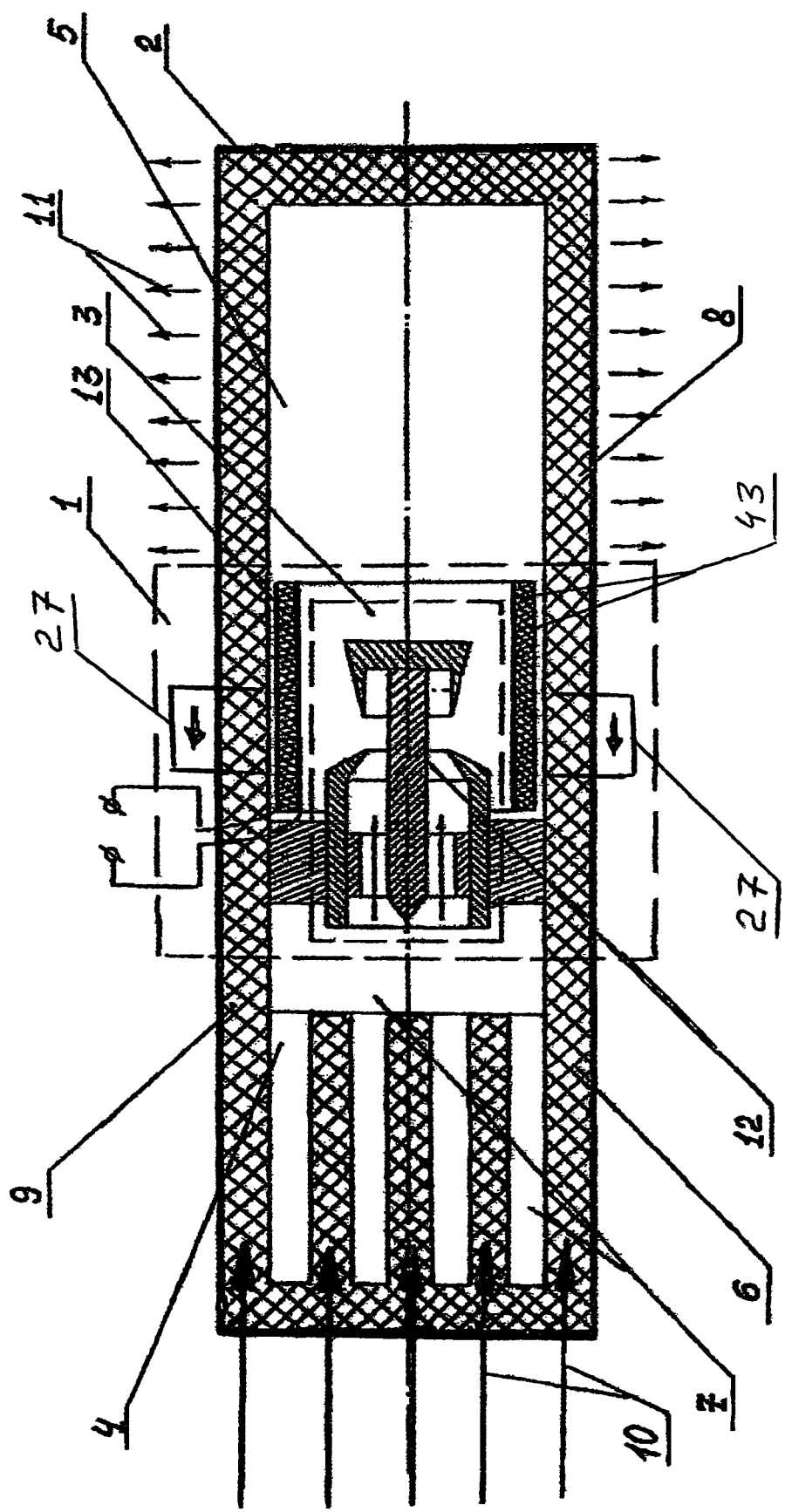

FIG. 6a thermo-into acoustic-into electric energy converter with the piezoelectric conversion;

FIG. 6b variant of energy conversion of an energy of a heat pipe working gas flow in an energy of acoustic swings, with the further conversion in the electric energy by means of a piezoelectric converter.

FIG. 6c/A variant of energy conversion of an energy of a heat pipe working gas flow in an energy of mechanic vibrations, in this case of strings vibrations, with the further conversion in the electric energy by means of a piezoelectric converter.

FIG. 6c/B possible variant of fastening of the strings.

FIG. 6c/C axonometric view of the pile-like devices arrangement.

FIG. 6c/D embodiment example with the strings in a form of an airplane wing.

FIG. 6c/E electrically connected modules, placed nearby in a same geometric plane.

Figure 6D:
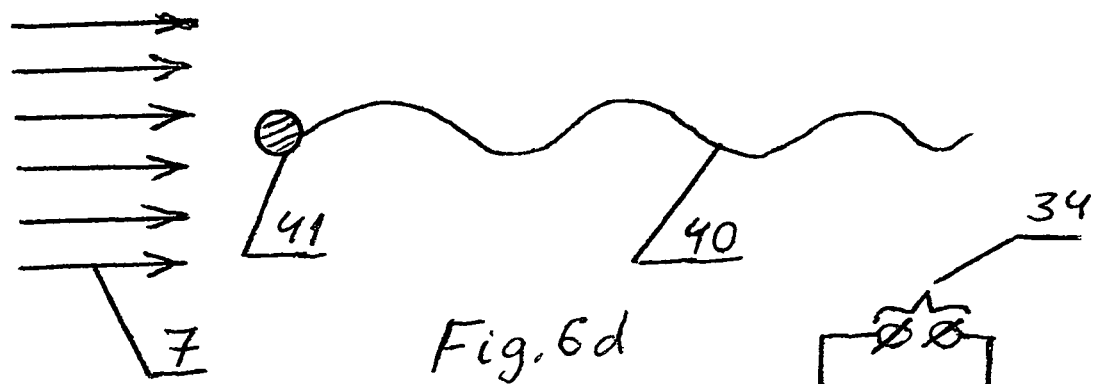

FIG. 6d flag on a flagstaff in an air flow.

Figure 6E:
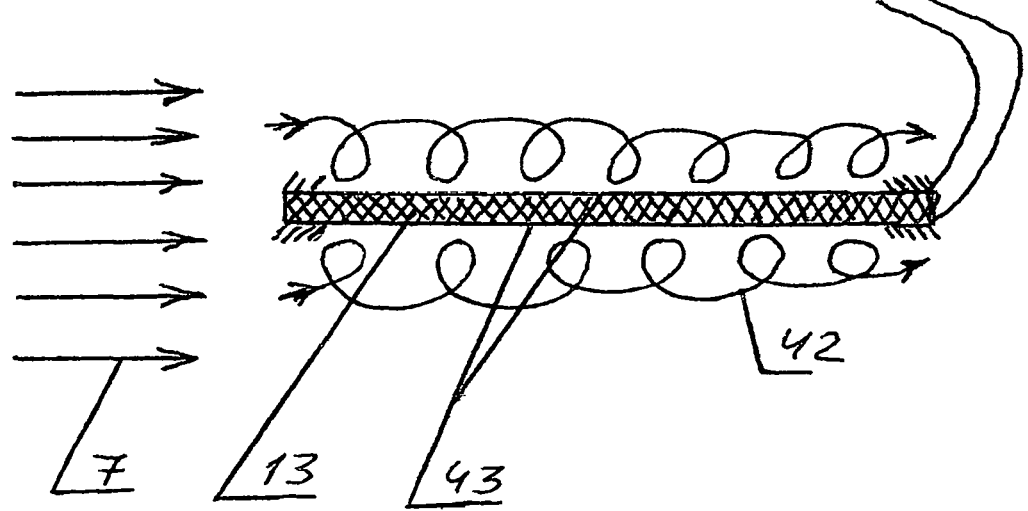

FIG. 6e piezoelectric plate in an air flow.

Figure 6F:
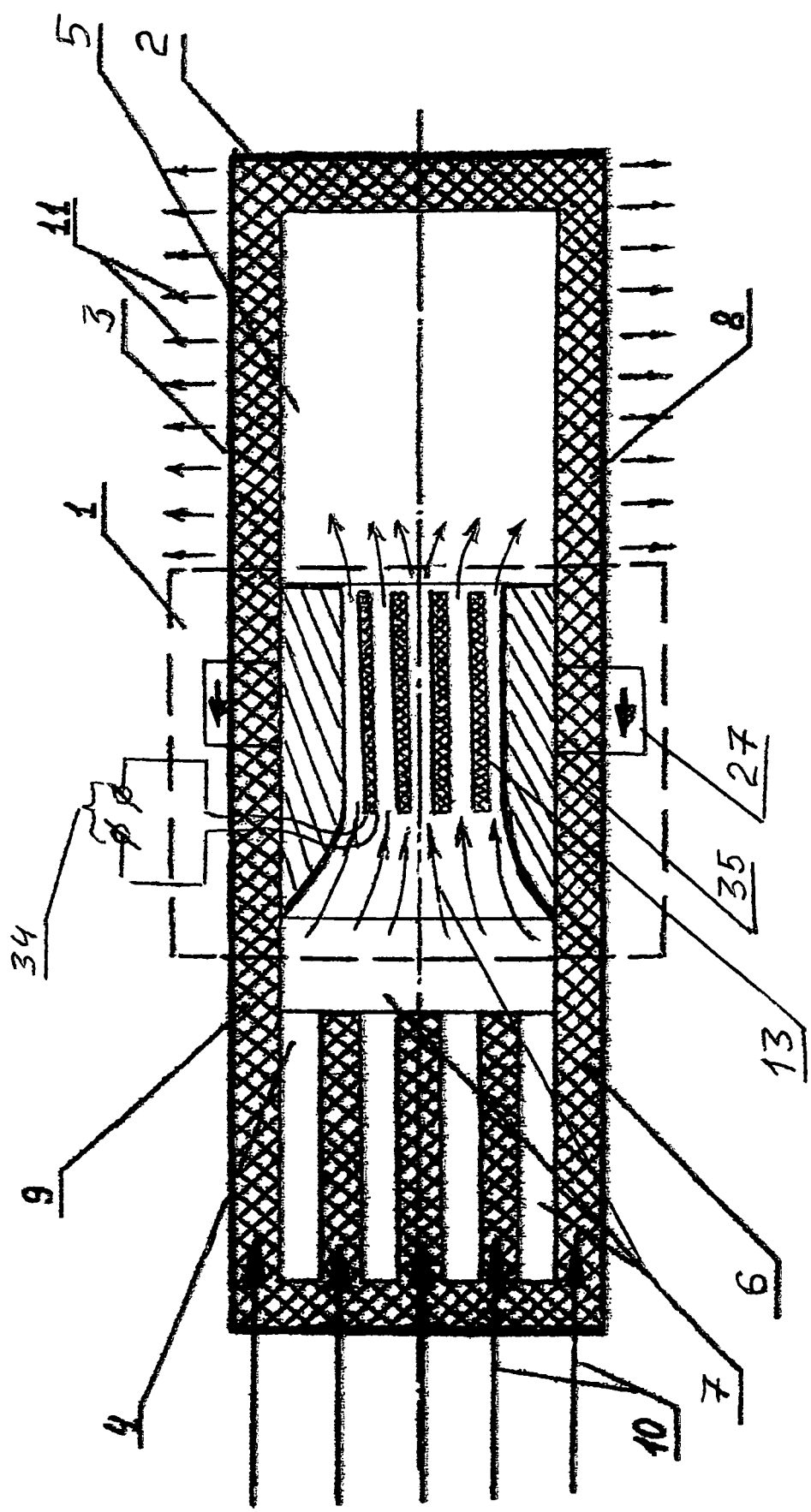
Figure 69:
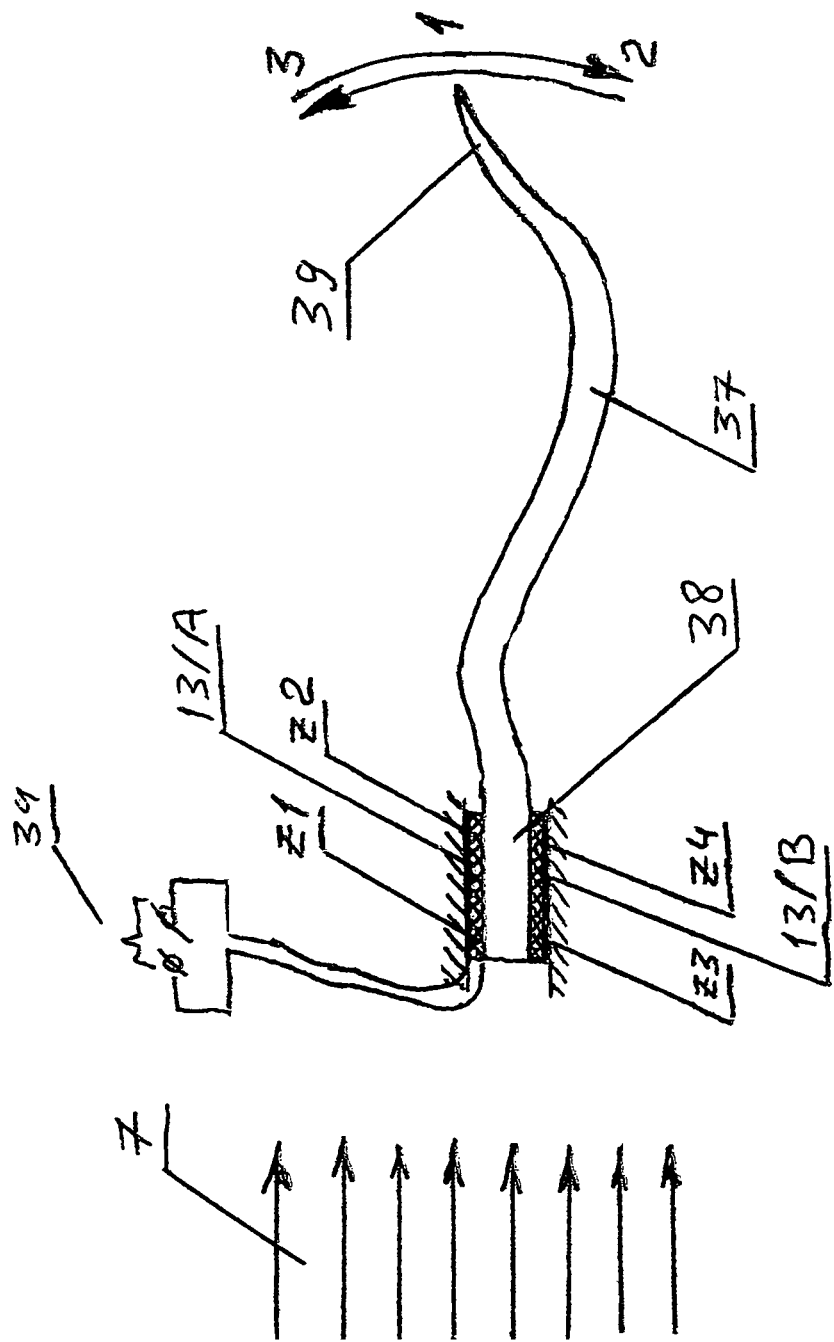

FIG. 6f embodiment example, wherein many piezoelectric crystal plates or many coated with the piezoelectric crystals carrying plates are installed in a transport zone of a heat pipe.

FIG. 6g embodiment example, wherein a mechanic energy of the gas flow turbulences is transmitted to a piezoelectric converter by an intermediate solid body, but not directly.

FIG. 6h/A FIG. 6h/E embodiment example of a piezoelectric converter based on the bend-shaped resilient plates, placed nearby one to another and fixed with one of their ends between two piezoelectric crystals: FIG. 6h/A—front view; FIG. 6h/B—back view; FIG. 6h/C—possible top view; FIG. 6h/D—other variante of a top view; FIG. 6h/E—axonometric view of a possible stack/pile—kind assembly of modules; FIG. 6h/F—possible front view with the elements, placed from both sides of a piezoelectric clamp; FIG. 6h/G—axonometric view of a possible assembly of modules, placed in one plane.

FIG. 6i/A embodiment example, where an energy of mechanic swings of strings is converted into electric energy by means of a Faraday generator.

FIG. 6i/B embodiment example, where a mechanic energy of a swing-kind twist-motions is converted in an electric energy by means of a piezoelectric converter.

Figure 8:
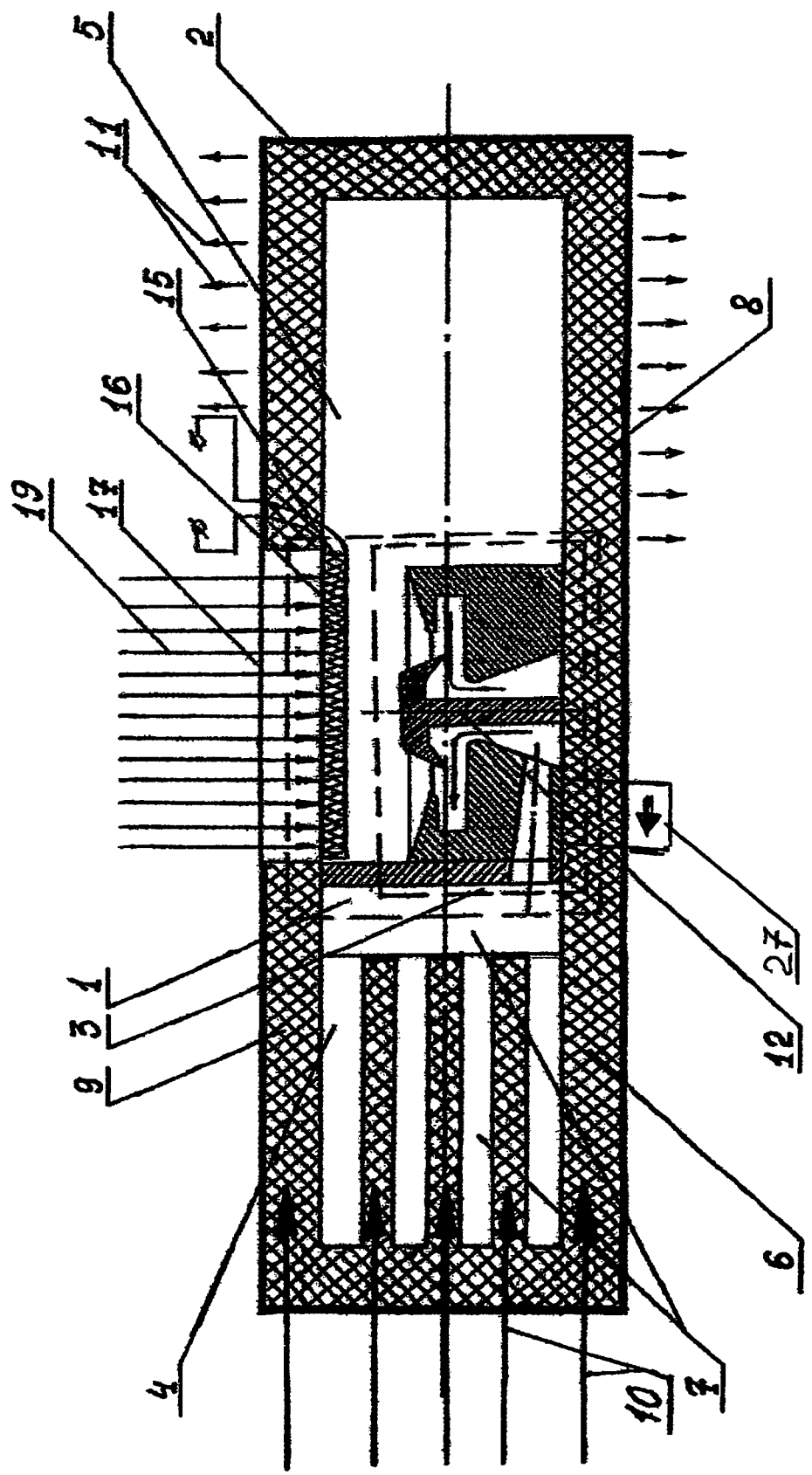
Figure 9A:
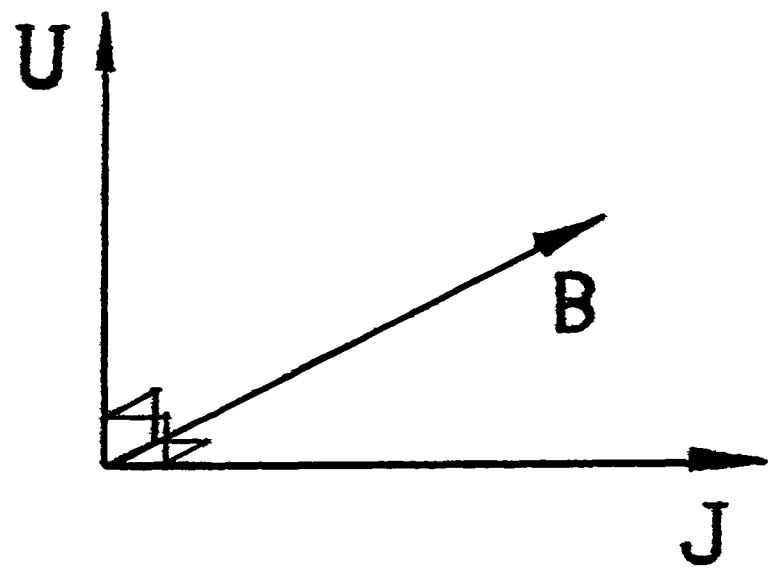

FIG. 7 thermo-into acoustic-into electric energy converter with the magnetostrictic conversion;

FIG. 8 thermophotoelectric converter with the conversion by a photoconductive piezosemiconductor;

FIG. 9a: a possible J-B-U vector diagram for a thermo-into electric (gas flow electric) drips-converter with the conversion on the MHD-principle of energy generation.

Figure 9B:
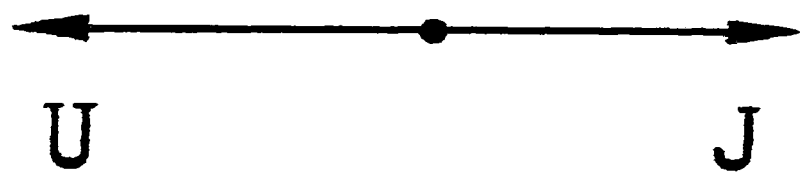

FIG. 9b: a possible J-U vector diagram for a thermo-into electric (gas flow electric) drips-converter with the conversion on the electrostatic principle of energy generation.

Figure 10A:
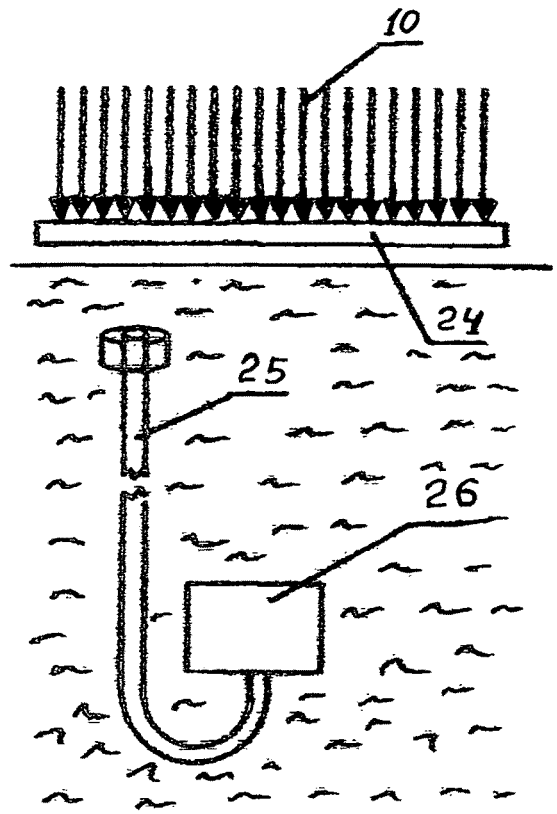

FIG. 10a: a schematic illustration of the method realization, wherein the energy converter is placed under a water surface or under a ground surface in a ground water.

Figure 10B:
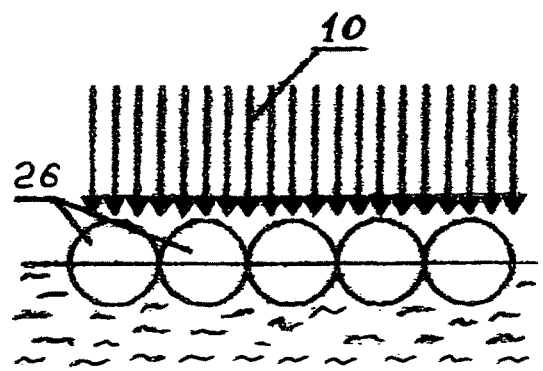

FIG. 10b: a schematic illustration of the method realization, wherein the energy converter is placed on the water surface without using of radiation guides.

Figure 10C:
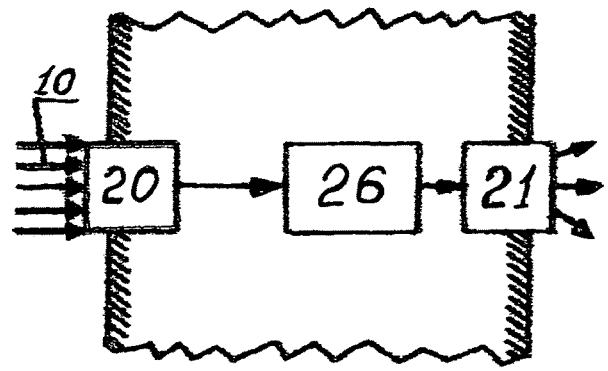

FIG. 10c: a schematic illustration of the method realization, wherein the energy converter is placed in cosmic space apparatuses.

FIG. 11: some possible schemes of using of the given method for utilisation of industrial heat wastes, and one of possible variant of the constructive embodiment of this method.

Figure 12:
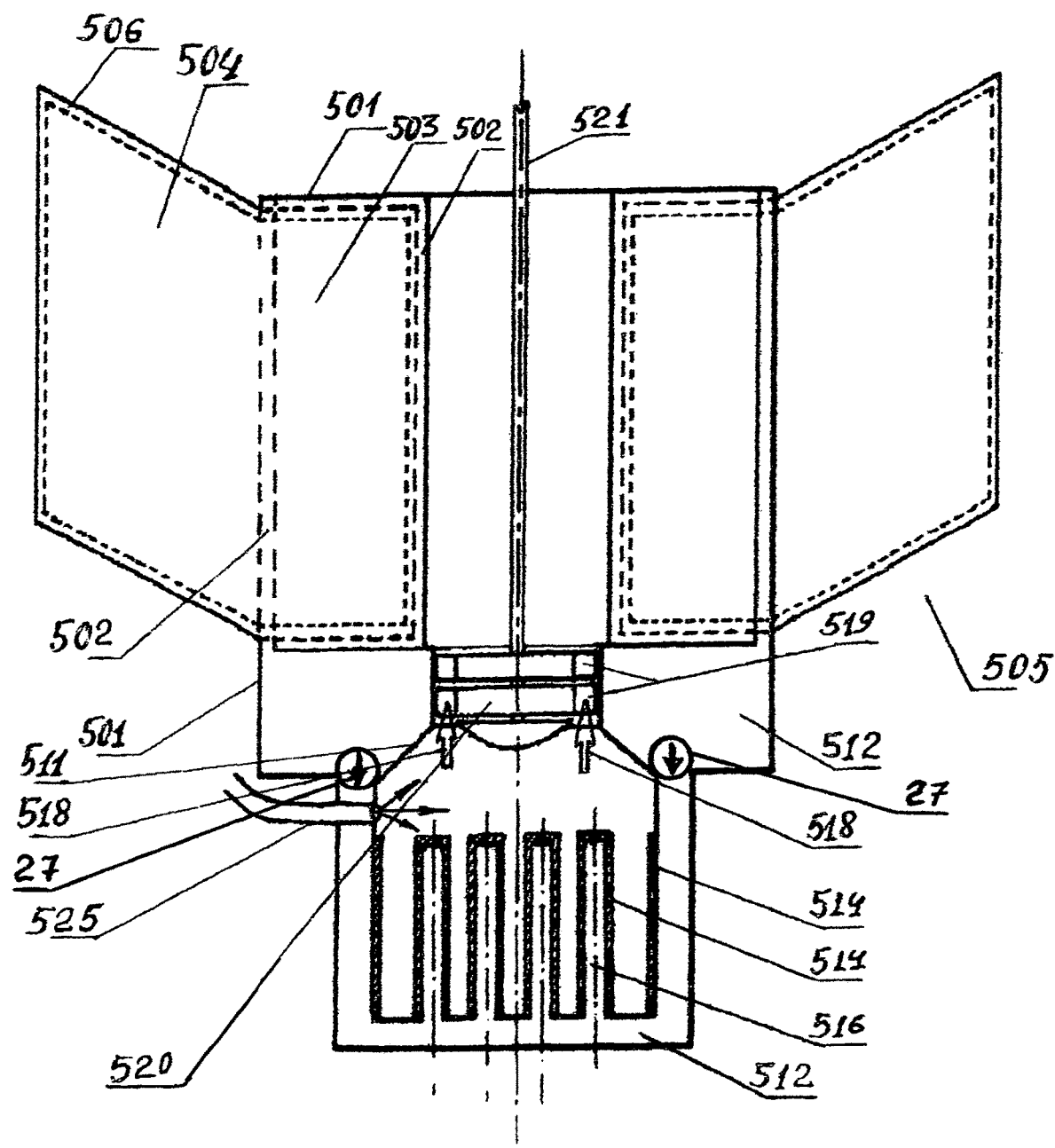

FIG. 12: an example of embodiment of the device with a liquid recovery pump.

Figure 13:
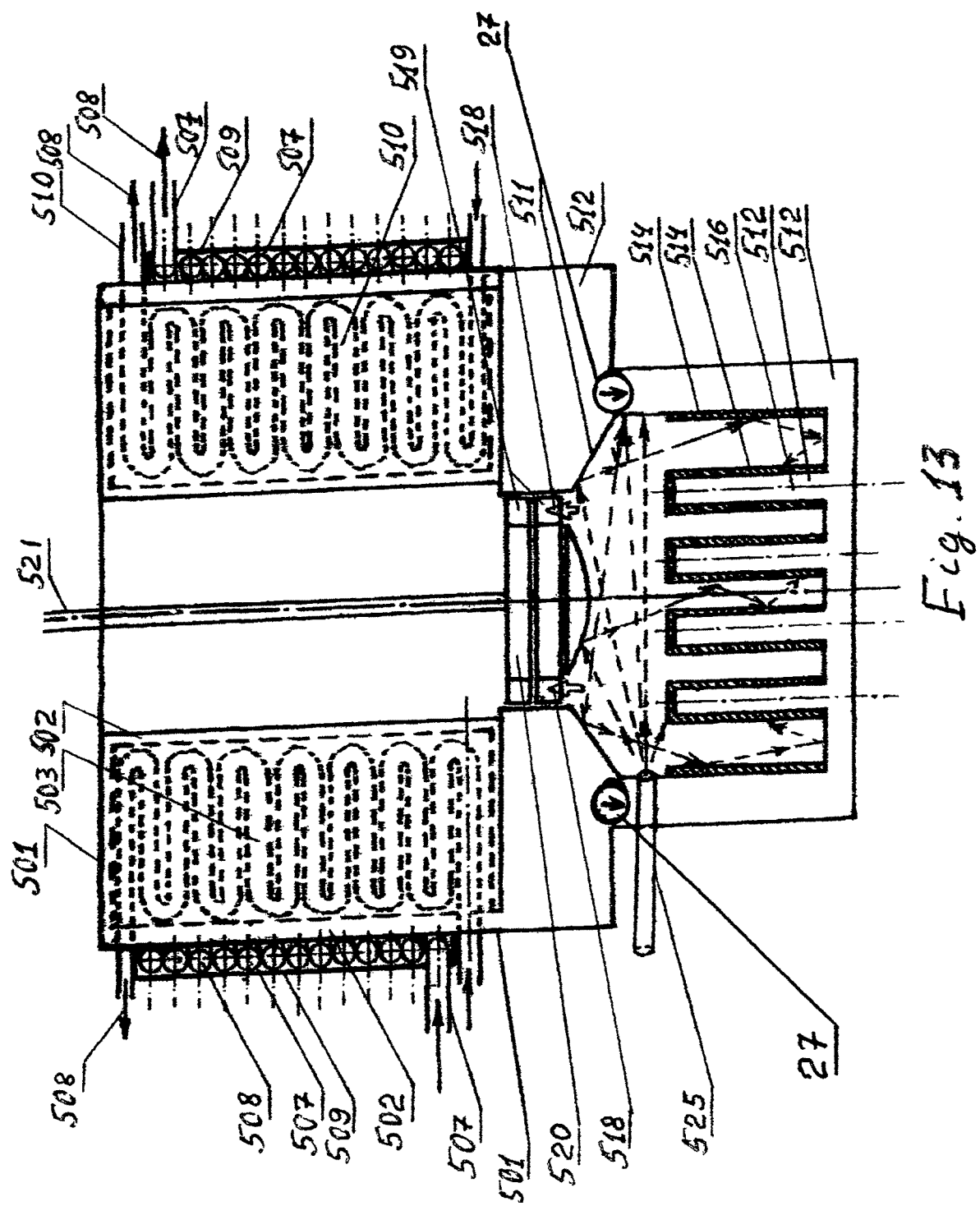

FIG. 13: an example of embodiment of the device with a liquid recovery pump (device embodiment for laboratory investigations).

Figure 14:
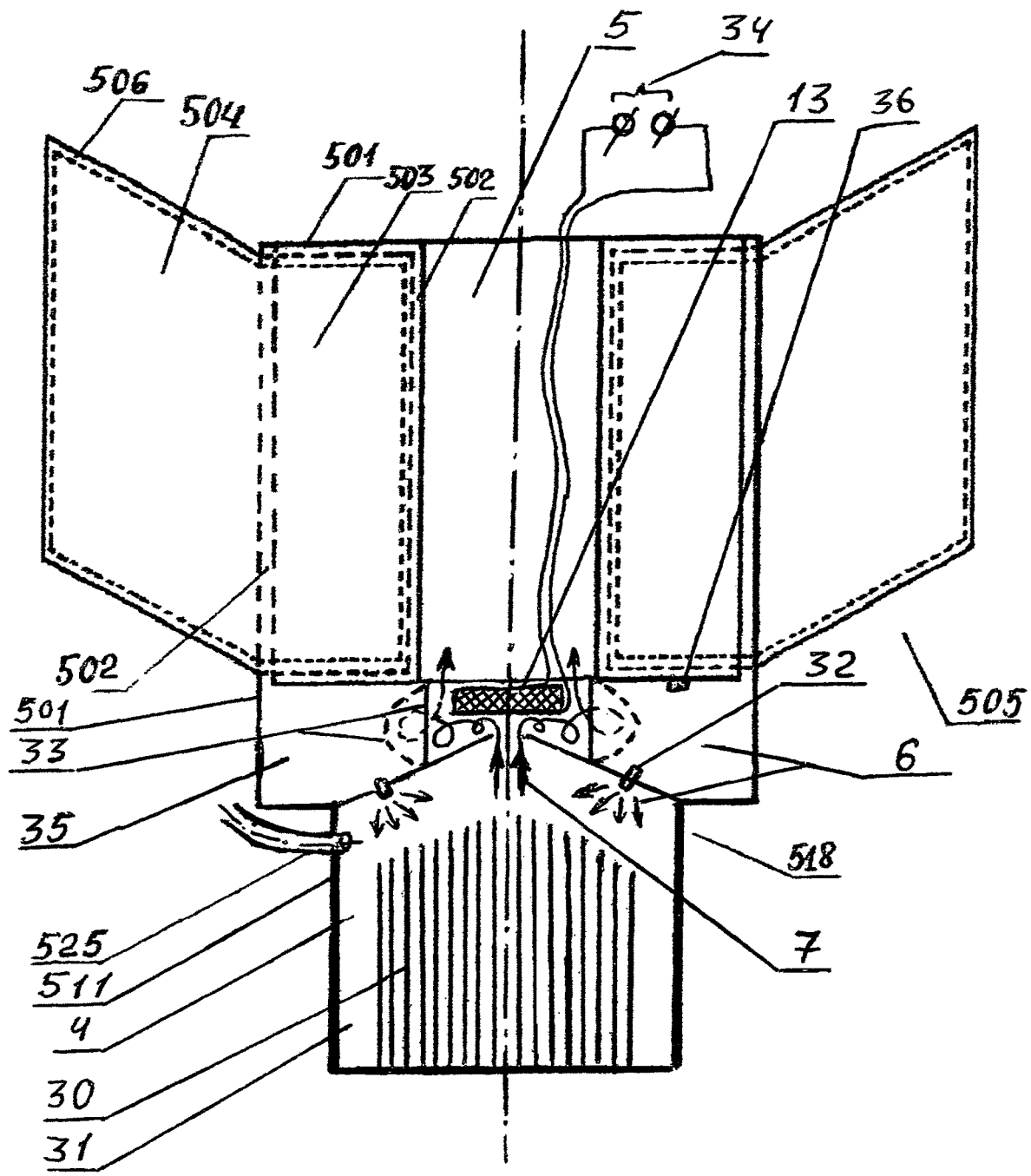

FIG. 14: an example of embodiment of the method in the pulsed mode.

DETAILED DESCRIPTION OF THE INVENTION

A generator of electrical energy 1 is built-in a heat pipe 2 such way, that an energy converter 3 of the heat pipe gas flow in other forms of energy (f.e. in particular, but not only, in an energy of mechanic swings/oscillations) is placed inside the heat pipe, approximately in an area of a maximal flow velocity (FIG. 1a, FIG. 1b).

An example of embodiment of such generator installation is presented in the FIG. 3(a-b). Other embodiment examples of the generator installations are presented in the FIGS. 6, 6a-6i/B, 7, 8, 12, 13, 14.

The heat pipe 2 comprises a vaporizer 4, a condenser 5, a working body (in a liquid phase 6 and in a gas phase 7), and a working liquid recovery loop 8. As it is known, the working liquid recovery in loop 8 takes place normally through capillary forces. But in a thermo-siphon, which one is a particular case of a heat pipe, the working liquid recovery takes place through gravitational forces. Therefore in the patent Claims under the term "heat pipe" is also a thermo-siphon understood, and, in particular, also the devices, which have in particular several or many vaporizers, condensers and transport zones; besides these elements can have any kind of geometric form (not only cylindrical form) and any kind of dimensions.

In the here proposed method and devices the recovery of working liquid (heat carrier) is executed by the pump 27 for liquid recovery.

Additionally to this pump 27 the recovery of liquid can be executed as usual by help of the capillary or (and) gravitational forces. If gravitational forces are used, the condenser must placed higher than the vaporizer. If centrifugal forces are used, the heat pipe must rotate, and the vaporizer and condenser must be placed on different distances from the axis of rotation.

The pump for liquid recovery is necessary to increase an efficiency. By using of this pump the area of the thermodynamic cycle contour (thermodynamic cycle curve) is much larger, than by using a heat pipe energy converter along, without this pump 27.

A working energy input for this liquid recovery pump 27 can be supplied from an external in respect to the heat pipe 2 source of energy. Or the working energy to supply this pump 27 can be taken from the energy of the heat pipe gas flow 7 (as it is shown for example in FIG. 14). Or the working energy to supply this pump 27 can be taken from the output energy of the concerned heat pipe energy converter in whole, or from generator 1, or from any elements inside the heat pipe energy converter on any stage of energy conversion in the energy conversion chain inside the heat pipe 2.

As the pump 27 for working liquid recovery consumes mach less energy, than it is produced by a heat pipe energy converter, the energy balance is positive.

A mode of action of this pump 27 can be a traditional one. Nevertheless it can be also purely electric, i.e. the pump energy is supplied in electrical form to a capillary structure of a heat pipe, or a capillary structure of a heat pipe is placed in an electric field, which way a transport of a working liquid from the condenser into the vaporizer of the heat pipe is executed by interaction of the electric field and the working liquid in the capillary structure (through the so-called "electro-capillary phenomenon").

A liquid 6 vaporizes in a vaporizer 4, then moves into a condenser 5, and condenses in this condenser. The said movement from the vaporizer to the condenser takes place in the form of a high speed gas flow 7. On its way the gas executes a work, which one is converted in other forms of energy by a converter 3, and in general by a generator 1. (Here is meant, that the converter 3 is a part of the generator 1, wherein a mechanic energy of the gas flow 7 is first converted in a mechanic energy of some energy carrier (in particular in an energy of mechanic swings) by the converter 3, and after that, this converted by the converter 3 energy is further converted inside the generator 1 in other forms of energy, in particular in an electric energy. Therewith the generator 1 comprises both the converter 3 and also further energy converters, in particular, for example, a piezoelectric converter for conversion of the energy of mechanic swings into the electric energy).

A supply 10 of a sun energy or heat energy is provided to the heat pipe vaporizer directly or through an energy supply system 20, i.e. through additional means for concentration and transmission of sun- or heat energy, for example mirrors, lenses (in particular Fresnel-mirrors or Fresnel-lenses 24), sun collectors, sun radiation guides 25 (in particular light guides), means for heat transport, etc. An abstraction of energy (by means of an energy abstraction system 21) from the condenser is executed either directly through irradiation (which way can be effective in a cosmic space), or through cooling means. The condenser can be either directly immersed in a coolant (for example water, external air, etc.), or the condenser can be connected with the coolant through heat exchangers.

To intensify a vaporization process a sun radiation can be supplied to the located in the vaporizer capillary structure (to the wick) of a heat pipe also directly. This direct supply can be made through a transparent coat of a heat pipe, or through a light guiding system, or through an other optical system. And in general, when an energy from outside is supplied to a heat pipe vaporizer in a radiation form, the coat of the vaporizer, or the wick, or they both can be made of a transparent for this radiation material. And in this case the radiation energy is supplied to the wick or to the working liquid directly, or also through an optical- or a radiation-guiding system.

FIG. 5/1-5/12 present in details an embodiment example of a device with some embodiments examples of the device separate elements. In these figures the embodiment examples both for working-devices (FIG. 5.1, FIG. 5.3, FIG. 5.4, FIG. 5.5, and FIG. 12), and also for devices for laboratory investigations (FIG. 5.2, 5.6, 5.7, 5.8, 5.12, and FIG. 13) are presented. The embodiments examples of the separate device elements in the FIGS. 5.9-5.11 are concerning the vaporizer and its details. Therefore these embodiments examples can be used both in the embodiments of the working-devices, and in the embodiments of the devices for the laboratory investigations. The embodiments of the working devices are suitable to be placed in a depth of water. Therefore these embodiments comprise an additional heat exchanger 504 to increase an external surface area of the condenser (s. FIGS. 5/1, 5/3, 5/4, 5/5, 12). Alternatively, the embodiments of the working devices for the laboratory investigations are cooled by means of a streaming liquid coolant (in particular by means of a cooling water flow 508), which one runs inside the internal tubes 510, which internal tubes 510 are placed either in the ribs 503 of the condenser, or in/on walls (or in/on a coat 501) of the condenser, or both. In the embodiments of the working devices the condenser can be placed in particular within the thickness of the water, and therewith a heat abstraction from the condenser takes place mainly by convection. Or the condenser can be placed in a water flow (for example in a river), and therewith the heat abstraction takes place through a heat exchange between the condensers coat 501 and heat exchanger 504 on the one hand, and the water flow on the other hand. And additionally also through the convection, which one also takes place in this case.

It is shown (s. table below):

| Ref. No. | FIG. No. | Reference: | Embodiment for laboratory investigations | Working embodiment |
|---|---|---|---|---|
| 501 | 5/1, 5/2, 5/5, 5/7, 5/8, 5/9, 5/11, 5/12 | coat | yes | yes |
| 502 | 5/1, 5/2, 5/3, 5/4, 5/6, 5/8, 5/12. | capillary structure of the condenser | yes | yes |
| 503 | 5/1, 5/2, 5/3, 5/4, 5/5, 5/6, 5/7, 5/8, 5/12. | ribs of the condenser (for increasing of the condensation surface area) | yes | yes |

-continued

| Ref. No. | FIG. No. | Reference: | Embodiment for laboratory investigations | Working embodiment |
|---|---|---|---|---|
| 504 | 5/1, 5/3, 5/4, 5/5. | additional heat exchanger (for increasing of the external surface area of the condenser) | no | yes |
| 505 | 5/1 | surrounding coolant (water) | no | yes |
| 506 | 5/1, 5/3, 5/4. | capillary structure of the heat exchanger 504 (if exists) | no | yes |
| 507 | 5/2. | spiral metal tube | yes | no |
| 508 | 5/2, 5/6. | cooling water flow | yes | no |
| 509 | 5/2, | thermoinsulation | yes | no |
| 510 | 5/2, 5/6. | internal tubes in the ribs 503 | yes | no |
| 511 | 5/1, 5/2, 5/8, 5/9, 5/10, 5/11. | walls of the vaporizer | yes | yes |
| 512 | 5/1, 5/2. | capillary structure of the transport zone | yes | yes |
| 513 | 5/8. | perimeter border | yes | yes |
| 514 | 5/1, 5/2, 5/9, 5/10. | capillary structure of the vaporizer | yes | yes |
| 515 | 5/9, 5/10. | reflecting mirror surface | yes | yes |
| 516 | 5/1, 5/2, 5/9. | vaporizers cylinder | yes | yes |
| 517 | 5/9. | perforation | yes | yes |
| 518 | 5/1, 5/2. | flow of the working gas | yes | yes |
| 519 | 5/1, 5/2. | turbine blading or body of generator | yes | yes |
| 520 | 5/1, 5/2. | carrier of blading or carrier of generators body | yes | yes |
| 521 | 5/1, 5/2, 5/12. | shaft | yes | yes |
| 522 | 5/12. | top-part of the coat 501 | yes | yes |
| 523 | 5/12. | wall-part of the coat 501 | yes | yes |
| 524 | 5/12. | case connectors | yes | yes |
| 25 | 5/1, 5/2, 5/11. | light- or infrared radiation guide | yes | yes |
| 27 | 12, 13. | pump for recovery of working liquid | yes | yes |

In one embodiment example a heat pipe 2 comprises a vaporizer 4, condenser 5, and transport-zone 35 with a capillary structure 512 of this transport zone (s. FIGS. 5.1, 5.2, 12, 13). Wherein the transport-zone surrounds the vaporizer, in particular from all sides except the side, where the gas flow from the vaporizer goes in the direction to the condenser. Therewith the vaporizer has no direct contact with a coat 501 of the heat pipe, and consequently with a surrounding coolant (water) through this coat. In this embodiment example the transport-zone 35 is placed between the coat 501 and vaporizer 4. In particular this transport zone 35 is filled up with a transport zone capillary structure 512. Therefore the vaporizer 4 is insulated from the surrounding coolant (water) 505.

A sun energy (or light energy, or infrared radiation energy, or an energy in an other radiation- or electromagnetic form) is supplied to inside of the vaporizer 4 through a light- or infrared radiation guide 25 (or 525) (FIGS. 5.1, 5.2, 5.11, 12, 13). The internal walls 511 of the vaporizer are partially covered by reflecting mirror-like surfaces 515, or these walls are executed as mirror-surfaces 515 (FIG. 5.9, 5.10). These mirror-like surfaces 515 are able to re-reflect many times inside the vaporizer the supplied by the radiation guide 25 radiation. An other part of the internal walls 511 of the vaporizer are perforated, i.e. they comprise a perforation 517 (s. f.e. FIG. 5.9). And above this perforation these walls 511 comprise a layer of the capillary structure 514 of the vaporizer (FIGS. 5/1, 5/2, 5/9, 5/10). To increase a total (summing up) surface area of the internal walls 511 and in particular of the surface area of the capillary structure 514 of the vaporizer, one can use additional elements, as for example the vaporizer cylinders 516 (s. f.e. FIGS. 5/1, 5/2, 5/9). I.e. the vaporizer 4 comprises the additional elements (such as in particular the vaporizer cylinders 516), which elements are increasing the surface area of the vaporizer internal walls 511 (in particular the surface area of the capillary structure 514, or the surface area of the mirror-like surface 515, or both).

The radiation is supplied to inside of the vaporizer 4 through the radiation guide 25. In the shown embodiment variant a supply direction line deviates a bit from the radius-line to provide a many times re-reflection inside the vaporizer 4 (but not an immediate reflection back into the radiation guide). In a general case of embodiment it is important, that no mirror-like reflecting surface is placed perpendicular to the supplied radiation on the way of this radiation. Because the supplied radiation will be immediately reflected back into the radiation guide by this reflecting surface. (Necessary remark: to switch-off the radiation guide from the radiation-supplied chamber/volume, in particular from the vaporizer, it is enough to place a mirror perpendicular to the radiation guide, wherein this mirror can be placed in any place along this radiation guide).

A total internal surface area of the vaporizer is much more larger, than the area of the radiation guide end-opening (through which end-opening the radiation from the radiation guide 525 goes into the vaporizer). Therefore only a small amount of the applied radiation energy goes back into the radiation-guide opening again after the repeated re-reflecting and absorption inside the vaporizer.

In the vaporizer 4 the radiation energy is either absorbed (i.e. converted in heat energy) by the layer of capillary structure 514 of the vaporizer, or partially re-reflected by the mirror-like surfaces 515, and after that it is supplied again to the capillary structure and is absorbed there. The mirror-like surfaces 515 make it possible to distribute the radiation energy over all surface of the capillary structure 515 approximately evenly (s. FIG. 5.11). Possible embodiments examples of an absorption of radiation energy by a capillary structure are described above and presented in particular in the FIG. 4*a*, FIG. 4*b*.

A working liquid of a heat pipe is vaporized by means of this energy, and creates a gas flow 518 (in other figures marked also as "7") into the condenser (s. below).

After the vaporization of the heat pipe working liquid from the capillary structure 514 of the vaporizer, the next heat pipe working liquid is drawn in this, now emptied, capillary structure 514 of the vaporizer from the transport zone 35 (in particular from the capillary structure 512 of the transport zone) through the perforations 517 of the walls 511. And it (heat pipe working liquid) vaporizes there again, and generates this way the above-described gas flow 518 (or 7) into the condenser.

As it is written above, the condenser 5 in this embodiment example can be executed in two embodiment variants—as a working embodiment (for a direct use for energy conversion), and as an embodiment for laboratory investigations and optimizations of this method for different concrete practical situations of application.

In both embodiments the condenser 5 comprises a capillary structure 502 of the condenser (FIGS. 5/1, 5/2, 5/3, 5/4, 5/6, 5/8, 5/12, 12, 13), ribs 503 of the condenser inside the internal space of the condenser (to increase the condensation surface area) (FIGS. 5/1, 5/2, 5/3, 5/4, 5/5, 5/6, 5/7, 5/8, 5/12, 12, 13). These ribs are also covered by the capillary structure 502 of the condenser, as well as the internal walls of the condenser. There is also a perimeter border 513 (s. for example FIG. 5/8) between the condenser and transport zone, in particular between the condenser capillary structure 502 and the transport zone capillary structure 512.

In working embodiment example a heat pipe 2 is located in a surrounding coolant (for example water) 505. Therefore a heat energy extraction from the condenser external walls to the above-mentioned coolant takes place directly from these walls (coat 501) of the condenser (by convection, or other kinds of heat removal). Nevertheless the ribs 503 of the condenser are located inside the condenser, and therefore they do not have any direct heat removal by the coolant (water) 505. To ensure this thermic contact, the each rib 503 comprises an additional heat exchanger 504 (FIGS. 5.3, 5.4, 5.5). These heat exchangers 504 increase a total (summing up) external surface of the condenser, which surface is in a direct contact with the surrounding coolant (water) 505 (FIGS. 5/1, 5/3, 5/4, 5/5, 12). In the simplest case an each heat exchanger 504 can be executed as a good heat-conducting plate (for example copper plate or aluminum plate), wherein a part of this plate is placed inside a rib 503, and an other part of this plate is placed in an external coolant (water) 505. This way a heat is abstracted from the ribs in the external coolant (water) 505. Nevertheless there is one more efficient embodiment example of the heat exchanger 504, which one is presented in the FIG. 5/3. In this embodiment example the plate of the heat exchanger 504 is empty from inside. This way the heat exchanger 504 is a flat narrow empty hermetic parallelepiped-box 504*a*, wherein the internal walls of this box are covered with a heat exchanger capillary structure 506. Inside this box a working body of this heat exchanger is located, which working body is both in a liquid state (as a heat exchanger working liquid 504*b*) and in a gas state (as a heat exchanger working gas 504*c*). Therewith the heat exchanger 504 is a one more heat pipe with its own closed loop. In the part of case 504*a*, which part is located inside the rib 503, the heat exchanger working liquid 504*b* is vaporized from the heat exchanger capillary structure 506. And in the part of box 504*a*, which part is located in the external coolant (water) 505), the heat exchanger working liquid 504*b* is condensed on the heat exchanger capillary structure 506. This way the heat from the rib 503 is abstracted into the external coolant (water) 505. Here the heat exchanger 504 works as a usual heat-pipe-like heat exchanger. Instead of this heat-pipe-like heat exchanger one can use also a thermo-siphon-like heat exchanger, which one comprises no capillary structure 506. As well as other embodiments of heat exchangers. FIG. 5/4 presents absolutely analogical heat exchanger 504, which one has an other geometric form. This form is more efficient for the cooling through external convection. Besides, this kind of form secures a more intensive recovery of the working liquid of the heat exchanger 504 through the capillary structure 506 back into that part of the heat exchanger 504, which part is placed inside the rib (i.e. into the vaporizer of the heat exchanger 504) because of (through) the gravitational forces.

In embodiment for the laboratory investigation there is no surrounding water reservoir with a surrounding water, which one could remove heat from the condenser 5 and from the condenser ribs 503. Therefore the condenser 5 comprises a spiral metal tube 507 (or a tube made of any kind of heat conductive material) 507 (s. for example FIG. 5/2), which tube winds repeatedly round the coat 501 of the condenser 5, and therewith covers this condensers coat from outside. Through this tube a cooling water flow (a flow of liquid, a flow of coolant) 508 runs, and therewith the condenser 5 is cooled by this flow (a heat from the condenser walls are abstracted to outside). This spiral tube 507 is covered from outside by a thermoinsulation 509, therewith the cooling works efficiently and measurable, independently from an outer air temperature and from the swings of this outer air temperature. Instead of the heat-pipe-like heat exchanger 504 the internal tubes 510 are placed inside the ribs 503. The cooling liquid 508 runs through these tubes and cools this way the ribs 503 (FIG. 5/2, 5.6). These internal tubes 510 with the cooling liquid 508 create this way by itself an other heat exchanger 525. As well as the spiral tube 507 with the cooling liquid 508 creates by itself a heat exchanger 526. In laboratory conditions the condenser 5 can be cooled by these heat exchangers 525 and 526 more suitably.

The heat exchangers 525 and 526 (as well also the heat exchanger 504 in the case of working embodiment) can be also executed as connected together modules (in particular with the independent for each module supply and removal of the coolant 508). A correspondent embodiment example is shown in the FIG. 5/12. These above-mentioned modules are connected together with case connectors 524.

The working liquid 6 of the heat pipe 2 goes from the capillary structure 514 of the condenser 5 down into the transport zone 35 under the influence of the gravitational force. (As it is written above, the internal walls of the condensers, as well as the ribs 503 are covered with the above-mentioned capillary structure 514). After that the working liquid 6 goes through the perforation 517 into the capillary structure 514 of the vaporizer (as it was written above, the covered with the capillary structure walls of the vaporizer have a perforation 517). The transport zone 35 can be empty (without a capillary structure), or partially empty, and this way to be felt only by the working liquid 6. The transport zone 35 can be also felt with a capillary structure 512 of the transport zone. In this case the working liquid 6 goes from the condenser 5 into the transport zone 35 not only under the influence of the gravitational force, but also under the influence of the capillary forces (FIGS. 5.8, 12, 13). Nevertheless additionally to these gravitational and capillary forces a liquid recovery pump 27 can be installed at the boundary between the condenser 5 and transport zone 35 (FIG. 12, 13). As it is described in details above, this pump pumps the working liquid 6 from the condenser 5 back into the vaporizer 4, and increases this way substantially the efficiency of the energy conversion process (s. detailed above).

Because of the substantial pressure difference between the vaporizer and condenser (s. above), arises a gas flow 518 (or 7) of the working gas from the vaporizer to the condenser. Mechanic energy of this gas flow is converted by the heat pipe gas flow energy converter 3 in other kinds of energy.

In the FIGS. 12, 13 a simplest and most usual embodiment example is shown, wherein the converter 3 is executed as a mechanical turbine. The turbine blading or generator body 519 is fixed on a blaiding-carrier (or generator body carrier) 520. Working gas flow 518 (or 7) flows through the turbine blading 519 and rotates the turbine this way. This mechanic rotation energy is either used directly (for any purposes), or it is transmitted by means of a shaft 521 to a Faraday-Generator, and further converted there in the electric energy (FIGS. 12, 13. The Faraday-Generator is not shown in these figures). Instead of these turbine-like converters also other converters can be used, which converters are based on others physical principles of energy conversion, in particular piezo-electric converters, etc.-s below.

A similar embodiment example, but with an other design of the vaporizer and of the pump for liquid recovery is presented in FIG. 14 (s. details below). This embodiment example demonstrates, that an energy conversion process inside a heat pipe (in general case—inside a heat machine) can be executed in an impulse-mode. This impulse-mode makes it possible a) to increase the output power, and b) to separate in the time the flowing under the pressure flows (namely the heat pipe working gas flow and the opposite direction flow of the heat pipe recovered working liquid). I.e. firstly the flow of the working gas flows from the vaporizer into the condenser under the pressure between the vaporizer and condenser, and after that the working liquid flows through the heat pipe transport zone from the condenser into the vaporizer of the heat pipe under the pressure of the liquid recovery pump (or also under the pressure of capillary and gravitational forces). And after that the above-mentioned gas flow flows again (the process is cyclic).

In one embodiment example a frequency (or period) of this cycle can coincident or correlate with a resonance frequency of some mechanic system, which system is a working body (or construction element) of the converter 3, which converter 3 converts an energy of a heat pipe gas flow in an energy of mechanic swings. After that, among other possibilities, this energy can be converted in an electric energy by means of other parts of generator 1.

An embodiment example for the laboratory investigations is not shown in FIG. 14. Nevertheless this laboratory-variant of this embodiment example can be executed fully analogous to the above-described embodiment by using, for this laboratory-variant, of the correspondent condenser construction elements, described above in the FIGS. 5.2, 5.6, 5.7, 5.8, 5.12. These devices, which are the embodiment examples for laboratory investigations, are cooled in particular by a running cooling liquid (in particular by a cooling water stream 508) in an internal tube 510, which one (internal tube 510) is placed either in the condenser ribs 503, or in, or on the walls (or coat 501) of the condenser, or both. One more detailed presentation of this embodiment example due to the FIG. 14 is given also below.

In one special embodiment example a sun radiation collecting system, in particular for example Fresnel-lenses (or Fresnel-mirrors) 24, can be placed on the ocean-(sea-, lake-, river-, etc.)-shore, wherein the converter 26 itself can be placed in this ocean-(sea-, lake-, river-, etc.)-water, in particular also at a some depth, where the water is more cold. Wherein the sun radiation energy from the above-mentioned sun radiation collecting system can be supplied to the above-mentioned converter 26 by the sun radiation guide 25, that is from the shore into the water, in particular also in the water depth.

Or, in an other special embodiment example the sun radiation collecting system can be placed at (on) the water surface, and in the same time a converter 26 is placed under the water, wherein the collected sun radiation energy can be supplied by the a.m. sun radiation guide 25 from the a.m. sun radiation collecting system to the vaporizer of the a.m. converter 26

Or, in an other special embodiment example (FIG. 10b), a converter (or many converters) can floating in a water such way, that the condenser is placed in the water, under the water surface, and the vaporizer is placed in the air above the water surface, and therefore the radiation guide 25 is unnecessary.

In some embodiment examples the condenser can be placed in a water stream (for example in a river).

FIG. 6 shows in general a variant of conversion of an energy of a working gas flow 7 in an energy of mechanic swings (in particular vibrations, oscillations, sound, ultrasound), with the further conversion in an electric energy by means of a mechanic-electric (in particular piezoelectric) converter. In a general case the working gas flow 7, which one powers the generator 1 of electrical energy, can be a gas flow inside of a heat machine (in particular inside of a heat pipe), but it can be also a wind (i.e. a natural air gas flow), or a gas flow from a wind-directing/wind-concentrating devices, or any kind of a gas flow from any kind of gas flow sources.

Under the mechanic swings it is understood here:
a) mechanic swings of some mechanic construction elements, wherein a mechanic energy of these mechanic elements is converted in an electric energy, and also:
b) mechanic swings, which takes place without the mechanically moving construction elements (s. also the embodiments examples in FIG. 6e, FIG. 6f, FIG. 6b, FIG. 7, FIG. 8), which swings and following mechanic-electric energy conversion are caused in particular by gas vortexes, turbulences (also micro-vortexes, micro-turbulences), sound, ultrasound, as well as by any kind of other gas swings. These swings can take place, in particular, immediately at a boundary between a gas and a crystal of a converter (in particular of a piezoelectric converter), and this way these swings cause a generation of electric energy.

FIG. 6a shows in general a variant of conversion of an energy of a working gas flow 7 of a heat pipe 2 in an energy of mechanic swings (in particular vibrations, oscillations, sound, ultrasound), with the further conversion in an electric energy, in particular by means of a piezoelectric converter.

FIG. 6b shows a variant of energy conversion of an energy of a heat pipe working gas flow 7 in an energy of acoustic swings (as a particular case of the mechanic swings in general), with the further conversion in the electric energy by means of a piezoelectric converter.

FIG. 6c/A shows a variant of energy conversion of an energy of a heat pipe working gas flow 7 in an energy of mechanic vibrations (in this case in an energy of mechanic vibrations of some strings 28) with the further conversion in the electric energy by means of a piezoelectric converter. In the shown embodiment example some additional workpieces 29 are fastened to the strings 28 to generate the crossways forces due to the Bernoulli-principle, which way the vibrations of these strings are arising. This result is attained because the gas flow, which one streams between two workpieces 29, generates an attractive force between these workpieces because of the Bernoulli-principle; and after the collision these workpieces are moving again in the opposite directions, and after that, cyclic, again to meet one another up to the next collision.

In some embodiment examples the cross-sections of working pieces 29 can be not-symmetrical. In particular, these workpieces can be executed such way, that their cross-sections have a form of an airplane wing. This way the crossways forces are arising. This way two near each other located strings are moving to meet each other up to the collision of workpieces 29, and then in the opposite directions, periodically.

Instead of the workpieces 29 one can use the strings 28/A with the not-symmetrical cross-sections. In particular, these cross-sections these strings can be executed such way that these their cross-sections have a form of an airplane wing (FIG. 6c/D). Therefore the two-near from each other positioned strings will move (vibrate) in the opposite directions to meet each other up to the collision, periodically.

Of course, an analogical way, the cross-sections of both the workpieces 29 and the workpieces-carriering strings can be not-symmetrical. Important is, that the mechanic construction elements are located in a gas flow, and this gas flow generates the mechanic swings (or vibrations, oscillations, cyclic mechanical movements and so on) of these mechanic construction elements, which way a mechanic energy of this gas flow is converted in a mechanic energy of these swings, and after that the mechanic energy of these swings is converted in an electric energy, in particular (among other possibilities) by means of a piezoelectric converter, which one uses piezoelectric crystals for this aim.

The above-mentioned (a.m.) swings can be reciprocating, twist (torsions)-kind or both. (In the case of the reciprocating swings a pressure and tension or their changes are cyclically generated, and in the case of the twist (torsions)-kind swings the twist (torsions)-deformations are cyclically generated by alternating twisting in the opposite directions (clockwise and anticlockwise). The mechanical forces, which are arising according to the Bernoulli-Principle, can generate/cause both the reciprocating and twist (torsion)—kind motions of the placed in a gas flow workpieces 29 and strings 28 or 28A.

Both the reciprocating and twist (torsion)—kind swings can generate the pressure-swings in a piezoelectric crystal, which pressure-swings generate/cause an electric energy. The a.m. swings can also generate the shear-kind stresses in a piezoelectric crystal (to make it work in shear) and to generate an electric energy this way.

The a.m. mechanic swings (in the both cases) can be converted in an electric energy also through the Faraday-Principle (s. for example an embodiment example in the FIG. 6i/A, FIG. 6i/B).

Instead of the piezoelectric converter of energy one can use here also a magnetostrictic converter (s. for example an embodiment example in FIG. 7 and further description below). Instead of the piezoelectric converter of energy one can use here also a converter with a photoconductive crystal (in particular a piezosemiconductor; in particular a CdS-piezosemiconductor)-s. for example an embodiment example in FIG. 8 and further description below.

To provide an optimal (maximal) energy transfer from a gas flow to the a.m. swinging system, this energy transfer can be executed in a resonance mode. I.e. the a.m. parameters of a system (dimensions of the strings, elastisity of strings, if necessary dimensions of the workpieces, form of the strings and workpieces, etc.) on the one hand, and the parameters of the gas flow (velocity, direction, time-dependent changes, etc.) on the other hand, must correspondently correlate with each other.

FIG. 6c/B shows in details a possible variant of fastening of the strings for the embodiment shown in the FIG. 6c/A and given in the description to the FIG. 6c/A. The strings 28 are fastened at the carriering frames 49, which carrier frames 49 comprise also the piezocrystals 13 as well as the all belonging to this fastening elements (FIG. 6c/B). (As it is said above, the all given in this description examples of embodiments of the generator 1 can be used not only inside a heat machine, but also for conversion of a wind energy or for conversion of energy of any other kind of a gas flow).

Axonometric view FIG. 6c/C shows a possibility to arrange the shown in a FIG. 6c/B devices pile-like, one besides each other, with the aim to use an energy of a gas flow 7 more completely. For this aim one places the carriering frames 49 (with the strings 28) perpendicular to the gas flow direction 50 (i.e. in a true working position), and after that one places an each next carriering frame nearby and parallely to a previous one (FIG. 6c/C). This way the gas 7 flows through the placed in the carriering frames 49 means successively. The a.m. strings 28 can be fastened in the carriering frames 49 both horizontal and vertical. Other string positions at an angle to a frame are also possible.

The described device can be executed as a system, which one consists of many changeable modules, which modules are electrically connected. This assertion is valid also for all other devices in this description.

The presented above method and device can be used also for producing of electric energy from the wind. For this aim the described converters of the mechanic gas flow energy in the electric energy can be powered (driven) by a wind flow, but not by a heat pipe gas flow: This assertion is valid also for all other presented in this description converters of a gas flow energy in an electric energy.

In the above mentioned FIG. 6c/B one separate module 52 is shown. Next further modules can be placed nearby in the same geometric plane, and these modules can be electrically connected (FIG. 6c/E). Or (or also additionally) a converter (generator) can be put together from the 3-dimensional pile-kind modules. I.e. a pile 53 of the carriering frames 49 (s. FIG. 6c/C) can be executed as a separate module, which one also has a separate electric in&output-connection. In this case, by necessity to change a module 52, one changes not a flat carriering frame 49, but a pile 53. Self-evidently, the module 52 can contain also many carriering frames 49, which are placed in one same plane (and, in particular, also piles, collected from these flat frames collections).

One can convert an energy of a heat pipe gas flow also direct in an energy of the waves of pressure, which waves propagate along some surface, wherein the energy of these waves of pressure are further converted in an electric energy piezoelectrically or magnetostrictically. The mechanic principles for it are disclosed in the FIG. 6d and FIG. 6e. FIG. 6d shows a flag on a flagstaff 41, in an air flow (wind flow) 7. A wind flow flows along a flag always turbulent, and therefore bends (coils) the flag material along the flag. FIG. 6e shows a piezoelectric plate under the same conditions. A piezoelectric plate 13 is placed in a heat pipe gas flow (or in a gas flow, or in a wind flow) 7 approximately parallely to the gas flow direction. The turbulences 42 cause the waves of pressure, which pressure waves propagate along the piezoelectric crystal plate 13; this way an electric energy is generated, which one is supplied from the electrically conductive surfaces 43 of the piezocrystal 13 to an external output 34. FIG. 6*f* shows an embodiment example, wherein many a.m. piezoelectric crystal plates (or many coated with the piezoelectric crystals carrying plates) 13 are installed in a transport zone 35 of a heat pipe 2. The electrically conductive surface coating layers 43 of the piezocrystals 13 are electrically connected with each other accordingly to the signs of charges. The resulted this way electric contour delivers to outside an electric energy 34. The all other shown in the FIG. 6*f* construction elements and systems work as it was already described above.

FIG. 6*g* shows an embodiment example, wherein a mechanic energy of the gas flow turbulences is transmitted to a piezoelectric converter by an intermediate solid body, but not directly. An end 38 of bend-shaped elastic plate 37 is fixed between two piezoelectric plates 13/A and 13/B, and this plate 37 is placed in a heat pipe gas flow 7. Wherein the plate 37 can be placed in the flow 7 such way that the mounted end 38 of this plate is oriented to meet the flow (i.e. towards to the flow source). Besides, the form of bend (form of winding) of the a.m. plate is approximately similar to a winding form of a fish body, which fish swims in a water flow in the opposite to this water flow direction. The gas flow 7 forces the plate 37 to execute swings (or vibrations), wherein the free end 39 of this plate stays consecutive in the positions 1-2-1-3-4-2- and soon, and the fixed end 38 of this plate generates pressure in the piezoelectric crystals 13A and 13B consecutive in the zones z1 to z4. In particular the pressure in the zones z1 and z4 corresponds to the position 2 of the free end 39 of this plate, and the pressure in the zones z2 and z3 corresponds to the position 3 of the free end 39 of this plate. Position 1 is neutral (no pressure). An electric energy, which one is generated in the piezoelectric crystals because of change of pressure, is collected from the electrically conductive surfaces of the piezocrystals, summed up, and conducted to the external output 34, as it was already described in details above.

In the gas flow 7 one can place simultaneously many above described elements nearby one to another (these elements are the bend-shaped resilient plates, which are fixed with one of their ends between two piezoelectric crystals-s. above), wherein the electric energy from the above-mentioned piezoelectric converters is summed up and conducted to outside, as it is described in details above (FIG. 6*h*/A-FIG. 6*h*/E).

FIG. 6*h*/A-FIG. 6*h*/E show a front view (FIG. 6*h*/A), a back view (from the side of the gas flow, i.e. from the side, wherefrom the gas flows) (FIG. 6*h*/B), and a top view (FIG. 6*h*/C oder FIG. 6*h*/D). Difference between the variants of embodiments, which are shown in the FIG. 6*h*/C and FIG. 6*h*/D is that in the first case one uses many, fixed one near another, narrow plates 37, and, in the opposite, in the second case one uses one wide plate 37. One can vary an optimal quantity of the nearby one to another placed plates and their optimal width dependently on the parameters of a system (dimensions, resonance-parameters, interaction between the nearby one to another located plates due to the Bernoulli-principle, etc.). Axonometric view FIG. 6*h*/E shows a possibility to place the above-described and shown in the FIG. 6*g* and FIG. 6*h*/A to FIG. 6*h*/D devices one near another as a stack (pile), and this way to use an energy of the gas flow 7 more completely. With this aim one places a carrying frame 49 (which one carries the plates 37 and the piezocrystals 13 with all correspondent elements) perpendicular to the flow direction 50 (i.e. in a true working position), and after that one places an each other next carrying frame nearby and parallely to the previous one (FIG. 6*h*/E). This way the gas 7 flows successively through the each of carrying frames 49 with the fixed there means. To fasten better way the piezocrystals 13 with the plates 37 at the carrying frames 49, one can fasten these elements (i.e piezocrystals 13 with the ends of plates 37) in the carrying tubes 51 or by means of carrying fixator 51, wherein after that, these carrying tubes or carrying fixators 51 are fastened at the carrying frames 49. The a.m. elements 51 can be fastened at the carrying frames 49 both horizontally and vertically. Fastening by other angles are also possible.

Instead of the bend plates 37 one can use also any other kinds of elements 37/A, which elements can have any other geometric form, wherein the a.m. elements are mechanically connected with the piezocrystals 13 (FIG. 6*h*/F). These elements can be placed also from both sides of the piezoelectric clamp 13. Important is, that by an interaction with a gas flow 7 (in particular with a heat pipe gas flow, with a wind-air flow, etc.), these a.m. elements generate a periodically arisen pressure on the piesocrystals 13 or on their separate parts (zones). This is attained such way, that the a.m. elements 37/A generate, in particular due to Bernoulli-principle, the mechanic swings, when the a.m. elements 37/A interact with the gas flow 7, with the nearby placed other a.m. elements 37/A, and with the crystal clamps 13. These mechanic swings generate a periodically changing in time pressure at the piezocrystals 13. And this way an energy of gas flow is converted in an electric energy.

The described device can be executed as system, which one consists of many changeable, electrically one with another connected modules.

Instead of a heat pipe gas flow 7 one can use also a wind, to produce an electric energy from a wind energy. The presented above description for the method and devices is valid also for this case, wherein instead of the flow of a heat pipe working gas, the described devices are powered by the wind flow. It is valid both for the above-described piezoelectric principle of energy conversion, and also for the other described in this description principles of energy conversion of the mechanic energy of a gas flow in the electric energy.

In the above-mentioned FIG. 6*h*/A-FIG. 6*h*/D one separate module 52 is shown. The next further modules can be placed nearby, in the same geometric plane, wherein they can be connected electrically one with another (FIG. 6*h*/G). Or (or also additionally) one can collect a converter from 3-dimensional stack-kind modules. I.e. a stack (pile) 53 of carrying frames 49 (s. FIG. 6*h*/E) can be executed as a separate module, in particular also with a separate electric output. In this case, by a replacement-necessity, one replaces a whole stack 53 as a module 52, but not a flat carrying frame 49. Of course, a module 52 can contain also many carrying frames 49, which are placed in one same geometric plane. (As well as a module 52 also can contain a stack, which one is assembled together from many placed in one geometric plane carrying frames 49). As it is explained above, it is valid both for the embodiments examples, where the electric energy generator 1 is driven by a natural wind (or by any kind of other source of an air-flow or gas-flow), and for the embodiments examples, where the electric energy generator 1 is driven by a gas flow of a working gas of a heat machine (in particular of a heat pipe). In the first case the propulsive gas flow 7 is a wind or a gas flow from a wind-guiding or wind-concentrating system, and in the second case the propulsive gas flow 7 is a gas flow, which one is caused by a heat machine (in particular by a heat pipe). I.e. the above described modules can be placed both in a wind flow, and in a heat pipe gas flow, as well as in any other kinds of gas flows.

As it also follows from the description above, in all presented in this description cases one can use the all presented solutions for the electric energy generator 1 not only for this generator 1 as a part of a heat machine, but also for this generator separately, for conversion of a wind energy in an electric energy, or for conversion of energy of a gas flow from any kind of gas flow sources in an electric energy.

The method can be executed both in an uninterrupted mode and in a pulsed mode. An embodiment example in a pulsed mode is schematically presented in the FIG. 14. FIG. 14 shows a variant of an energy conversion of a gas flow of a working gas 7 into an energy of mechanic vibrations of a crystal of a piezoelectric converter 13 (directly or by means of a connected with this crystal solid body), with the following conversion of the energy of these mechanic vibrations in an electric energy by means of this piezoelectric converter. In this case a) these vibrations are generated by the arisen turbulences in a heat pipe gas flow, wherein these turbulences can, in particular, move along the piezoelectric crystal, and this way generate the deformation waves in this crystal; or b) the impulse-kind pressure blows of the heat pipe working gas can force upon a piezoelectric (or magnetostrictic) crystal; or c) both the a.m. turbulences and the a.m. blows are influencing upon the a.m. crystal together.

A detailed description of a method and device, which are presented in the FIG. 14, is given also below.

The strings or rods can be also used for an energy conversion due to Faraday-principle. In one other embodiment example one can convert an energy of mechanic swings of the strings 28 into electric energy by means of a Faraday generator. In some variants of this case the strings 28 are electrically conductive (for example they are executed from a metal), and these strings are placed in a magnetic field. This way these vibrated strings are crossing the magnet field lines, and this way an electromotoric force is generated in these strings. These strings can also contain, in particular, many one from another insulated cable conductors, to increase an electromotoric force.

In one other variant of this example (FIG. 6i/A) a mechanic energy of a gas flow is converted into a mechanic energy of swing-kind twist-motions of the strings, as it is shown schematically in the FIG. 6i/A. In this case the strings must not be electrically conductive (but can be). A coil (solenoid) with a winding 45 is fastened rigidly to the string 28 such way, that an axis 46 of the coil 44 is approximately perpendicular to this string 28. The string 28 with the coil 44 are placed in a magnet field 47. The coil 44 and magnet field 47 create this way a Faraday-generator 48, which one converts the energy of twist-swings of the strings 28 into an energy of electric oscillations in an output 34. This energy can be further transformed by means of electric or electronic devices in the actually required (suitable) forms of electric energy. The twist-swings of the strings 28 are generated by interaction of the gas flow 7 with the bend plate 37, as it was described in details above.

In one other variant of this embodiment example (FIG. 6i/B) a mechanic energy of a swing-kind twist-motions of the strings is converted in an electric energy by means of a piezoelectric converter. A hammer (presser) 54 is fastened to a string 28 by means of a mounting 55. By twist-swings of this string a vibration-kind pressure of the hammer (presser) 54 on a piezocrystal 13 arises, and therefore an electric energy is generated and conducted to an output 34. (The method is shown here schematically; in reality the electric outputs are correspondently connected one with another). In all other aspects this embodiment example is similar to the previous embodiment example.

A case of a magnetostrictic converter in respect to a succession of energy conversions (energy of gas flow→energy of mechanic swings→a piezoelectrically or magnetostrictically generated electric energy) is absolutely analogic to the described above in details piezoelectric converters. Therefore from all possible variants, where an acoustic generator acts as a source of mechanic swings, only one variant of magnetostrictic generator is shown in the figures. One shows here a schematic presentation of a magnetostrictic generator as a difference in respect to a piezoelectric crystal plate. Other pictures have to be the same as in the shown "piezoelectric case", but with the shown in the FIG. 7 magnetostrictic generator, and therefore they are not shown as the completely analogous.

FIG. 7 shows a variant of energy conversion of the working gas 7 in the energy of acoustic swings with the following conversion in an electric energy by means of a magnetostrictic converter.

The energy of the gas flow 7 of the heat pipe is converted in the energy of acoustic swings by means of a Hartman-generator 12, or by means of one of it's modifications. In the zone of the generated this way acoustic swings one places an acoustic-electric converter, for example a piezoelectric converter 13 or magnetostrictic converter 14.

The electric energy of the above-mentioned converter is brought to the outer use of the consumers. For generation of acoustic swings, in particular ultrasonic- and sound-swings, one can use instead of a Hartman-generator any other kind of generator of acoustic swings, for example a whistle, a siren, a membrane- or string-generator, or a generator, which one uses swings of a solid body in a gas flow, or any device, which one creates the flow turbulences and then, in particular, converts an energy of these turbulences in the energy of vibrations of a solid body, etc. One can also use mechanical vibrations, which vibrations have more low frequencies, then the acoustic frequencies (s. also description for the "piezoelectric case" above).

FIG. 8 shows a variant of energy conversion of a flow of a working gas 7 in an energy of acoustic swings, with the following conversion in an electric energy by means of a piezosemiconductor-converter 15, which one have photoconductive properties, for example, Cd S. The converter 15 is placed in an internal space of a the heat pipe in the zone of acoustic swings of the generator 12, analogously to the given above description for the converter 13. Nevertheless the surface of the converter 15 is placed under a transparent window 17 in a heat pipe coat. The sun light 19 falls on the surface of the crystal 16 either directly through this window or through an optic system. Under the influence of acoustic swings of the generator 12, an acoustic-EMF arises in the piezosemiconductor 16, which acoustic-EMF in photoconductive crystals essentially depends on the light exposure.

Two independent sun radiation flows can be directed to the heat pipe vaporizer 4 and to the converter 15. Nevertheless one can also select usual way the spectral components from this sun radiation flow, which spectral components correspond to the absorption-frequencies of the photoconductive crystals 16 of the converter 15. Finally one directs that part of sun radiation flow, which one can be absorbed by the crystal 16, to the surface of this crystal, and the rest part to the vaporizer.

In all above-mentioned variants of device design, an energy of acoustic swings can be supplied to the acoustic-electric converter either directly (immediate) in the gas flow channel, or by means of a sound-guide 18. In the second case one places an acoustic-electric converter (or photoacoustic-electric converter) outside the heat pipe.

The above-mentioned variants of the method realization are normally expedient for creation of devices with a relatively low output voltage and output power, which devices make it possible to use natural low temperature differences.

Of course, also an using of thermo-mechanic-electric converters is also possible in the frames of this method. An energy of mechanic motion of the heat pipe working gas can be converted in an energy of mechanic rotation or mechanic swings of some working body, which energy is finally converted in an electric energy by means of a mechanic-electric converter. Wherein this a.m. working body (for example a turbine) of a mechanic-electric converter is placed in the gas flow of the heat pipe. Nevertheless this variant of the method realization has such a disadvantage in comparison with other variants, that the devices for realization of this variant of method have to contain the mechanically moving parts.

Below the variants of the method realization are described, which are normally expedient to attain the middle- and high output powers. It can be made possible by conversion of a gas flow energy into an electric energy due to MHD-generation principle or due to electrostatic generation principle.

Normally in the MHD-generators an electrically conductive gas (plasma) or an electrically conductive liquid flows in a magnet field and crosses it's magnetic lines of force. It leads to the diversion of the charges with different signs in different directions, and this way to the separation of the contained in the liquid (or in the gas) electric charges. It leads to generation of electric energy. An efficiency of magnetohydrodynamic generation is limited by the circumstance, that it is difficult to provide a high electric conductivity of working gas in the gas-MHD-generators. Working liquids in the liquid-MHD-generators have a high electric conductivity, but it is difficult to attain their high speed of flow.

In the proposed method the working body is a mixture of a gas and liquid, and the electric charges are deviated in a magnet field together with the drops of a sprayed liquid, which drops contain these charges. Wherein a liquid is introduced in the gas flow, this liquid is sprayed, the liquid drops are electrically charged, and then these charged drops fly together with the a.m. gas flow inside a magnet field (or inside the crossed electric and magnet fields), as charges usually move in an usual MHD-generator. The further work and removal of voltage is executed an usual for the MHD-generators way, i.e. either by means of electrodes (the conduction-type MHD-generators), or by means of removal of the induced electric currents (the induction-type MHD-generators).

As an example FIG. 9*a*) shows a possible vector diagram for an a.m. droplet-type converter with the conversion on the MHD-generation principle. Here J-flux of the gas flow, B-magnetic flux density, U-electric voltage.

The supply of the liquid in the gas flow and the spraying of this liquid in this flow is executed by a sprayer.

Below a description of one of possible known constructions of such a sprayer is given, which one makes it possible to spray a liquid in a gas flow exclusively by means of an energy of this gas flow. This construction (device) contains at least one thin tube, one end of which one is placed in a gas flow, and the other end is placed in a liquid, which liquid have also a free surface. Besides, this free liquid surface borders on a gas, which one either is at rest or it moves relatively to the free liquid surface with a speed, which one is less than a speed of the gas flow relatively the located in this flow tube end of the sprayer. The arisen this way, because of the Bernoulli-principle, pressure difference is forcing the liquid in the tube to raise up and to go in the gas flow.

The recovery of this liquid in the heat pipe takes place by using of a transport zone, which one contains the narrow and wide sections. The tube of the sprayer is positioned in a narrow section, and a body for interception and collection in the liquid of the charged droplets is positioned in a wide section. The free surface of the liquid collects the liquid from the discret drop-form in the continuous liquid form in the wide section, wherein the free surface of the liquid is contacted with the gas in a wide part of the gas flow.

Theoretically in all mentioned variants one can use a powder instead of drops of liquid to execute a method. Nevertheless it is less suitable because of the problems to organize a recovery loop.

FIG. 9*b*) shows a possible vector diagram for a droplet-type converter with the conversion on the electrostatic generation principle. Here J-flux of the gas flow, U-electric voltage.

Execution of the method on the electrostatic generation principle is carried out through an using of liquid particles (sprayed liquid) as one of the working bodies. Wherein the charges can be separated between the working bodies as it takes place in an usual electrostatic generator, i.e. through friction or collisions of working bodies. Or the charges can be loaded on the working bodies through electrostatic induction. And after that the charged this way working bodies are moved off in a space from the oppositely charged bodies. A generated in an usual electrostatic generator (for example in a Van-de-Graaff-Generator) electric voltage reaches several mln. Volt. Nevertheless an output power of the such known devices is low, because a speed of transfer of charges is limited both by speed of motion of mechanical details of the electrostatic generator, and by surface area of the such solid working body of the electrostatic generator as a transporter of the charges. By realization of the method on the presented claims, the liquid particles are supplied in a gas flow for example by means of a sprayer. The a.m. liquid working body is electrically charged through friction or collisions with an other liquid or solid working body. In a first case (friction) this other working body is placed at a nozzle output of a sprayer. In a second case (collisions) this other working body, for example in a form of a grid or of a series of sticks, is placed in a gas flow across the way of flow of liquid particles. The separation of the charges of the working body and the moving in a space of the charged liquid particles from an other working body can be executed by means of a gas flow energy. Besides, a) the summed (total) surface area of the surfaces of the liquid particles is essentially bigger, then the surface area of the solid transporters of charges (for example bands in usual electrostatic generators); b) the device does not have mechanically moving details of construction, which mechanically moving details could limit the velocity of charges transfer. Therefore the both causes of the output power limitation in the existing electrostatic generators are removed in the proposed method and device. Exists also a variant of the method realization, by which one a gas flow energy is converted in an electric energy through a combination of the MHD-generation principle and the electrostatic-generation principle. Wherein all steps of the method execution are carried out analogously to the already presented description for a droplet-type converter with the conversion on the electrostatic principle of generation. Motion of the charged liquid particles takes place, nevertheless, in a magnet field, wherein an angle between the magnetic lines of force of this magnet field B (magnetic flux density) and the vector J (the flux of the gas flow) is not equal to 0. It is evident, that in the frames of the presented claims the energy conversion both on the MHD-generation principle and on the electrostatic generation principle is described with one generalizing mathematical model with borderline cases, shown for example in FIGS. 9a) and 9b). It means that in the case of a "pure" electrostatic generators one could mean, that the vectors B and J are collinear, i.e. the direction of the vector of the magnetic flux density and the vector of the gas flow direction are parallel.

FIG. 10(a-c) shows a schematic presentation of the method execution, wherein the energy converter 26 is submerged in a water, or in a ground-water under a ground surface (FIG. 10a); at (on) a water surface, without using of a radiation guide (FIG. 10b); and in outer space apparatuses (FIG. 10.c).

In the case (a) the increasing of output power through the increasing of temperature difference between the heat pipe vaporizer and heat pipe condenser is attained such way, that the converter 26, i.e. the heat pipe condenser and the heat pipe vaporizer are placed in a place, where the heat pipe condenser is easy to cool (for example in an ocean deep water or in a ground water under-ground in a drill-hole), and a sun energy 10, or a radiation energy from other source, is supplied to the vaporizer through a radiation guide 25, which one is long in this case. Of course, this principle can be used for the energy supply not only to a "heat pipe"-type energy converter, but also to supply energy to any kind of energy converters, which convert a sun- or any other kinds of radiation energy.

FIG. 11 shows one of possible variants of using of the method for utilization of industrial heat wastes, which heat wastes are contained in a flow 22 of some possible gas or liquid. In this case the vaporizer 4 of a heat pipe is placed in this flow 22, and the heat pipe condenser 5 is placed outside of this flow 22, in thermical contact with some cooling medium 23. Or a "heat pipe"-type energy converter is placed completely outside the a.m. flow 22, and a heat energy of this flow is supplied to the heat pipe vaporizer by means of some heat exchanger.

FIG. 12 shows an embodiment example of a device with a working liquid recovery pump 27. The pump 27 is installed such way, that the a.m. pump forces are added up to the a.m. capillary forces and a.m. gravitational forces.

FIG. 13 shows an embodiment example of a device with a working liquid recovery pump, wherein this is an embodiment example for laboratory investigations.

The method and device can work also in the pulsed mode (FIG. 14).

In this embodiment example the vaporizer 4 can contain (instead of- or additionally to the capillary structure) an insert 30 in a vaporization chamber 31, which insert has an essentially big surface area, and which insert also absorbs a sun radiation good (for example it is a metal insert with a black surface); wherein this insert is heated by the sun radiation, which one is supplied inside to the vaporizer 4 through a radiation guide 25, as it is described above. The heat pipe working liquid 6 is injected in the vaporizer 4 through an injector 32. After that this liquid 6 drips on the heated surface of the insert 30 and evaporates there quickly and simultaneously on a large surface, which way an over-pressure arises explosively in the vaporizer 4. The arisen this way heat pipe working gas 7 strikes (presses) on the crystal of the piezoelectrical (or magnetostrictical) converter 13, and generates this way an electric energy 34. After that the heat pipe working gas 7 presses, for example by means of a membrane 33, on a heat pipe working liquid 7, which one is located in a heat pipe transport-zone 35. Because of this pressure the heat pipe working liquid 6 is injected in the vaporizer 4 through an injector 32 or through a valve 32. Simultaneously this pressure can be increased by use of an additional valve 36, located between the transport zone 35 and condenser 5. Because of this valve 36 the heat pipe working liquid 6 does not go back in the condenser 5 during the overpressure-phase. Nevertheless if one uses a capillary structure 502 in the condenser 5 and no capillary structure 512 in the transport-zone 35, this additional valve 36 is unnecessary in the majority of cases. The reason for it is that in fact some time is necessary to pump a liquid under the pressure through a capillary structure. Therefore no considerable liquid transfer from the transport zone back in the condenser during a short pressure blow takes place. But the time of this pressure blow is enough to execute a liquid injection 6 through an injector 32 from the transport zone 35 in the vaporizer 4. In this case the a.m. "pump energy" of the a.m. pump 27 is supplied by a heat pipe working gas 7.

Below the most common of the above mentioned examples of embodiments are shortly summarized.

In one embodiment a sun energy, or a heat energy, or a radiation energy is converted in an other form of energy, where the conversion of energy in the others, not heat (not thermal) kinds of energies, takes place inside a heat pipe, whereupon this energy in its not-heat (not-thermal) form is extracted (conducted) out from the internal part of the heat pipe, and the energy in its heat (thermal) form is extracted (conducted) away from that part of working body (fluid) of the heat pipe, which working body (fluid) is currently in the condenser of the heat pipe, where the extracting (outflow) of this heat energy is executed by a heat-extracting liquid, which one is placed outside of the condenser of the heat pipe, wherein, additionally, an energy in its mechanical or electrical, or any other form is supplied to the working liquid of the heat pipe, and this energy is converted into the mechanical energy of the mechanical movement of this working liquid, wherewith (which way) this working liquid is pumped by this energy from the condenser to the vaporizer.

In one embodiment a sun radiation or a radiation from an other source is supplied directly to the capillary structure (to wick) of a heat pipe or to a working liquid of a heat pipe through a transparent for this radiation material, and after that it is supplied, among other possibilities, directly in the channels of the wick, which channels are bordered by the walls of these channels, wherein this above mentioned radiation spread itself, among other ways, through the multiple reflecting from the walls of channels, and therewith it (radiation energy) is absorbed by working liquid, and thereby the working liquid evaporates either by boiling or without boiling.

In one embodiment the radiation is led directly in the material of the wick, and the radiation spread itself in it through the numerous multiple reflections along the boundaries between the material of a wick- and working liquid of a heat pipe, wherein a part of energy is absorbed by a working liquid during the every reflection.

In one embodiment the surface area of the boundary between the working liquid and working gas of a heat pipe is a bigger area, among others also much more bigger area, than the surface area of a geometric figure, which one contains the space with a device, where the evaporation process takes place.

In one embodiment the sun energy or a radiation energy is led to a vaporizer or to a wick of a heat pipe or to a working liquid of a heat pipe through a radiation guide.

In one embodiment a heat pipe is placed directly near a cooling media, among others in a water, among others in a sea water, ocean water or in a lake water, also in a certain deepness, or in a ground water in a certain depth from the ground surface, where the radiation guide is placed, in among other places, in a "borehole".

In one embodiment a process for utilization of heat wastes, which are contained in a gas flow or in a liquid flow takes place, where the heat energy of this flow is passed to (is transferred to) a working body, wherein the heat energy of this liquid flow or of this gas flow is led to a vaporizer of a heat pipe and it (this a.m. heat energy) is converted in the kinetic energy of the gas movement of a heat pipe, and the kinetic energy of the gas movement of a heat pipe is converted in an other, not-heat form of energy, among others also in an electric energy; and this, this way obtained energy is led out of the heat pipe, wherein the working liquid of the heat pipe is pumped back by a pump from the condenser into the vaporizer of a heat pipe.

In one embodiment a device for conversion of energy takes place, which device contains a zone for interaction with a sun- or other kind of radiation, or a zone for the supplying of heat energy, wherein this device contains a heat pipe, which heat pipe contains a converter of the energy of the working gas of the heat pipe in an other, not heat kind of energy, wherein, among others, a wall of the condenser of heat pipe, or the part of wick, which one is located in the condenser, or a heat pipe's working liquid, which one is located in the condenser, are in thermal (heat) contact with a liquid, which one is located outside the internal space of the condenser, and which one (liquid) is separated from the working liquid of the heat pipe by a partition wall, which partition wall is impermeable for a substances transfer, wherein the heat pipe comprises a pump, or any other means for the pumping of a liquid or for the creation of an overpressure in a liquid (hereafter this am. pump or am. means are called as the "pump"), which pump can pump out a working liquid of a heat pipe from the condenser back to the vaporizer.

In one embodiment the above mentioned pump is placed approximately in the transport zone of a heat pipe.

In one embodiment the zone of interaction with the sun radiation or the zone of supplying of an external heat energy is, in particular, a vaporizer of a heat pipe.

In one embodiment a converter of the energy of a working gas of a heat pipe in the others, not thermal (heat) forms of energy, is placed, completely or partially, inside the heat pipe.

In one embodiment the wick of a heat pipe in its vaporizer, condenser and transport zone, is characterized by different physical properties, among other properties by different dimensions, structures and form of the cross-sections of the capillaries, among other properties by existence or absence of arteries, or also by different dimensions and structures of arteries, or by form of the cross-sections of arteries, among other properties by different materials of wick, besides among other properties, even by absence of wick in vaporizer, condenser or in transport zone, or in their separate parts.

In one embodiment the coat of a heat pipe or the wick of a heat pipe or they both are made from a material, which one is transparent for the radiation, whose energy evaporates the working liquid of the heat pipe.

In one embodiment this material is optically transparent.

In one embodiment the device comprises a radiation guide which one is connected with the energy converter, among other things, with a heat pipe's vaporizer or with that part of a heat pipe's wick, which part is placed in the vaporizer.

In one embodiment the part of radiation guide, which one (part) is located in the vaporizer, and through which one (part) the energy transfer into the heat pipe's working liquid is executed, has a big or an extensively developed surface (interface) of the boundary with the working liquid.

In one embodiment the area surface of the boundary between the working liquid of a heat pipe and the material of the input energy supplier, from which one the energy goes in the working liquid, is bigger, among other possibilities also much more bigger, than the area surface of a geometric figure, which one borders the volume of the vaporizer.

In one embodiment the part of radiation guide, which part is located in the vaporizer, and through which part the energy transfer into the heat pipe's working liquid is executed, is a wick of the heat pipe or a part of this wick.

In one embodiment the surface area of the boundary between the working liquid of the heat pipe and the working gas of this heat pipe is bigger, in particular also much more bigger, than the area surface of a convex geometric figure, which figure covers the space, which space is occupied by the vaporizer of the heat pipe.

In one embodiment a wick of a heat pipe, in particular a wick of a vaporizer of a heat pipe, has a geometric form, which one creates a big surface area of the boundary between the working liquid of a heat pipe and the working gas of a heat pipe, among other possibilities a heat pipe's wick, in particular a wick of a heat pipe's vaporizer, is built in a spiral form, or the separate parts of this wick are built in a spiral form.

In one embodiment a vaporizer of a heat pipe is placed in a section of a tube or in a section of a gas pipe-line (air-duct) or of a liquid pipe-line, and this section is built with a possibility to be connected with the other gas pipe-lines (air ducts) or liquid pipe-lines, wherein the heat pipe is placed relative to the a.m. section such way, that an outer liquid stream or a gas stream can flow relative to the heat pipe's vaporizer in the space between the vaporizer and internal surface of the a.m. section; and the heat pipe's condenser is placed such way, that it (condenser) is in a thermal (heat) contact outside the a.m. section with a cooling liquid or with an other cooling media.

In one embodiment the heat pipe, which one contains a generator, is placed completely outside of the section of a tube (of a gas pipe-line liquid pipe-line), and instead the vaporizer of this heat pipe, an end of a heat exchanger is placed in this a.m. section, wherein the other end of this heat exchanger is connected to a vaporizer of this generator-containing heat pipe.

In one embodiment the energy of a working gas of a heat pipe is converted in the electrical energy.

In one embodiment the device comprises a generator of electrical energy.

In one embodiment the energy of the movement of the heat pipe's working gas is converted in the energy of mechanical swings (oscillations, vibrations), among others in the energy of acoustic oscillations (vibrations).

In one embodiment the converter of energy of working gas of a heat pipe in an other, not heat form of energy, comprises a generator of mechanical swings (oscillations, vibrations), among others, acoustic oscillations (vibrations), among others, also ultrasonic- and sound oscillations (vibrations).

In one embodiment the generator of acoustic swings (oscillations, vibrations) is a Hartmann-generator or one of its modifications.

In one embodiment the generator of acoustic swings (oscillations, vibrations) is a whistle.

In one embodiment the generator of mechanical swings (oscillations, vibrations), among others, the generator of acoustic swings (oscillations, vibrations) comprises a membrane, a string, or any other solid body, which one performs the mechanical swings (oscillations, vibrations) or circular movements (gyrations), generated by the energy of a flow of a working gas, among others by the forces, which were arisen due to the Bernoulli-Principle.

In one embodiment the energy of mechanical swings (oscillations, vibrations), or the energy of acoustic swings (oscillations, vibrations) is converted in the electric energy.

In one embodiment the device comprises a converter of the energy of mechanical swings (oscillations, vibrations), among others a converter of acoustic swings (oscillations, vibrations) into the electrical energy.

In one embodiment the device comprises a piezoelectric or magnetostrictiv converter, or the device comprises a generator, which one converts the energy of mechanical swings (oscillations, vibrations) into the electric energy.

In one embodiment the producing of electrical energy is executed by the common action on a converter a) by an energy of mechanical, among others, of acoustic swings (oscillations, vibrations) and b) by a sun- or an other high frequent electromagnetic radiation.

In one embodiment the flow of sun radiation is divided on two parts, where the first part is directed to a vaporizer of a heat pipe, and the other one is directed to a photoconductive crystal of the energy converter.

In one embodiment these parts of flow of sun radiation differ from one another by their frequency, wherein only a narrow part of a frequency band of an electromagnetic sun radiation, which one influences on the conductivity of the photoconductive crystal, is directed to the crystal of the energy converter, and the rest part of the frequency band of the radiation is directed to the vaporizer of the heat pipe.

In one embodiment this device comprises a photoconductive (fotoleitenden) crystal, among others a piezosemiconductor.

In one embodiment the device comprises a CdS-piezosemiconductor.

In one embodiment the device comprises a generator for the excitation of the mechanical swings (oscillations, vibrations) in the above-mentioned crystal, as well this device comprises a transparent window or an other optical system for the supplying of a sun light or of an electromagnetic radiation from an other source to the a.m. crystal.

In one embodiment the photoconductive crystal is placed in a region of the output swings of a generator of mechanic swings, or in a region of a sound field of an acoustic generator, wherein a surface of the a.m. crystal is placed wider a transparent window in a coat of a heat pipe, in a region of an optical radiation incidence.

In one embodiment the source of mechanic swings of the photoconductive crystal is a flow of a heat pipe working gas from vaporizer in a condenser.

In one embodiment a converter of energy of mechanic swings in an electric energy, in particular an acoustic-electric converter, or photoacoustic-electric converter is placed outside a heat pipe, and it (converter) is connected with the source of mechanic or acoustic swings by means of a conductor (guide) of mechanic swings, or vibrations guide (vibrations conductor), or sound guide (conductor of sound).

In one embodiment an energy of motion of a heat pipe working gas is converted in an electric energy by means of a mechanic-electric converter.

In one embodiment a generator of electric energy is a mechanic-electric converter, which one is placed in a flow of a working gas of a heat pipe from vaporizer in a condenser.

In one embodiment an energy supply to an energy converter is executed (directly or through a connected with this converter radiation guide) by means of sun radiation concentrating devices, in particular by means of a Fresnel-lens, or a Fresnel-mirror, or by means of both these methods together.

In one embodiment an energy of motion of a working gas of a heat pipe is converted in an electric energy by means of a MHD-generator.

In one embodiment the charged particles of a liquid or of a powder are supplied in a gas flow, and a space transport of the charges in a magnet field takes place together with the particles of liquid o powder, which particles themselves carry these charges.

In one embodiment the a.m. particles are charged by a friction or collisions with each other (i.e. particles with particles), or with some other body.

In one embodiment the a.m. particles are charged by electrostatic induction.

In one embodiment a generator of electric energy is a magnetohydrodynamic generator (MHD-generator).

In one embodiment example a magnetohydrodynamic generator contains a working body, a channel for flow of the working body, a source of a magnet field, and a system for a conductive or inductive removal of the output electric energy by a load current circuit, wherein this working body is the particles of liquid or powder, wherein these particles of liquid or powder are electrically charged.

In one embodiment a device contains a sprayer of liquid.

In one embodiment a work of external forces is converted in an electric energy, wherein the charges are separated by means of these external forces between two or many working bodies through friction or collisions, or through electrostatic induction, and after that the charged this way with the opposite signs working bodies are moved away one from another, wherein at least one of these working bodies is a sprayed liquid or a powder, wherein the steps are executed by means of the energy of the gas flow.

In one embodiment an energy of movement of a working gas of a heat pipe is converted in an electric energy by means of an electrostatic generator.

In one embodiment an electrostatic generator comprises a working body for mechanic transport of electric charges in a space, means for application of charges on this working body, and means for removal of charges from this working body to one external electrode, wherein the working body is liquid particles or powder particles.

In one embodiment an electrostatic generator contains at least one sprayer, wherein a nozzle of this sprayer is placed in a gas flow.

In one embodiment a movement of charges in a space takes place in the crossed electric and magnet fields.

In one embodiment the method is executed in a microsystem, besides, the building elements of an energy converter are produced in particular by the LIGA-method.

In one embodiment many microscopic energy converters are assembled in a system, and an output energy of these system, which system comprises these micro-converters, is led out to outside.

In one embodiment one or many micro-cracks are used as a generator of mechanic swings or as a sound generator, wherein a fluid flow flows over the these cracks to cause these swings or sound.

In one embodiment the mechanic swings are produced by a mechanic system, which one is in a state of mechanic resonance.

In one embodiment a generator of mechanic swings comprises a mechanic system, which on is in a state of mechanic resonance Under the short term "sun radiation" in the Claims are any kinds of natural, but also artificially obtained radiation meant, in particular light radiation, infrared radiation, electromagnetic radiation.

Correspondently, under the term "sun radiation collector" is a collector for any kinds of the a.m. radiation meant; and under the term "sun radiation guide" is any kind of a radiation guide meant.

What is claimed is:

1. Process for converting of heat energy in an electric energy, comprising the steps of:
   supplying heat energy to a vaporizer of a heat pipe comprising vaporiser, condenser and transport zone;
   converting of the supplied heat energy in an energy of a working gas of the heat pipe through an absorption of the supplied heat energy by a working liquid of the heat pipe,
   avaporation of the working liquid of the heat pipe in a vaporizer, and condensing in a condenser;
   directing a heat pipe gas flow from the vaporizer to the condenser;
   converting of mechanical energy of movement of the working gas of the heat pipe in electric energy through an electrostatic principle of generation of electrical energy;
   wherein the improvement comprises:
   pumping the heat pipe working liquid from the condenser in the vaporiser through a pump, installed in a heat pipe working liquid recovery loop in the heat pipe transport zone, wherein the step of directing of the heat pipe gas flow from the vaporizer to the condenser takes place through one or several constrictions to create an essential pressure differential between the vaporizer and condenser.

2. Device for conversion of heat energy into electric energy, comprising:
   a heat pipe, comprising
      a vaporizer to evaporate a heat pipe working liquid,
      a condenser to condence a heat pipe working gas,
      a transport zone to direct the heat pipe working gas from the vaporiser into the condenser, and the beat pipe working liquid back into the vaporizer;
   electrostatic generator, located completely or partially in a flow of the heat pipe working gas to convert a mechanic energy of the heat pipe gas flow into electric energy,
   wherein the improvement comprises a combination of the following elements:
      a narrow constriction between the heat pipe vaporiser and the heat pipe condenser chambers to guide the heat pipe working gas from the vaporiser to the condenser under high pressure;
      a pump, located in the heat pipe transport zone to pump a heat pipe liquid from the condenser back into the vaporiser to provide increasing of efficiency of the heat energy conversion device.

* * * * *